US011898317B2

(12) United States Patent
Adler et al.

(10) Patent No.: US 11,898,317 B2
(45) Date of Patent: Feb. 13, 2024

(54) SURFACE WATER MANAGEMENT SYSTEM INCLUDING WEIR WALL AND DETENTION POND

(71) Applicant: RSA Protective Technologies, LLC, Claremont, CA (US)

(72) Inventors: Richard S. Adler, Claremont, CA (US); Mark L. Boyer, Houston, TX (US); George Doland, Houston, TX (US); Risto Salo, Valencia, CA (US); Majed Agha, Cypress, TX (US)

(73) Assignee: RSA Protective Technologies, LLC, Claremont, CA (US)

( * ) Notice: Subject to any disclaimer, the term of this patent is extended or adjusted under 35 U.S.C. 154(b) by 133 days.

(21) Appl. No.: 17/065,484

(22) Filed: Oct. 7, 2020

(65) Prior Publication Data

US 2021/0262185 A1    Aug. 26, 2021

Related U.S. Application Data

(60) Provisional application No. 63/204,482, filed on Oct. 5, 2020, provisional application No. 63/102,597, filed
(Continued)

(51) Int. Cl.
*E02B 3/10* (2006.01)
*E02B 7/16* (2006.01)
*E02B 7/20* (2006.01)

(52) U.S. Cl.
CPC .................. *E02B 7/16* (2013.01); *E02B 3/10* (2013.01); *E02B 7/20* (2013.01)

(58) Field of Classification Search
CPC ..... E02B 3/02; E02B 3/10; E02B 7/16; E02B 7/20; E03F 1/001
See application file for complete search history.

(56) References Cited

U.S. PATENT DOCUMENTS 833,544 A * 10/1906 Parker ....................... E02B 3/02
405/80
3,733,830 A * 5/1973 Jacobs .................... E02B 3/023
405/80
(Continued)

FOREIGN PATENT DOCUMENTS

EP          3 534 187 A2     9/2019
WO     WO 2008/004202 A2    1/2008

OTHER PUBLICATIONS

Amir Mosavi et al., "Flood Prediction Using Machine Learning Models: Literature Review," Water, vol. 10, No. 11, Oct. 27, 2018 (Oct. 27, 2018), p. 1536, XP055695114.
(Continued)

*Primary Examiner* — Benjamin F Fiorello
(74) *Attorney, Agent, or Firm* — Jon E. Gordon; Haug Partners LLP

(57) ABSTRACT

An integrated system comprising a barrier, such as a weir with movable gates, controllably blocks water flow in a natural or concrete lined channel. Without substantially impeding flow in normal conditions, the barrier is configured to back up flood waters to spill into an upstream prepared detention basin. Water is thus kept from downstream areas until subsequently drained through a controlled spill. Multiple units installed in a watershed can store significant amounts of flood water, e.g., during a hurricane, protecting life and property downstream.
The electromechanically-operated gates can be operated locally or from a remote control center. Gauges and sensors positioned near the weir and/or throughout the watershed can provide data used to control one or more barriers in the watershed, and the data may be used to train a machine learning model to control the system.

9 Claims, 47 Drawing Sheets

Related U.S. Application Data on Jun. 19, 2020, provisional application No. 62/995,171, filed on Jan. 15, 2020, provisional application No. 62/974,541, filed on Dec. 4, 2019, provisional application No. 62/973,538, filed on Oct. 7, 2019.

(56) References Cited

U.S. PATENT DOCUMENTS

| | | | | |
|---|---|---|---|---|
| 3,779,385 A * | 12/1973 | Strohecker | | E03F 5/16 405/63 |
| 4,457,646 A * | 7/1984 | Laesch | | E02B 3/041 405/36 |
| 5,342,144 A * | 8/1994 | McCarthy | | E03F 1/00 405/39 |
| 5,360,290 A * | 11/1994 | Yamada | | F04D 29/448 210/170.03 |
| 5,839,852 A * | 11/1998 | Mattson | | E01C 9/00 14/2.4 |
| 5,909,982 A * | 6/1999 | Takada | | E02B 11/00 405/80 |
| 7,972,080 B2 * | 7/2011 | Summers | | B65G 5/00 405/53 |
| 8,240,951 B2 * | 8/2012 | Gainey, Sr. | | E02B 7/50 405/87 |
| 9,359,746 B1 * | 6/2016 | Amend | | E03F 5/101 |
| 10,465,409 B1 * | 11/2019 | Barber | | F04D 13/16 |
| 2012/0315092 A1 * | 12/2012 | Quaglino, Jr. | | E02B 3/02 405/80 |
| 2017/0089056 A1 * | 3/2017 | Schafer | | E02B 3/00 |
| 2017/0145648 A1 * | 5/2017 | Kida | | E02B 7/20 |

OTHER PUBLICATIONS

International Search Report and Written Opinion dated Jan. 15, 2021 in corresponding International Application No. PCT/US2020/054633.

* cited by examiner

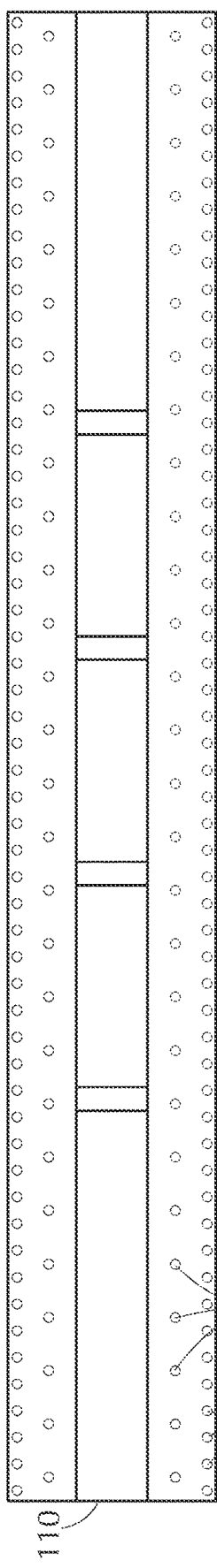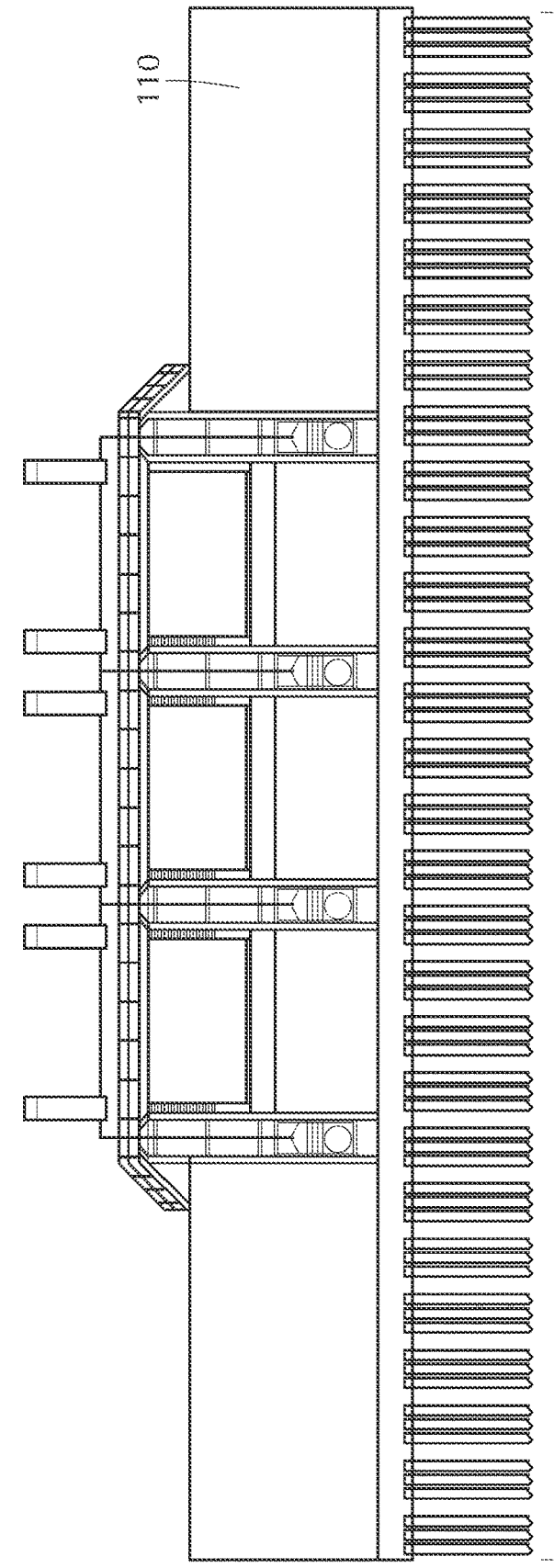
FIG. 17
FIG. 18

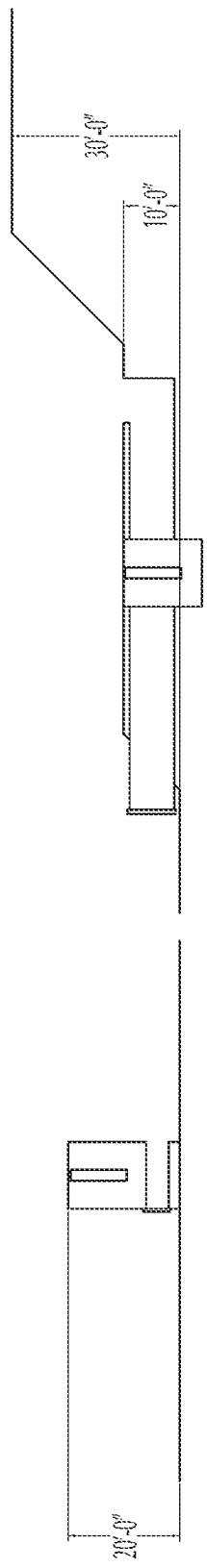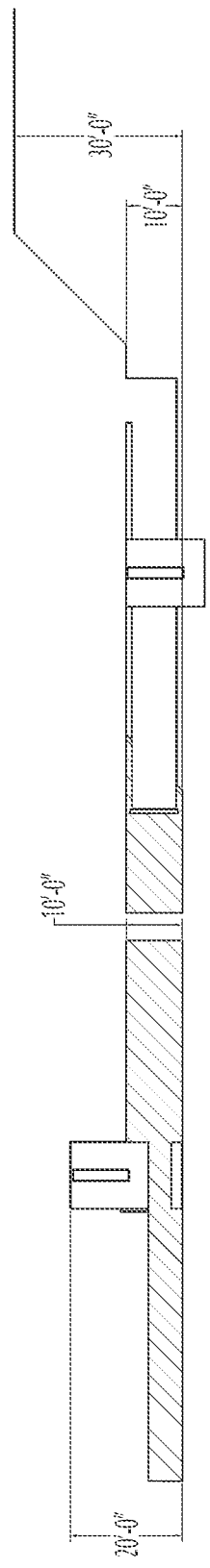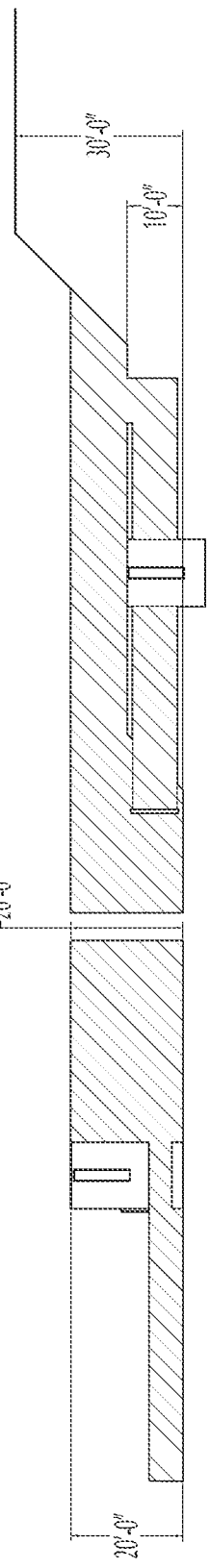

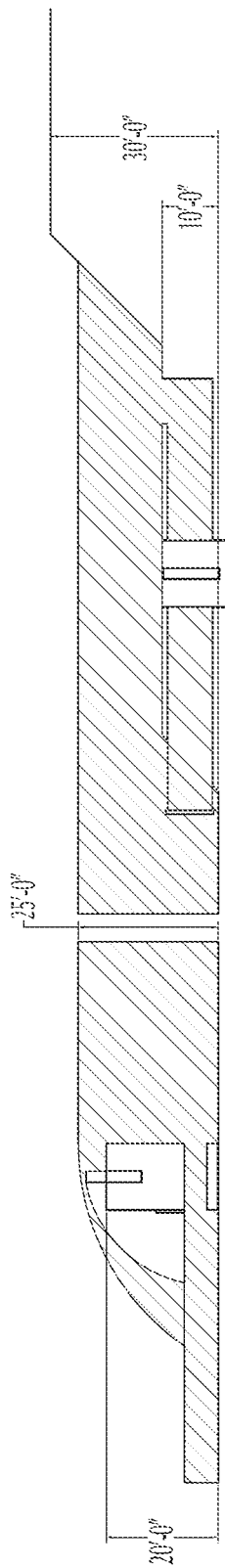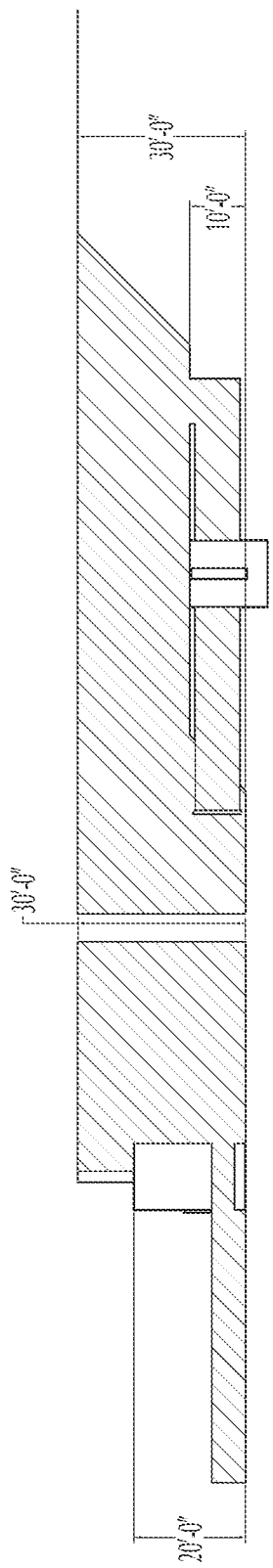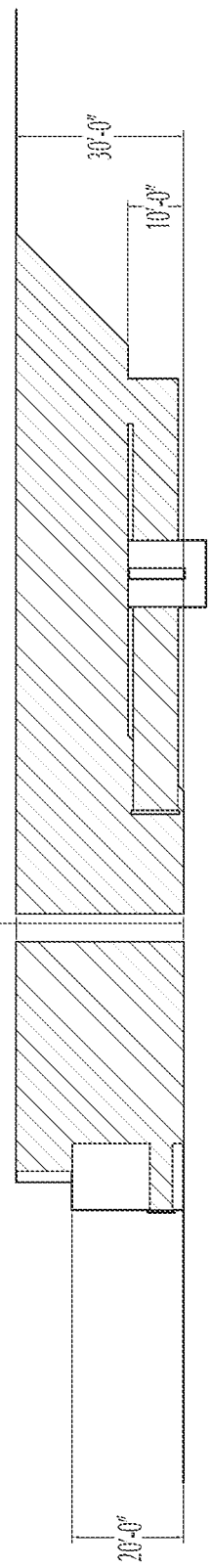

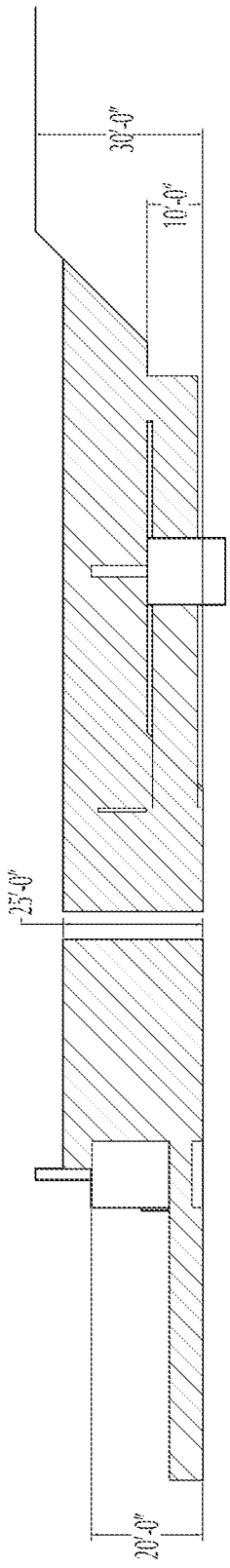
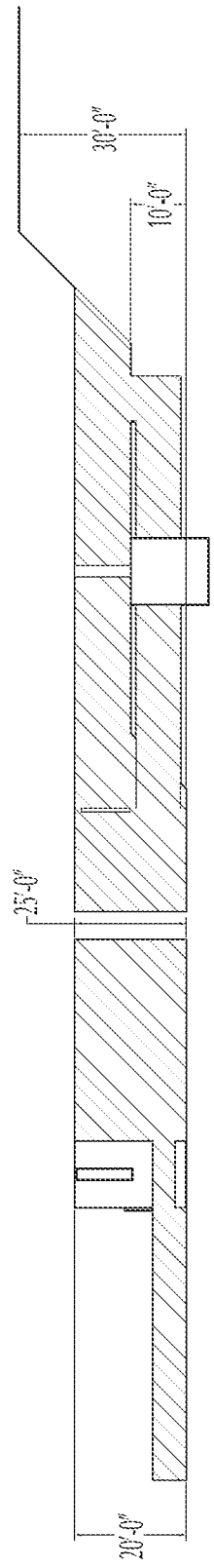
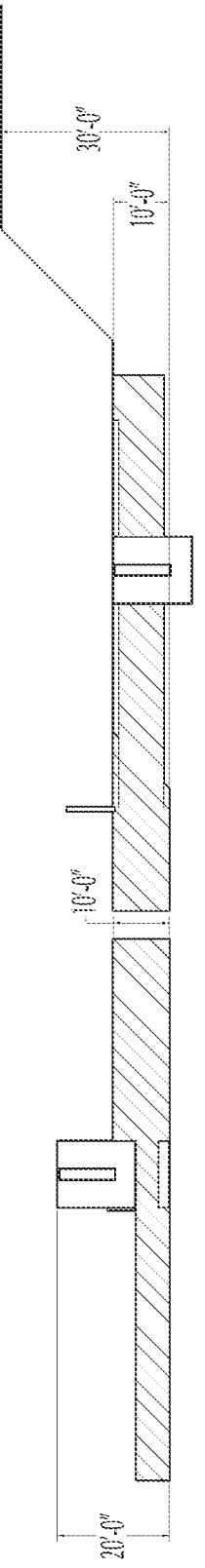
FIG. 34
FIG. 35
FIG. 36

SURFACE WATER MANAGEMENT SYSTEM INCLUDING WEIR WALL AND DETENTION POND

CROSS-REFERENCE TO RELATED APPLICATIONS

This application claims the benefit of provisional U.S. patent application No. 62/973,538, filed on 7 Oct. 2019 and titled "Movable barrier water weir flood wall system. Mounted parallel or across a water conveyance structure"; provisional U.S. patent application No. 62/974,541, filed on 4 Dec. 2019 and titled "Movable barrier water weir flood wall system adjoined to a detention basin mounted across a water conveyance structure. When floodwall is raised dams water that backs up water into a detention basin. Selectable drainage"; provisional U.S. patent application No. 62/995,171, filed on 15 Jan. 2020 and titled "Weir wall/tetention basin flood control system"; and provisional U.S. patent application No. 63/102,597, filed on 19 Jun. 2020 and titled "Weir wall/detention basin flood wall system to prevent flow in a channel that backs up the water to spill into a waiting upstream empty basin, removes millions of gallons of water early in the flooding process to prevent downstream flooding, afterwards water is controlled released"; all of which are incorporated fully into this disclosure by reference. This application further claims the benefit of the U.S. provisional patent application filed on 5 Oct. 2020 and titled "Weir Wall Structure into a Detention Basin to divert channel flow into the detention basin to store at the start of a storm to hold the water upstream to prevent downstream flooding then with a safe timed release" (named inventors: Richard S. Adler, Risto Salo, Majed Agha, Mark Boyer, and George Doland), which has not yet been assigned an application number as of this writing and which also is incorporated fully into this disclosure by reference.

BACKGROUND

Flooding has always represented a major threat to life and property. Rising sea levels and increasing storm intensity, attributed to climate change, have increased this threat in flood-prone areas and brought the risk of catastrophic flooding to areas that have previously been considered relatively safe.

To manage flood risk, some measures have included construction of dams, levees, and drainage channels. These static measures can be inefficient, however, having limited areas of effect and being unable to interact cooperatively to manage flooding in a region as a whole. For example, heavy rain in one part of a region may overwhelm flood mitigation measures in that part, while other parts of the region may see their flood management systems barely taxed.

One approach to these inefficiencies may be simply to use larger infrastructure to manage flooding. The shortcomings of this approach include higher costs, e.g., to acquire land and build larger structures. It may also incur greater community resistance to the diversion of more land to flood control from other uses.

There is thus a need for ways to manage surface water in ways that can increase efficiency of flood control across an entire region (e.g., a watershed) and to do so in ways that reduce the effects on the community of the flood control measures themselves. There is further a need for systems capable of managing communications and controls between watersheds to attain the greatest benefits to flood safety over multiple geographic regions.

BRIEF SUMMARY OF THE INVENTION

Embodiments of the invention may comprise one or more installations along a natural or artificial channel, e.g., to divert water into one or more prepared storage areas, detain it in there, or both. By isolating in this way a volume of water removed from the channel, the installations according to embodiments of the invention may reduce (and in some cases possibly even eliminate) potential flooding downstream.

For example, an installation according to an embodiment of the invention may comprise a barrier spanning the channel. The barrier, or weir, may in embodiments of the invention comprise one or more sluices comprising vertically moving gates and one or more vertically movable gates (also called wall panels or weir panels) to control water flow over and/or through the weir.

In embodiments of the invention, immediately upstream of the weir, a secondary channel may connect the main channel to a detention pond configured to hold excess water flowing through the channel, e.g., during a heavy rain event, and may particularly do so early in the storm's deluge. The secondary channel may itself be spanned by a weir, e.g., with one or more sluices comprising vertically moving gates and/or one or more vertically movable panels, controlling the ingress and egress of water to and from the detention pond. In an embodiment of the invention, one or more drains may further permit discharge of water from the detention pond, e.g., into the main channel.

In an alternative embodiment of the invention, a detention pond may adjoin a main channel and communicate with it via a secondary channel spanned by a weir, e.g., as above, but without any associated barrier in the main channel. In further such embodiments of the invention, ingress of water, egress, or both may be achieved, e.g., by gravity alone (through one or more opened panels, sluices, or both), by one or more pumps (in either or both directions), or through some combination of gravity and pumping.

In an alternate embodiment of the invention the sluice gates and weir wall structures are mounted only across ingress/egress opening of the detention pond without the structure mounted across the main channel. In an embodiment employing this single structure, filling the detention basin may occur, e.g., through gravity fed means matching the water elevation in the channel or be enhanced by utilizing powered pumps drawing channel water into the basin.

According to embodiments of the invention, the weir panels and/or the gates of the sluices may be operated (e.g., raised and lowered) electromechanically. The panels and/or gates in such embodiments may be controlled manually, e.g., in a control room at the site of the installation or at one or more remote locations. Alternatively or in addition to the foregoing, the panels and or gates may be controlled, e.g., automatically by a computerized control system. (A control location may be considered remote if it is at a facility that does not reasonably appear to be a part of the same installation as the dam structure, e.g., because of a lack of physical proximity.)

Sensors may be provided according to embodiments of the invention to detect, e.g., water levels, flow rates, rainfall rates, and/or other parameters relevant to operation of a surface water management system. Such sensors may, e.g., provide input to a computerized control system in embodiments of the invention to be used in automatically controlling some or all aspects of the system.

According to embodiments of the invention, the computerized control system may include, e.g., a machine learning model to be trained, e.g., by inputs from sensors as above. The model may be trained, e.g., on the response of water levels throughout a region, such as a watershed, to parameters such as water levels, rainfall rates, and the settings of one or more movable weir panels and/or gates. Once trained, in an embodiment of the invention, the computerized control system may use the trained machine learning model to control the system automatically, i.e., without human intervention under normal circumstances following activation.

For example, in an embodiment of the invention, a neural network may be trained to estimate, e.g., water levels throughout a region based, e.g., on parameters such as listed above. Once trained, a control system may try, so far as possible, to adjust parameters reflecting the configurations of one or more integrated systems in a way that keeps estimated water levels below specified critical values throughout a region.

In embodiments of the invention, surface water management may be achieved, e.g., through the use of multiple installations throughout a region, e.g., along a single main channel. Each installation may in an embodiment include its own primary weir, detention pond, and secondary weir, as above. According to embodiments of the invention, each installation may be controlled, e.g., locally and independently, or commonly from a common control location. In an embodiment a single automatic control system may control the multiple installations, e.g., according to fixed rules and/or using a trained machine learning model as above.

Manual controls, e.g., local to one or more installations and/or remotely from all of them, may in embodiments of the invention permit overriding the automatic control system or systems when appropriate, for example, in response to input (e.g., weather information) from a third-party source not automatically available to the control system or in case of equipment failure.

According to embodiments of the invention, periodic (e.g., daily, weekly, or monthly) remote testing of the system may be supported. For efficiency, such testing may in some embodiments involve merely providing power to some or all sensors associated with the system to ensure, e.g., that monitoring and feedback will function properly upon activation of the system during a rain event.

According to embodiments of the invention, data, e.g., associated with sensors and/or testing, monitoring, and/or operating the system may be logged. Alerts based on some or all such data may be providing in real time, e.g., to local or remote operators and/or one or more administrators and/or other interested entities. Such data logging and/or alerts according to embodiments of the invention may include, e.g., indications of needed repairs, which may in embodiments be noted, e.g., in real time.

According to an embodiment of the invention, an integrated system for managing surface water flow within a geographic region comprises a primary weir for managing water flow through a natural or artificial main channel. The primary weir spans the main channel and comprises one or more movable panels and one or more sluices, each sluice comprising a gate. The system further comprises a detention pond adjacent to the main channel and communicating with the main channel via a pond channel immediately upstream of the primary weir.

According to a further embodiment of the invention, an integrated system comprises a second detention pond communicating with the main channel via a second pond channel immediately upstream of the primary weir.

According to a further embodiment of the invention, the detention pond comprises a park capable of being enjoyed, e.g., when a detention pond basin is dry, and heavy rain is not expected.

According to a further embodiment of the invention, an integrated system comprises a detention weir for managing water flow through the pond channel. The detention weir spans the pond channel opening and comprises one or more movable panels and one or more sluices, each sluice comprising a gate. In a further such embodiment, the integrated system comprises one or more drains configured to drain water from the detention pond into the main channel. Alternatively or in addition to the foregoing, in further such embodiments, drainage may be achieved through the one or more movable panels, one or more sluices, or both.

In a still further embodiment of the invention, the integrated system comprises a plurality of drains. A first at least one of the drains is placed to discharge water from the detention pond into the main channel upstream of the primary weir, and a second at least one of the drains is placed to discharge water from the detention pond into the main channel downstream of the primary weir. Such discharge may occur, e.g., in a controlled manner to limit any possibility of downstream flooding.

In a still further embodiment of the invention, the integrated system comprises a plurality of sensors and an automatic control system. The automatic control system is configured to receive inputs from the plurality of sensors and to control independently of human input the one or more panels of the primary weir, the one or more gates of the sluices of the primary weir, the one or more panels of the detention weir, and the one or more gates of the sluices of the detention weir in response to the inputs to manage surface water flow in a manner calculated to reduce flooding in the geographic region. In an embodiment, the plurality of sensors comprises a plurality of water level sensors, a plurality of water flow rate sensors, and a plurality of rain gauges, and the plurality of water level sensors comprises a first plurality of water level sensors in the immediate area of the primary weir and the detention pond and a second plurality of water level sensors in the region but not in the immediate area of the primary weir and the detention pond.

In such an embodiment, the automatic control system comprises a machine learning model. The automatic control system is programmed to have a training mode wherein the machine learning model is trained on relationships among the inputs and the configuration of the one or more movable panels of the primary weir, the one or more gates of the sluices of the primary weir, the one or more moveable panels of the detention weir, and the one or more gates of the sluices of the detention weir. It is further programmed to have an operation mode wherein the automatic control system, based on the inputs from the plurality of sensors and the machine learning model, controls independently of human input the one or more movable panels of the primary weir, the one or more gates of the sluices of the primary weir, the one or more movable panels of the detention weir, and the one or more gates of the sluices of the detention weir in response to the inputs to manage surface water flow in a manner calculated to reduce flooding in the geographic region.

According to such embodiments of the invention, during the life of a storm, an integrated system and/or a coordinated system may demonstrate partial or complete filling and/or draining of a detention basin, e.g., based on pre-programmed analysis of the most beneficial management of downstream waters through the entire length of the channel. Alternatively, in such embodiment, such filling and/or draining may be governed by a trained machine learning model. Local flood abatement near any single installation may be apparent. Embodiments of the invention, e.g., including multiple installations along one or more natural or artificial channels, may in some cases be designed, e.g., with the aim of mitigating flooding in a central downstream area, such as a large city. In such cases, one or more watersheds may be, e.g., monitored and controlled according to embodiments of the invention, thereby providing some degree of flood protection to the city.

According to an embodiment of the invention, a coordinated system for managing surface water flow within a geographic region comprises a plurality of the integrated systems disclosed above. In such an embodiment, a single main channel is common to all of the integrated systems; each of the integrated systems comprises a respective primary weir, pond channel, detention pond, and detention weir specific to the integrated system and not shared by any other of the integrated systems; and a single automatic control system is common to all of the integrated systems.

In a further such embodiment, the automatic control system is operated from a control location not in the immediate area of any of the primary weirs or detention ponds.

In a further such embodiment, the region is a watershed. Alternatively, it may be an aggregation of multiple watersheds.

According to an embodiment of the invention, a method of surface water management in a region comprises providing, for a natural or artificial main channel in the region, one or more integrated systems for managing surface water flow. Each of the integrated systems separately comprises: (i) a primary weir for managing water flow through a natural or artificial main channel, the primary weir spanning the main channel and comprising one or more movable panels and one or more sluices, each sluice comprising a gate, (ii) a detention pond adjacent to the main channel and communicating with the main channel via a pond channel immediately upstream of the primary weir, and (iii) a detention weir for managing water flow through the pond channel, the detention weir spanning the pond channel and comprising one or more movable panels and one or more sluices, each sluice comprising a gate.

According to the embodiment, the method further comprises controlling from a central location the primary weirs and the detention weirs to manage surface water levels in the region.

According to an embodiment of the invention, a computerized method of surface water management in a region comprising a natural or artificial main channel is provided. The method comprises receiving first inputs at a first plurality of times. The first inputs comprise: (1) first information from a plurality of integrated systems, each of the integrated systems separately comprising (a) a primary weir for managing water flow through a natural or artificial main channel, the primary weir spanning the main channel and comprising one or more movable panels and one or more sluices, each sluice comprising a gate, (b) a detention pond adjacent to the main channel and communicating with the main channel via a pond channel immediately upstream of the primary weir, and (c) a detention weir for managing water flow through the pond channel, the detention weir spanning the pond channel and comprising one or more movable panels and one or more sluices, each sluice comprising a gate, the first information comprising status information for each respective primary weir, detention pond, and detention weir; and (2) second information comprising information from a plurality of sensors in the region.

According to the embodiment, the method comprises training a machine learning model using the first information and, at a second plurality of times subsequent to the first plurality of times: (i) receiving second inputs from the plurality of integrated systems and the plurality of sensors, (ii) providing the second inputs to the machine learning model, (iii) applying output from the machine learning model to automatically control one or more of the integrated systems.

According to a further embodiment of the invention, the plurality of sensors comprises a plurality of water level sensors, a plurality of water flow rate sensors, and a plurality of rain gauges. Additionally, the plurality of water level sensors comprises a first plurality of water level sensors, each in the immediate area of a respective one of the integrated systems, and a second plurality of water level sensors, each in the region but not in the immediate area of any of the integrated systems.

According to an embodiment of the invention, an integrated system for managing surface water flow within a geographic region is provided. The system comprises a detention pond adjacent to the main channel and communicating with the main channel via a pond channel. The system further comprises a detention weir for managing water flow through the pond channel, the detention weir spanning the pond channel and comprising one or more movable panels and one or more sluice, each sluice comprising a gate.

According to a further embodiment of the invention, the integrated system comprises one or more drains configured to drain water from the detention pond into the main channel.

According to an embodiment of the invention, an integrated system for managing surface water flow within a geographic region comprises: a detention pond adjacent to a main channel and communicating with the main channel via a pond channel; and a detention weir for managing water flow through the pond channel, the detention weir spanning the pond channel and comprising one or more movable panels, each movable panel being associated with a respective opening in the detention weir and configured to move vertically between a first position in which the panel prevents water from flowing through the respective opening and a second position, above the first position, in which the panel does not hinder water flowing through the respective opening. In an embodiment of the invention, a berm increases the volumetric capacity of the detention pond.

In an embodiment of the invention, the integrated system comprises, for each of the movable panels, a respective motor coupled to the movable panel to move the panel from the first position to the second position. In a further embodiment of the invention, the integrated system does not comprise a dam structure immediately downstream of the pond channel.

In a still further embodiment of the invention, the integrated system comprises one or more ingress pumps to move water from the main channel to the detention pond. In an embodiment, at least one of the ingress pumps is a screw pump having a capacity of at least ten thousand gallons of water per minute.

In a still further embodiment of the invention, the integrated comprises a sump, each ingress pump comprises a respective intake, and each intake is located within the sump.

Alternatively, in an embodiment of the invention, the pond channel has a bottom, and each opening in the detention weir has a respective bottom that is substantially even with the bottom of the pond channel.

In an embodiment of the invention, the integrated system comprises one or more egress pumps to move water from the detention pond to the main channel. In an embodiment, at least one of the egress pumps is a screw pump having a capacity of at least ten thousand gallons of water per minute. In a further embodiment, the integrated system comprises one or more ingress pumps to move water from the main channel to the detention pond. In a further embodiment, at least one of the egress pumps is a screw pump having a capacity of at least ten thousand gallons of water per minute, and at least one of the ingress pumps is a screw pump having a capacity of at least ten thousand gallons of water per minute.

In an embodiment of the invention, the integrated system comprises a sump, each ingress pump comprises a respective intake, and each intake is located within the sump. In a further embodiment of the invention, at least one of the egress pumps is a screw pump having a capacity of at least ten thousand gallons of water per minute, and at least one of the ingress pumps is a screw pump having a capacity of at least ten thousand gallons of water per minute.

In a still further embodiment of the invention, the integrated system of comprises a plurality of sensors and an automatic control system. The automatic control system is configured to receive inputs from the plurality of sensors and to control independently of human input the one or more movable panels of the detention weir, the one or more ingress pumps, and the one or more egress pumps in response to the inputs to manage surface water flow in a manner calculated to reduce flooding in the geographic region.

In a still further embodiment of the invention, the plurality of sensors comprises a plurality of water level sensors, a plurality of water flow rate sensors, and a plurality of rain gauges; the plurality of water level sensors comprises a first plurality of water level sensors in the immediate area of the primary weir and the detention pond and a second plurality of water level sensors in the region but not in the immediate area of the primary weir and the detention pond; the automatic control system comprises a machine learning model and is programmed to have (i) a training mode wherein the machine learning model is trained on relationships among the inputs and the configuration of the one or more movable panels of the detention weir, one or more operational parameters of the one or more ingress pumps, and one or more operational parameters of one or more egress pumps, and (ii) an operation mode wherein the automatic control system, based on the inputs from the plurality of sensors and the machine learning model, controls independently of human input the one or more movable panels of the detention weir, one or more of the operational parameters of the one or more ingress pumps, and one or more of the operational parameters of one or more egress pumps in response to the inputs to manage surface water flow in a manner calculated to reduce flooding in the geographic region.

According to embodiments of the invention, a coordinated system for managing surface water flow within a geographic region comprises a plurality of the integrated systems as above. In the embodiments, a single main channel is common to all of the integrated systems; each of the integrated systems comprises a pond channel, detention pond, and detention weir specific to the integrated system and not shared by any other of the integrated systems; and a single automatic control system is common to all of the integrated systems.

In further embodiments of the invention, the automatic control system is operated from a control location not in the immediate area of any of the primary weirs or detention ponds. In a still further embodiment of the invention, the region is a watershed.

According to embodiments of the invention, a method of surface water management in a region comprises providing, for a natural or artificial main channel in a region, one or more integrated systems for managing surface water flow, each of the integrated systems separately comprising (i) a detention pond adjacent to the main channel and communicating with the main channel via a pond channel, (ii) a detention weir for managing water flow through the pond channel, the detention weir spanning the pond channel and comprising one or more movable panels, and (iii) one or more ingress pumps traversing the detention weir and one or more egress pumps traversing the detention weir. The method further comprises controlling from a central location the detention weirs, the ingress pumps, and the egress pumps to manage surface water levels in the region.

According to embodiments of the invention, a computerized method of surface water management in a region comprising a natural or artificial main channel comprises receiving first inputs at a first plurality of times, the first inputs comprising (1) first information from a plurality of integrated systems, each of the integrated systems separately comprising (a) a detention pond adjacent to the main channel and communicating with the main channel via a pond channel, (b) a detention weir for managing water flow through the pond channel, the detention weir spanning the pond channel and comprising one or more movable panels, and (iii) one or more ingress pumps traversing the detention weir and one or more egress pumps traversing the detention weir, the first information comprising status information for each respective primary weir, detention pond, and detention weir, and (2) second information comprising information from a plurality of sensors in the region. The method further comprises training a machine learning model using the first inputs and, at a second plurality of times subsequent to the first plurality of times, (i) receiving second inputs from the plurality of integrated systems and the plurality of sensors, (ii) providing the second inputs to the machine learning model, and (iii) applying output from the machine learning model to automatically control one or more of the integrated systems.

According to embodiments of the invention, a method of surface water management in a region comprises providing, for a natural or artificial main channel in a region, one or more first integrated systems for managing surface water flow, each of the first integrated systems separately comprising (i) a primary weir for managing water flow through the main channel, the primary weir spanning the main channel and comprising one or more movable panels and one or more sluices, each sluice comprising a gate, (ii) a detention pond adjacent to the main channel and communicating with the main channel via a pond channel immediately upstream of the primary weir, and (iii) a detention weir for managing water flow through the pond channel, the detention weir spanning the pond channel and comprising one or more movable panels and one or more sluices, each sluice comprising a gate. The method further comprises providing, for the main channel in the region, one or more second integrated systems for managing surface water flow, each of the second integrated systems separately comprising (i) a detention pond adjacent to the main channel and communicating with the main channel view a pond channel, (ii) a detention weir for managing water flow through the pond channel, the detention weir spanning the pond channel and comprising one or more movable panels, and (iii) one or more ingress pumps traversing the detention weir and one or more egress pumps traversing the detention weir. The method further comprises controlling from a central location, for the first integrated systems, the primary weirs and the detention weirs, and, for the second integrated systems, the detention weirs, the ingress pumps, and the egress pumps, to manage surface water levels in the region.

According to embodiments of the invention, a computerized method of surface water management in a region comprising a natural or artificial main channel comprises receiving first inputs at a first plurality of times, the first inputs comprising (1) first information from a plurality of first integrated systems, each of the first integrated systems separately comprising (a) a primary weir for managing water flow through a natural or artificial main channel, the primary weir spanning the main channel and comprising one or more movable panels and one or more sluices, each sluice comprising a gate, (b) a detention pond adjacent to the main channel and communicating with the main channel via a pond channel immediately upstream of the primary weir, and (c) a detention weir for managing water flow through the pond channel, the detention weir spanning the pond channel and comprising one or more movable panels and one or more sluices, each sluice comprising a gate, the first information comprising status information for each respective primary weir, detention pond, and detention weir, (2) second information from a plurality of second integrated systems, each of the second integrated systems separately comprising (a) a detention pond adjacent to the main channel and communicating with the main channel via a pond channel, (b) a detention weir for managing water flow through the pond channel, the detention weir spanning the pond channel and comprising one or more movable panels, and (iii) one or more ingress pumps traversing the detention weir and one or more egress pumps traversing the detention weir, the first information comprising status information for each respective primary weir, detention pond, and detention weir, and (2) third information comprising information from a plurality of sensors in the region.

The method further comprises training a machine learning model using the first inputs and, at a second plurality of times subsequent to the first plurality of times, (i) receiving second inputs from the plurality of first integrated systems, the plurality of second integrated systems, and the plurality of sensors, (ii) providing the second inputs to the machine learning model, and (iii) applying output from the machine learning model to automatically control the first integrated systems and the second integrated systems.

BRIEF DESCRIPTION OF THE DRAWINGS

FIG. 17 depicts a dam structure supported by piles according to an embodiment of the invention.

FIG. 18 depicts locations of supporting piles relative to a dam structure according to an embodiment of the invention.

FIGS. 25-36 depict schematically stages in a sequence of operation according to an embodiment of the invention.

DETAILED DESCRIPTION OF PREFERRED EMBODIMENTS

Embodiments of the invention provide integrated weirs and detention basins (also referred to as detention ponds) to hold back and/or divert flood water in channels (including, e.g., bayous and canals) to protect against downstream flooding and property damage. Removing large amounts of water from the channel, e.g., from the beginning of a rain event, and holding that volume, e.g., inside an upstream detention pond, is expected, e.g., to lower the downstream surface water level to prevent overtopping of the channel and to prevent flooding by doing so.

Figure 1:
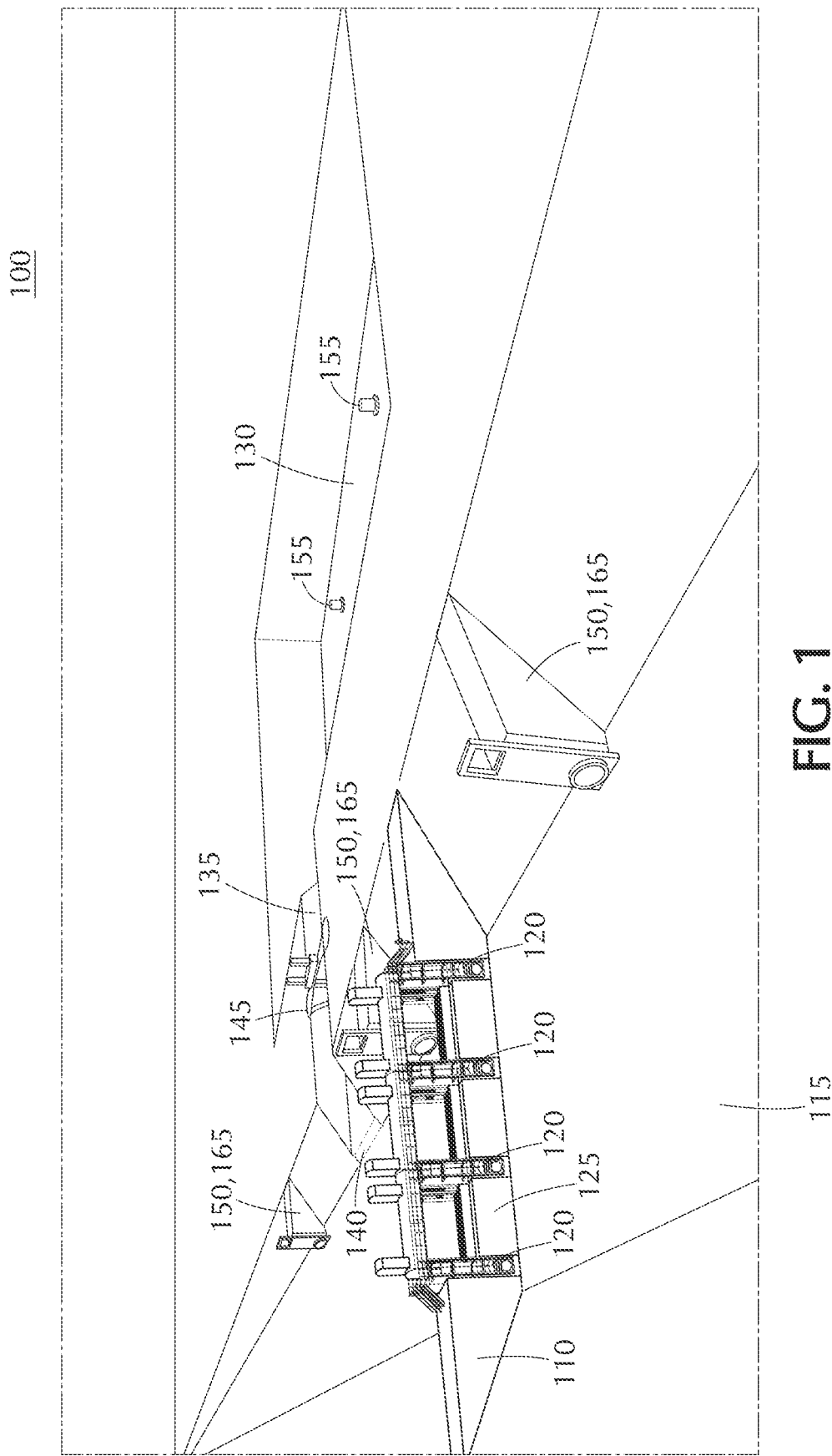
FIG. 1 depicts an example of an integrated system according to an embodiment of the invention.

FIG. 1 depicts an example of an integrated system 100 according to an embodiment of the invention. As depicted, an embodiment of the invention may comprise a fixed dam structure 110 (a weir) stretching across a natural or artificial channel 115 such as a canal, creek, or bayou. The dam structure 110 may comprise, e.g., one or more vertically movable weir walls or panels and one or more gated sluices 120. (FIG. 1 depicts a dam structure 110 with three weir walls in their fully lowered position, in which the weir walls are fully concealed by the body of the dam structure 120.)

The height and width of the dam structure 110 may depend, e.g., on the channel dimensions and the amount of water to be detained. For example, in one embodiment of the invention, the top of the fixed dam structure 110 may rise 30 feet above the bottom of the channel 115.

In an embodiment, a fixed dam section 125 may allow, e.g., normal flow through a series of sluice gates 120 near the base. During a heavy rain event, excess water (not pictured) may back up behind the fixed lower dam structure 125 with the bypass sluice gates 120 retarding the flow downstream. During an event such as a hurricane, the bypass sluice gate(s) 120 may be closed, e.g., to allow more water to back up behind the fixed dam 110 and then spill over the weir wall. If the event is protracted, the weir walls may be raised to their full height to collect the maximum amount of water.

In embodiments of the invention, one or more detention ponds 130 may be positioned on either or both sides of the main channel 115. A detention pond 130 may in embodiments of the invention communicate with the main channel 115, e.g., via a secondary channel 135 (sometimes called a pond channel), to the main channel, may be positioned on either or both sides of the channel. In embodiments of the invention, the entire junction 140 between the main channel 115 and the pond channel 135 may be, e.g., immediately upstream of the dam structure 110. An effect of this configuration in embodiments of the invention may be that, e.g., the detention pond 130 or ponds will fill as the canal water level rises, thereby storing additional water. (It will be appreciated that additional water may be detained upstream as the water level rises in the main channel 115 itself.)

(For purposes of this disclosure, the junction 140 may be considered to be immediately upstream of the dam structure 110 if any more than a minimal increase in the water level 110 would be reflected at the junction 140. In such a configuration, if the bottom of the pond channel 135 is level with the bottom of the main channel 115, any increase in the water level in the main channel 115 would almost immediately be reflected by an increase in the water level in the pond channel 135. In embodiments of the invention, however, the bottom of the pond channel 135 may be higher than the bottom of the main channel 115, e.g., to facilitate complete gravity-driven drainage of the detention pond 130.)

Each pond channel 135 may have a sluice gate 145 that, when open, will allow water to flow between the main channel 115 and the detention pond 130. Once the detention pond 130 is full, the sluice gate 145 may be closed to store the water for slow release once downstream conditions improve.

According to an embodiment of the invention, one or more drains 150 may provide an additional path for water to flow from the detention pond 130 into the main channel 115. As FIG. 1 depicts, each drain 150 has an intake 155 within the detention pond. As FIG. 1 further depicts, one or more drains may provide a discharge 160 upstream of the dam structure 110, and one or more drains may provide a discharge 165 downstream of it. It will be appreciated that in some configurations and circumstances, according to some embodiments of the invention, some or all upstream drains 160 may serve as additional points of water ingress to the detention pond 130 as it fills.

The dimensions of a detention pond 130 according to embodiments of the invention may be expected to vary widely from embodiment to embodiment reflecting, e.g., the expected volumes of water to be detained and the amount of available land. Thus, although a detention pond may be of any desired size, it may be expected that detention pond 130 according to typical (but not limiting) embodiments of the invention may be, e.g., at least 100 acres in area, and could be 200 or 300 acres or larger. As further non-limiting examples, detention ponds according to embodiments of the invention may have surface areas of 10, 15, 20, 25, 30, 35, 40, 45, 50, 75, 100, 125, 150, 175, 200, 225, 250, 275, 300, 325, 350, 375, 400, 425, 450, 475, 500, 750, 1000, 1250, 1500, 1750, 2000, 2250, 2500 or more acres, as well as surface areas in between the listed values.

Similarly, a detention pond 130 according to embodiments of the invention may have any desired depth consistent with geography, geology, resources for construction, and expected detention needs. As non-limiting examples, detention ponds according to embodiments of the invention may have depths of 10, 12.5, 15, 17.5, 20, 22.5, 25, 27.5, and 30 feet as well as depths in between the listed values. It will be appreciated that the effective depth of a detention pond 130 (or, for that matter, a channel), may be increased, e.g., by constructing one or more berms around some or all of the border of the pond or channel.

Figure 2:
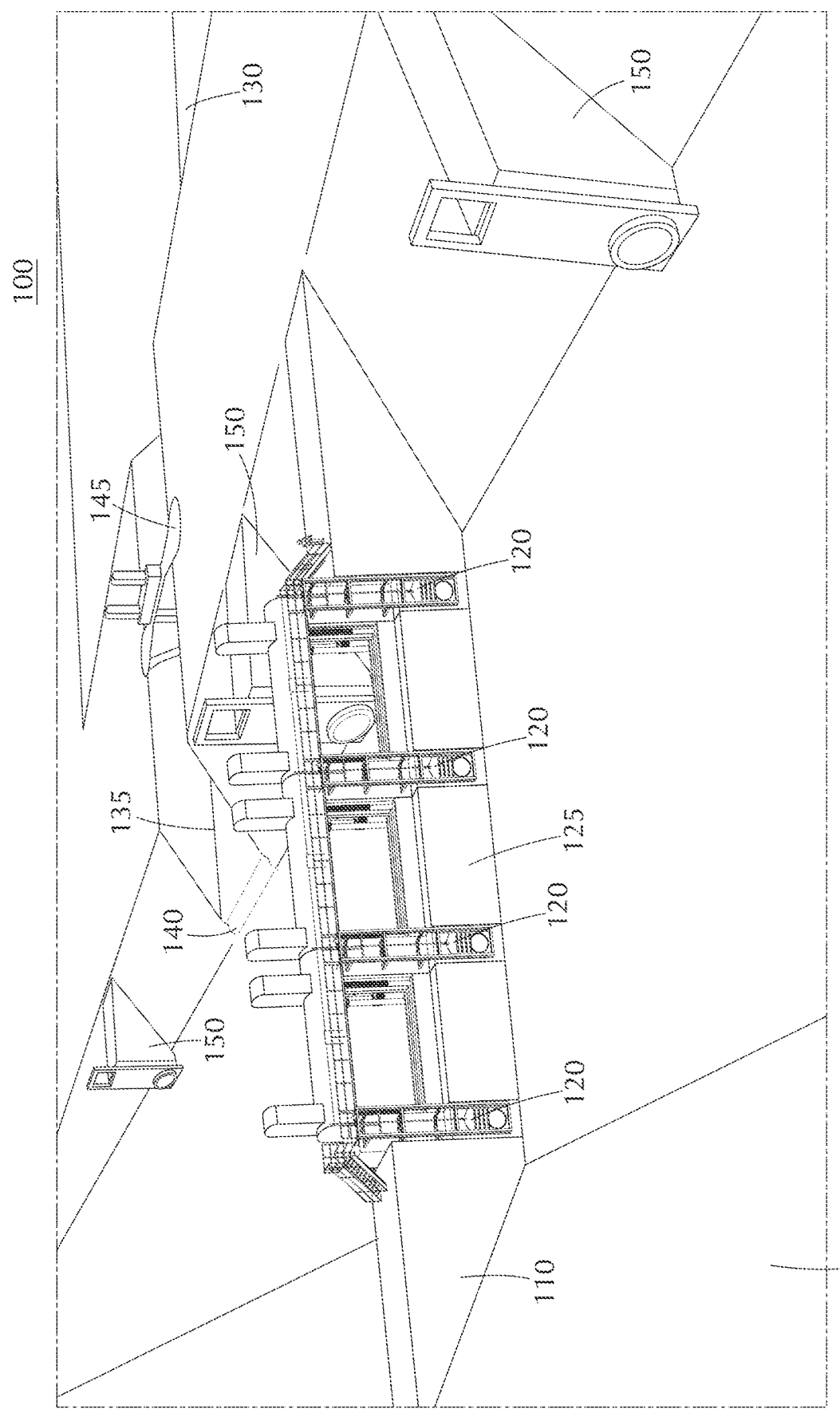
FIG. 2 depicts components of the integrated system, with some components omitted to better depict the others.

FIG. 2 depicts components of the system 100 other than the detention pond 130 and the intakes 155, to permit better depiction of the other components.

Figure 3:
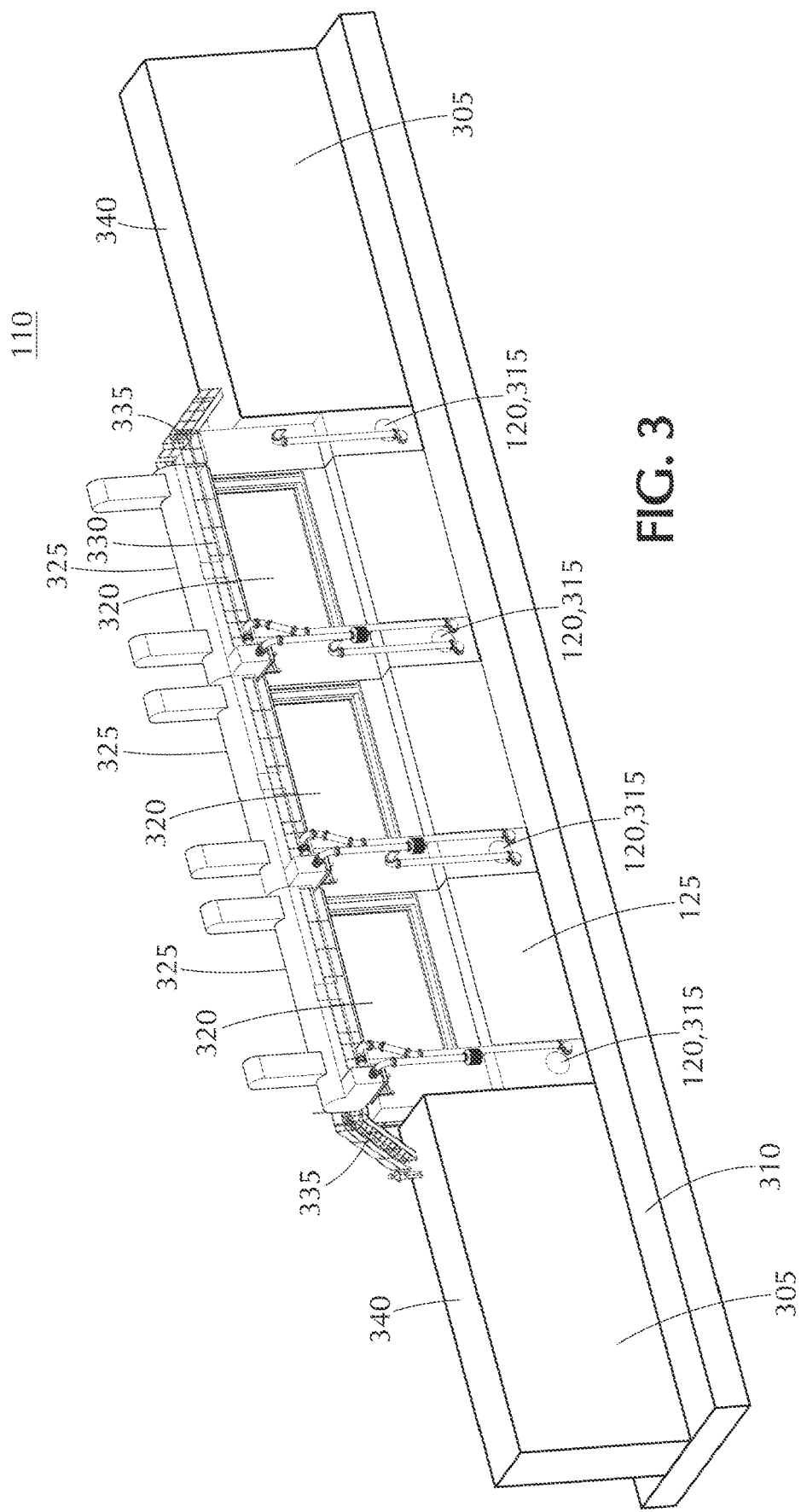
FIG. 3 and FIG. 4 depict a primary dam structure according to an embodiment of the invention.
Figure 4:
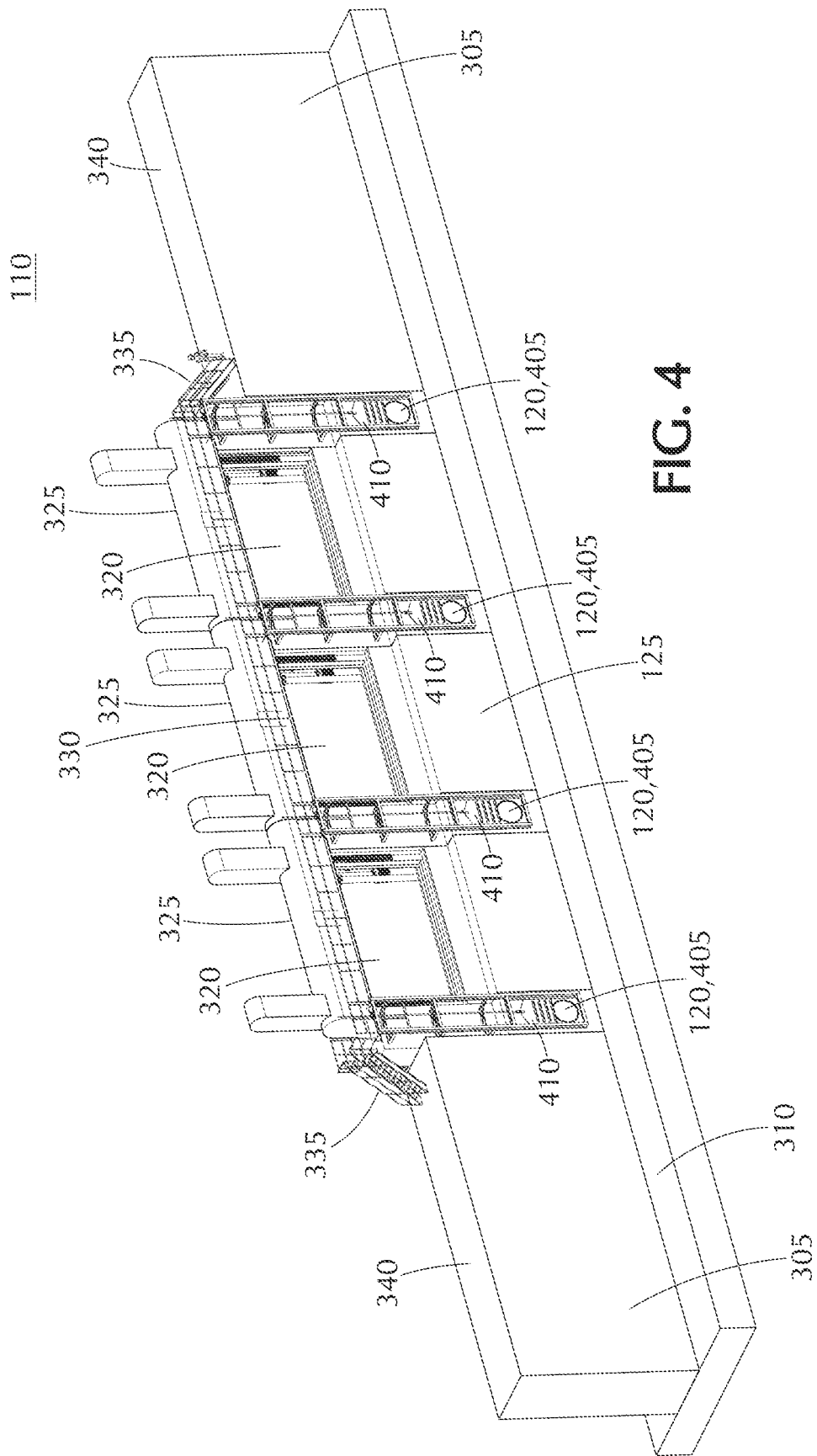

FIG. 3 and FIG. 4 depict a primary dam structure 110 according to an embodiment of the invention. FIG. 3 depicts the structure 110 viewed from upstream, looking downstream. FIG. 4, conversely, depicts the structure 110 viewed from downstream, looking upstream. FIGS. 3 and 4 depict the entire fixed lower dam structure 125 according to an embodiment, including ends 305 and a base 310 that may be embedded in the sides and bottom, respectively, of a channel, e.g., as FIGS. 1 and 2 depict.

As FIGS. 3 and 4 depict, in an embodiment of the invention, one or more sluices 120 may be built into the fixed lower dam structure 125 near its base 310. In an embodiment such as FIGS. 3 and 4 depict, there are four sluices 120 built into the structure, each with an upstream intake 315 and downstream discharge 405. It will be appreciated that each sluice 120 may be built, e.g., as a substantially horizontal passage through the structure 125, and may or may not be lined, e.g., with an appropriately-sized pipe (not pictured).

Flow through each sluice 120 may in embodiments of the invention be controlled, e.g., by gates 410. As FIG. 4 depicts, for example, each sluice 410 may be individually associated with a gate 410 capable of being raised and lowered mechanically. (It is envisioned that in typical use, the gates may be raised and lowered as a unit, but, in embodiments of the invention, the gates may be capable of independent motion.)

It will be appreciated that the positioning of the sluices 120 at the base 310 of the structure 125 means that when the sluices are open, for sufficiently low volumes of water flow, water will flow through the dam structure 110 at approximately the same rate as it would flow through the channel in the absence of the dam structure 110.

FIGS. 3 and 4 depict multiple large openings 320 in the primary dam structure 110, according to an embodiment of the invention. The depicted embodiment has three such openings 320, but any particular embodiment of the invention may comprise more or fewer such openings 320 as appropriate under the circumstances. In embodiments of the invention, if the water level in the channel 115 behind the fixed lower structure 125 rises sufficiently (not pictured), it may begin to spill through the openings 320.

According to embodiments of the invention, a movable weir panel (not pictured) may be retractable, e.g., into the fixed lower base 125 immediately below each opening 320. As discussed below, in embodiments of the invention, the panel may be raised and lowered, e.g., by motorized machinery, to partially or totally block the associated opening 320, limiting or preventing the flow of water through the opening. In FIGS. 3 and 4, associated machinery is obscured by protective coverings 325.

Figure 5:
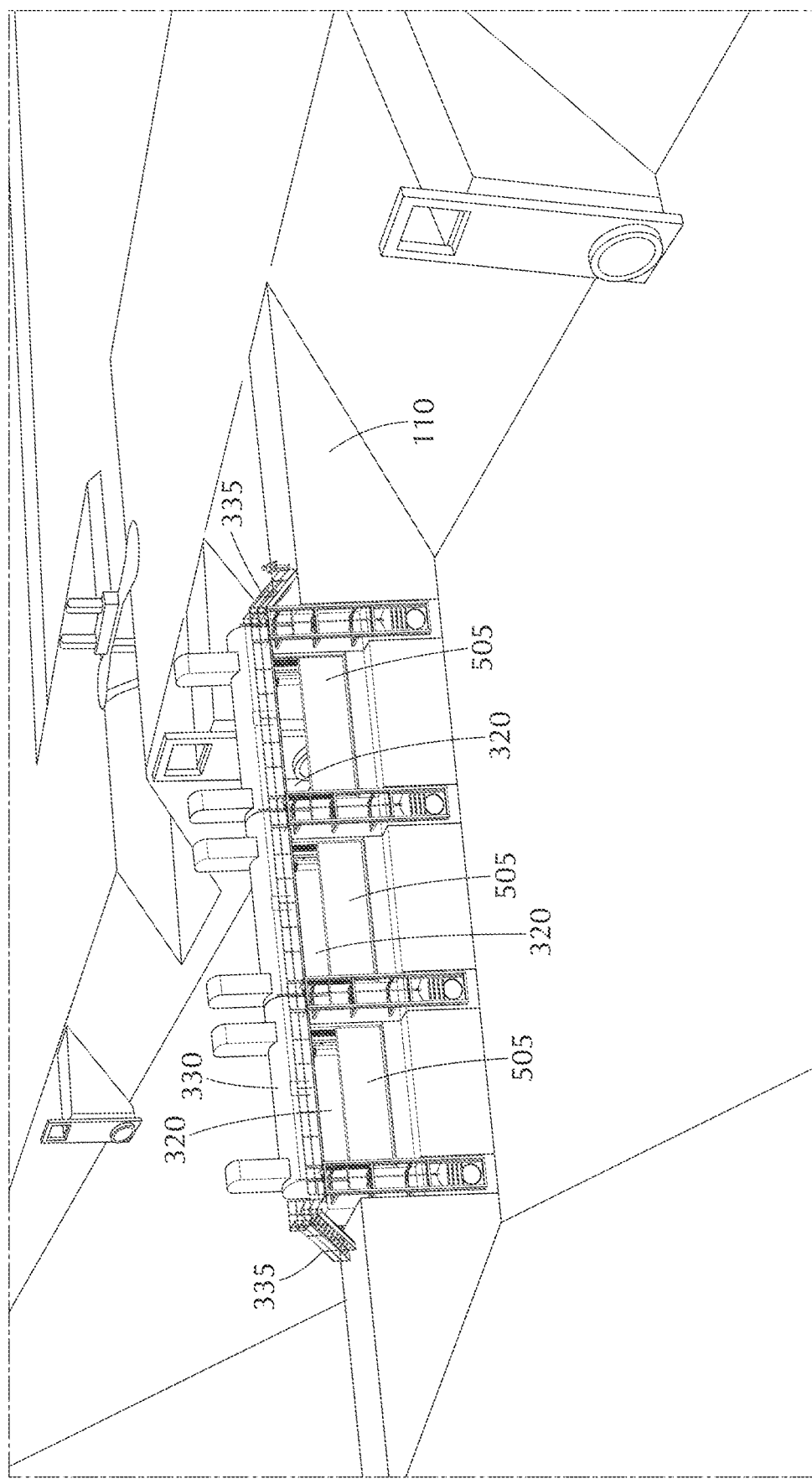
FIG. 5 depicts a primary dam structure with raised movable weir panels according to an embodiment of the invention.

FIG. 5 depicts a primary dam structure 110 according to embodiments of the invention with raised movable weir panels 505 obstructing water flow through the openings 320.

In an embodiment of the invention, a primary dam structure 110 may be traversed, e.g., by workers, by a catwalk 330 or other path above the openings 320. As depicted, stairways 335 on either end may provide access to the catwalk 330.

The dimensions of a primary dam structure 110 and its components in embodiments of the invention will typically depend on many considerations, including, but not limited to, the depth and width of the channel and expected volumes of water and flow rates. For example, in an illustrative embodiment such as FIGS. 3-5 depict, the height of the fixed lower base 125 may be 30 feet from the top of the base portion 310 to the top 340 of the fixed lower base 125. In other embodiments, this height may be, e.g., 5, 7.5, 10, 12.5, 15, 17.5, 20, 22.5, 25, 27.5, 32.5, 35, 37.5, 40, 42.5, 45, 47.5, or 50 feet, or other heights as appropriate for the installation.

In this illustrative embodiment, the bottom of each opening 320 may be twenty feet above the top of the lower base portion 310. Each movable weir panel 505 may be, e.g., 10 feet tall and 30 feet wide. A primary dam structure 110 with these dimensions may thus, when the movable weir panels 505 are raised to their maximum height, form a water barrier rising 30 feet above the base of the channel.

It will be appreciated that in a channel at least 30 feet deep, such a barrier would retain water in the channel, preventing it from flowing downstream, unless and until the water behind the barrier rose to a height exceeding 30 feet.

(It should be noted again that the above dimensions are merely examples describing one possible embodiment of the invention of many, and they do not limit the invention.)

Figure 6:
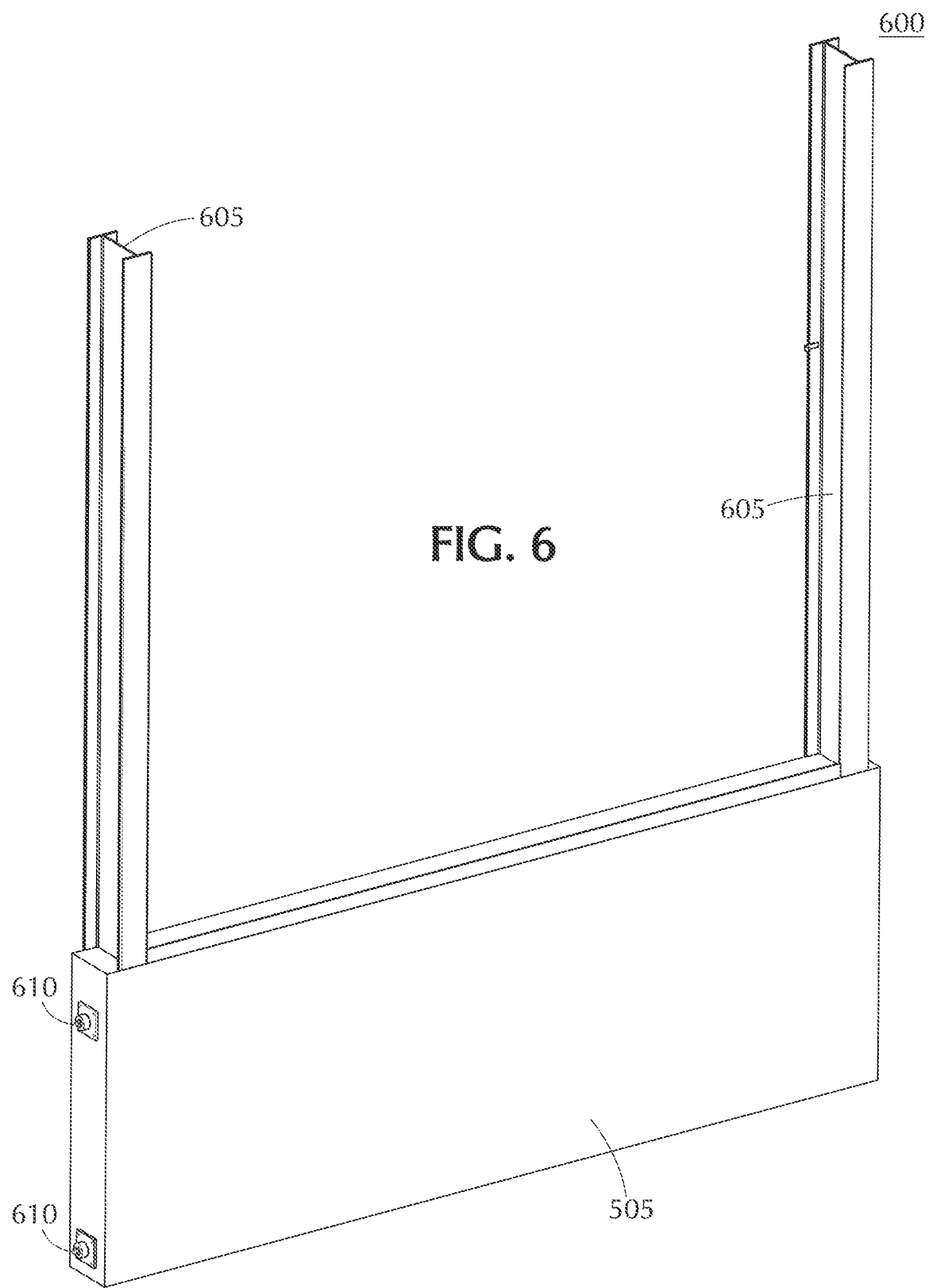
FIG. 6 depicts a movable weir panel assembly according to an embodiment of the invention.

FIG. 6 depicts a movable weir panel assembly 600, including a movable weir panel 505, according to an embodiment of the invention. In embodiments of the invention, the weir panel 505 may be made of any suitable material, e.g., concrete (possibly reinforced with rebar or post-tension rods) or steel. In an embodiment such a FIG. 6 depicts, two beams 605 extend vertically from the movable weir panel 505 for use in raising and lowering the panel 505. For example, in an embodiment of the invention, the bars 605 may be made, e.g., of steel, and embedded in a concrete weir panel 505 when the panel 505 is cast. As depicted, four (e.g., steel) rollers 610 are affixed to the sides of the weir panel 505 to ensure smooth movement of the panel 505 when it is raised and lowered while installed in the larger structure.

In embodiments of the invention, the movable weir panel 505 may incorporate, e.g., a sharp crested weir blade (not pictured) across the top for accurate flow measurement depending on the nappe height.

Figure 7:
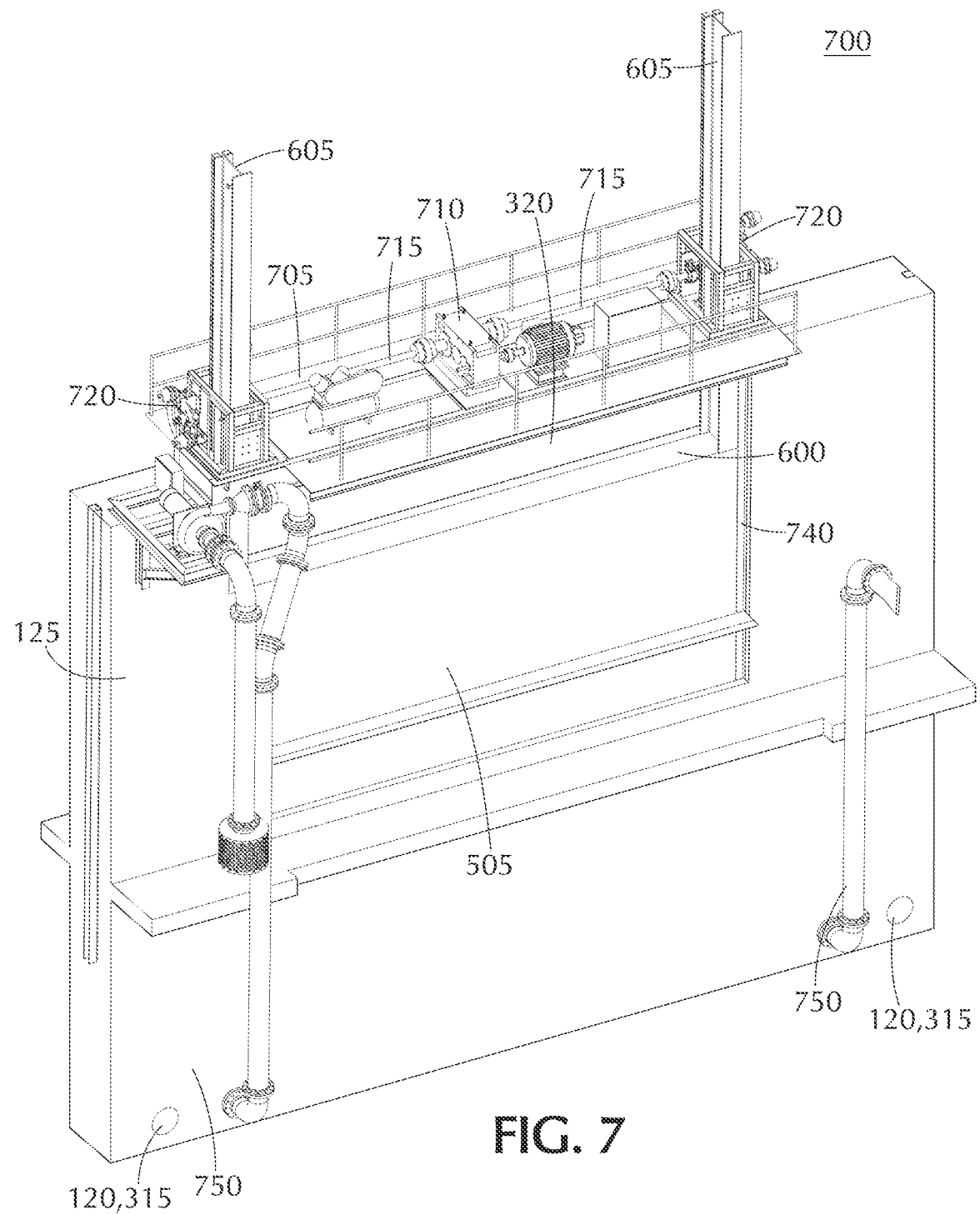
FIG. 7 depicts a segment of a primary dam structure according to an embodiment of the invention.

FIG. 7 depicts a segment 700 of a primary dam structure 110 containing a movable weir panel assembly 600 according to an embodiment of the invention. As depicted, the segment 700 is viewed from upstream, looking downstream.

As depicted, the assembly 600 is inserted into the opening 320 in the fixed lower structure 125. The sides of the opening 320 may be, e.g., recessed, and may contain, e.g., tracks (not pictured), against which the rollers 610 (FIG. 6) may roll to enable smooth and stable vertical movement of the panel 505.

In embodiments of the invention such as FIG. 7 depicts, a steel support assembly 705 may be affixed to the fixed structure 125 and span the top of the opening 320 to support, e.g., the movable panel assembly 600 and the associated drive train 710. The drive train 710 may transmit motive power via driveshafts 715 to, e.g., rack-and-pinion drives 720 coupling the drive train 710 to the vertical bars 605.

Figure 8:
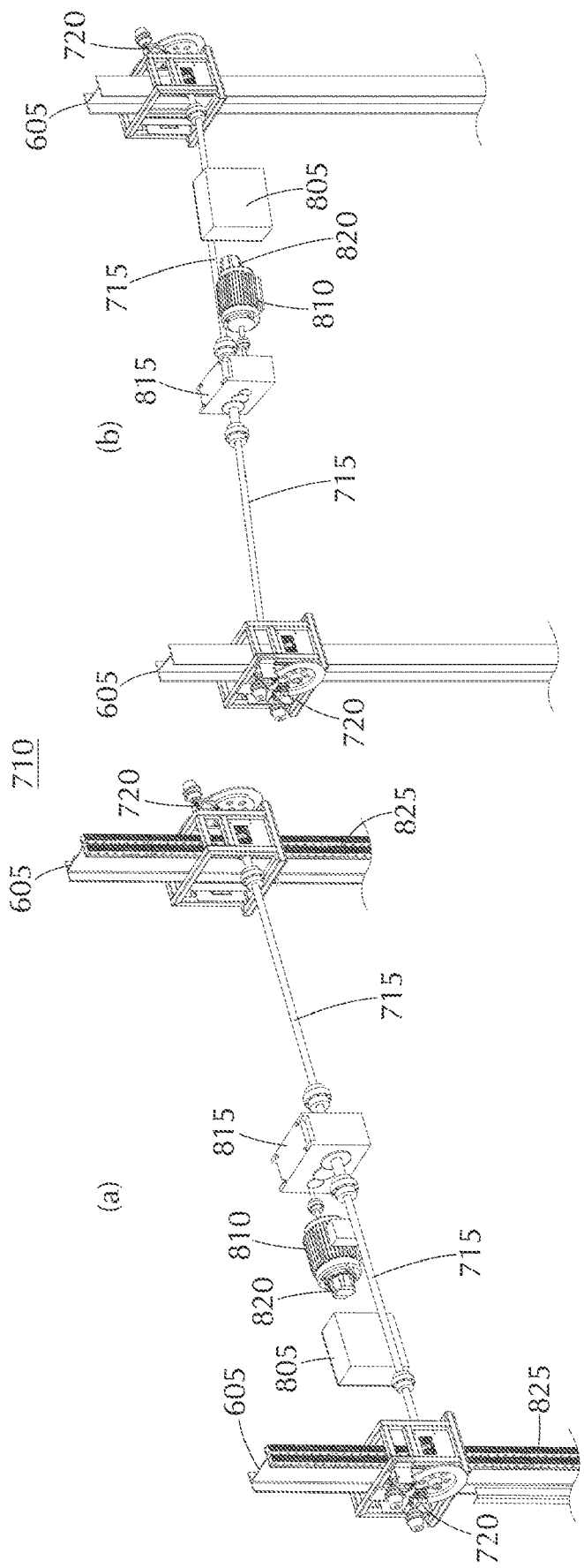
FIG. 8 depicts a movable weir panel assembly engaged with a drive for raising and lowering the moveable weir panel.

FIG. 8 depicts a movable weir panel assembly 600 engaged with a drive train 710 for raising and lowering the moveable weir panel 505, with other components removed for clarity. FIG. 8 depicts the assembly 600 and drive train 710 viewed both from downstream, looking upstream (a), and from upstream, looking downstream (b). As depicted, a variable-frequency drive 805 drives an electric motor 810. The motor 810 is coupled to a gearbox 815, which in turn is coupled to driveshafts 715. Joined to the motor 810 is a motor brake and encoder 820. The motor brake may serve as a redundant brake to lock the panel 505 in place, e.g., during a power outage.

Figure 9:
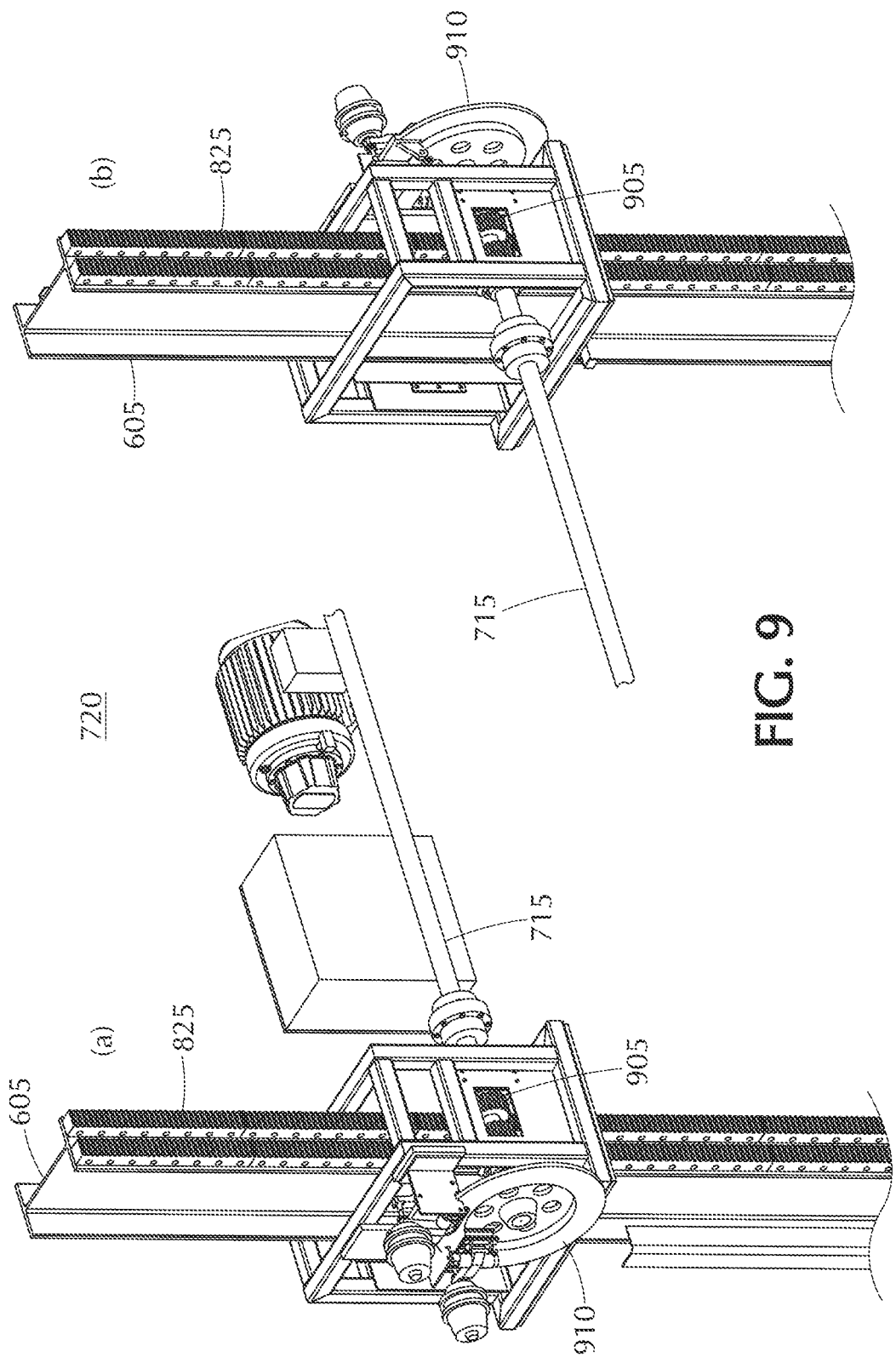
FIG. 9 depicts in detail the rack-and-pinion drive that may raise and lower the movable weir panel in an embodiment of the invention.

The driveshafts 715 transmit power to rack-and-pinion drives 720. In an embodiment such as FIG. 8 depicts, a rack 825 is affixed to the downstream face of each beam 605. FIG. 9 depicts pinion gears 905, driven by the drive shafts 715, engaged with the racks 825. As depicted, brake assemblies prevent uncontrolled movement of the movable weir panel 505.

In an embodiment of the invention, the drive mechanism can fully raise or lower a 10 foot tall movable weir panel, e.g., in 2 minutes.

Figure 10:
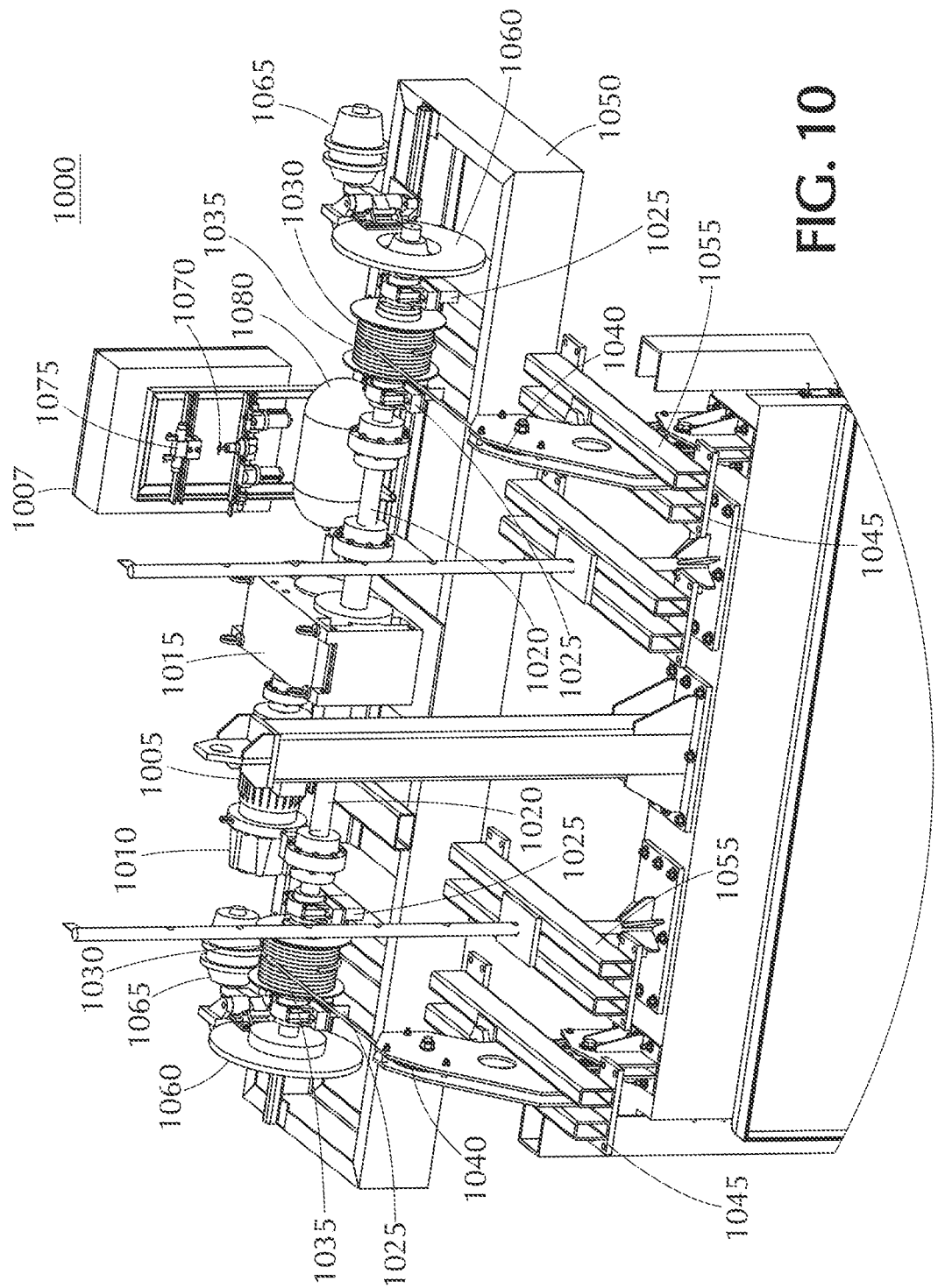
FIG. 10 depicts a winch mechanism according to an alternative embodiment of the invention.

Other principles or mechanisms may be employed in embodiments of the invention to raise and lower movable weir panels instead of or in addition to the rack-and-pinion based mechanism described in connection with FIGS. 6-9. FIG. 10 depicts one such alternative, a winch mechanism 1000, according to an embodiment of the invention.

As depicted, the mechanism is driven by an electric motor 1005, which is itself driven by a variable frequency drive 1007. In the depicted embodiment, the motor 1005 is coupled to a brake 1010. The motor 1005 is also coupled to a gearbox 1015. The gearbox 1015 drives two drive shafts 1020, which are supported by bearings 1025.

Near the end of each drive shaft 1020 distal from the gearbox 1015 is a winch drum 1030. Affixed to each winch drum 1030 and spooled around it is, e.g., a steel cable 1035. The cable 1035 passes over, e.g., a pulley 1040 and descends to the assembly (not pictured) that includes the movable weir panel. The pulley 1040 may be supported, e.g., from a support 1045 extending outward from the winch frame base 1050 that supports the entire assembly. In an embodiment of the invention, the assembly including the movable weir panel may itself include a pulley (not pictured), and in such an embodiment, the cable 1035 may return, e.g., to be affixed to the support 1045 at an attachment point 1055.

In an embodiment such as FIG. 10 depicts, at each end of the drive shaft 1020 may be a disk brake assembly 1060 controlled, e.g., by an actuator 1065 that uses compressed air provided, e.g., by a system including an air regulator 1070, a solenoid valve 1075, and an air tank 1080.

Figure 11:
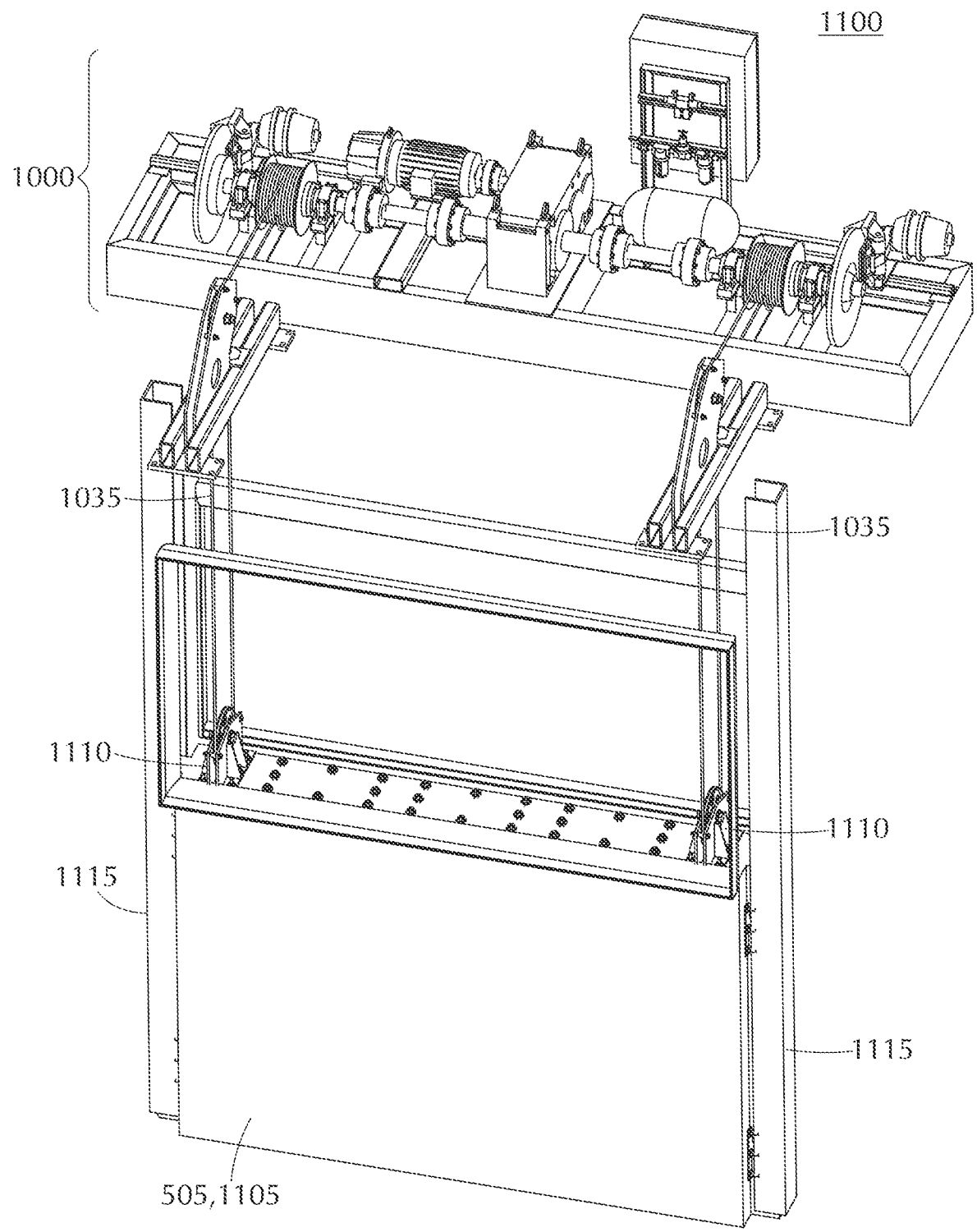
FIG. 11 depicts an assembly including a winch mechanism.

FIG. 11 depicts an assembly 1100 including a winch mechanism 1000, e.g., as FIG. 10 depicts, configured to raise and lower a weir panel assembly 1105 including a movable weir panel 505. As depicted, pulleys or bushings 1110 are affixed to the top of the movable weir panel 505. The steel cables 1035 from the winch mechanism 1000 descend, pass through the pulley or bushing 1110, and ascend to the winch mechanism 1000 again, where the end of the cable 1035 is attached.

According to an embodiment of the invention such as FIG. 11 depicts, the sides of the moveable weir panel 505 may be enclosed, e.g., by guide channels 1115. One or more roller wheels (not pictured) may be affixed to each side of the movable weir panel 505 to ensure smooth movement through the guide channels 1115.

Figure 12:
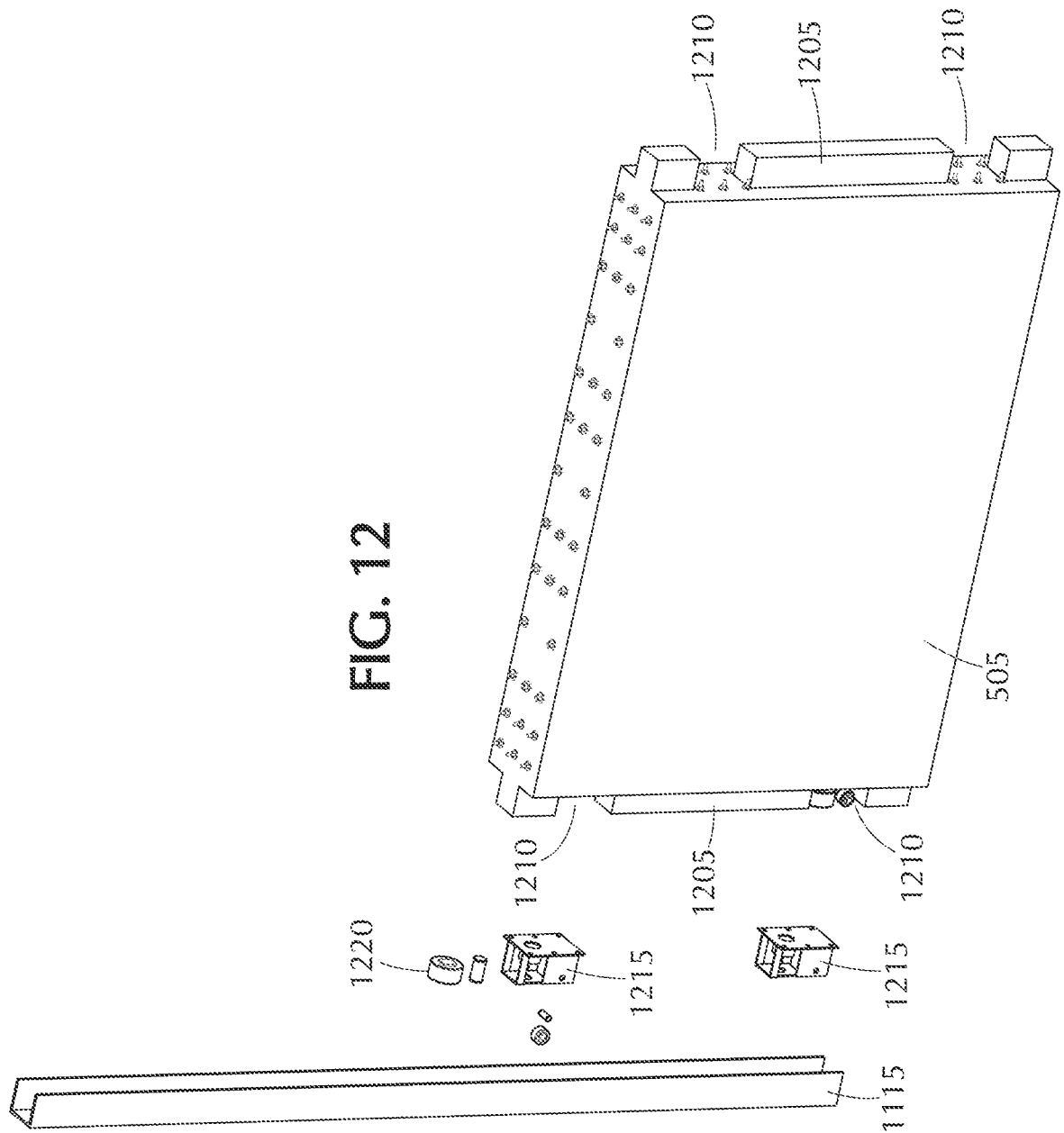
FIG. 12 depicts a movable weir panel according to an embodiment of the invention in a partial exploded view.

FIG. 12 depicts a movable weir panel 505 according to an embodiment of the invention in a partial exploded view. In an embodiment such as FIG. 12 depicts, the side edges 1205 (i.e., not the top or bottom) of the movable panel 505 may be, e.g., indented to fit within the guide channels 1115. Each edge 1205 may also be provided with, e.g., one or more notches 1201 or other shapes configured to receive, e.g., a roller assembly 1215, which may be affixed to the panel 505. Each roller assembly 1215 may comprise, e.g., one or more rollers and/or roller bearings to ensure smooth movement of the panel 505 up and down through the guide channel 1115. (To avoid cluttering the drawing, one guide channel and the associate roller assemblies have been omitted.)

Figure 13:
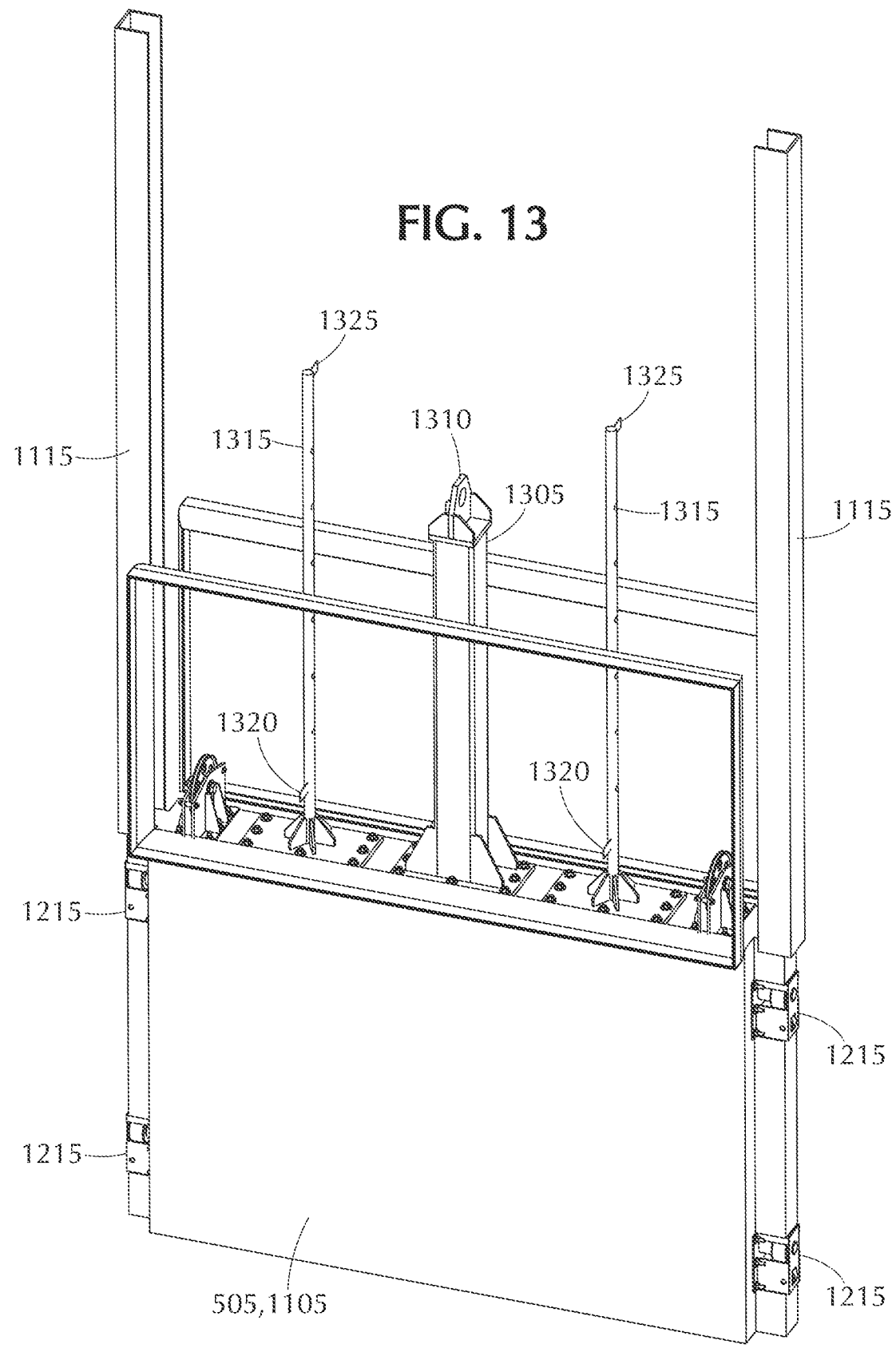
FIG. 13 depicts a weir panel assembly with additional elements affixed according to an embodiment of the invention.

FIG. 13 depicts a weir panel assembly 1105 with additional elements affixed (e.g., bolted) to the top of the movable weir panel 505 according to an embodiment of the invention. Arising from the center of the movable panel 505 is a redundant hoist support 1305. The redundant hoist support 1305 may be, e.g., a steel beam with a loop 1310 at the top capable of receiving a hook from a winch (not pictured). This may in an embodiment of the invention allow a redundant winch to hoist the movable panel 505 into place if the main mechanism 1000 fails somehow.

Figure 14:
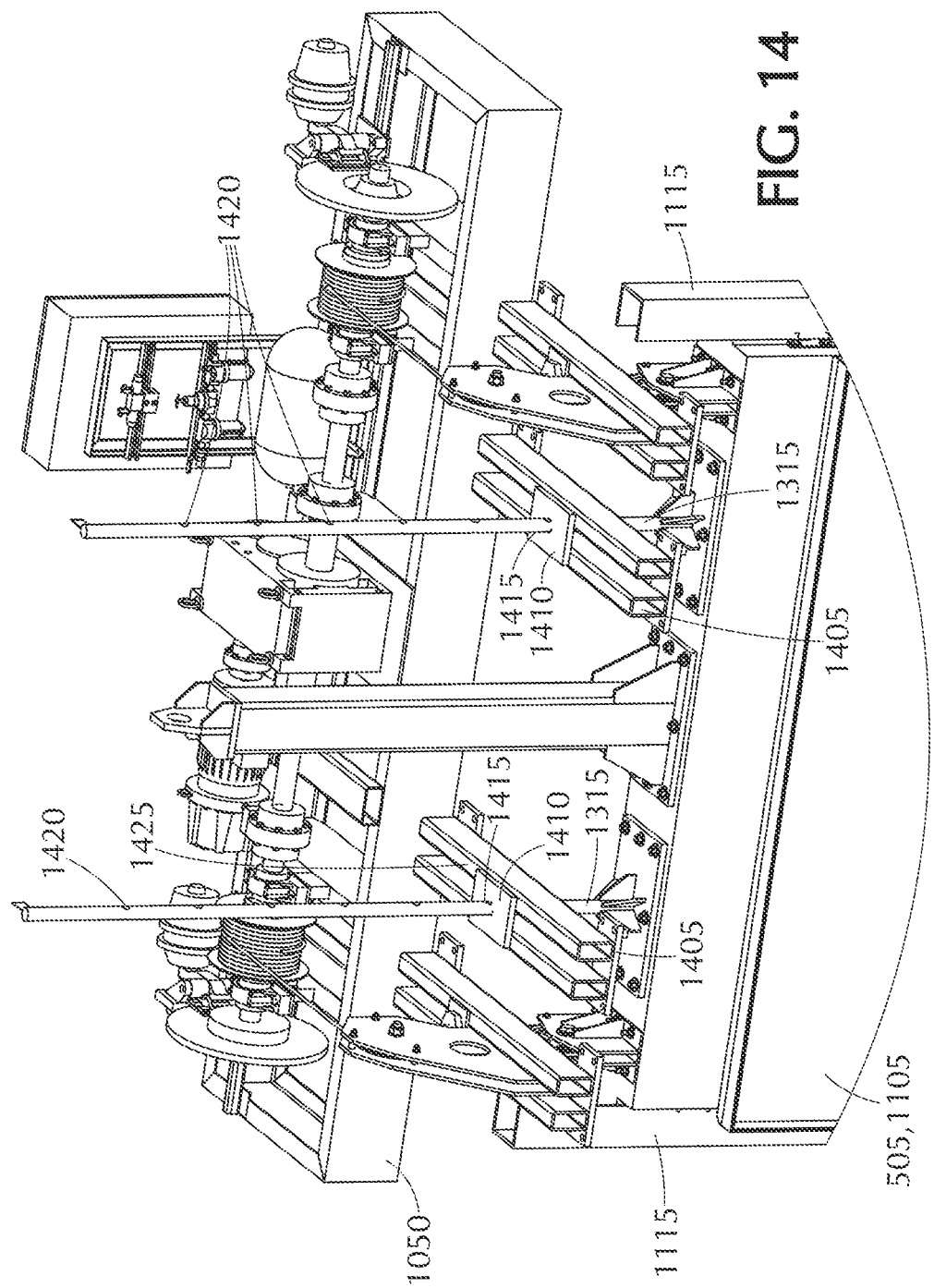
FIG. 14 depicts the functions of upstop posts in connection with header elements, in an embodiment of the invention.

On either side of the redundant hoist support 1305, in the depicted embodiment, are two upstop posts 1315, also affixed to the top of the movable weir panel 505. FIG. 14 depicts the functions of the upstop posts in connection with header elements, in an embodiment of the invention. As FIG. 14 depicts, two wall uplock supports 1405 are attached to the winch frame base 1050 and project horizontally from it. As depicted, each wall uplock support 1405 comprises a plate 1410 with a hole 1415 in it.

In an embodiment such as FIG. 14 depicts, when the weir panel assembly 1105 is in place (i.e., with the edges of the weir panel 505 installed in the guide channels 1115), the upstop posts 1315 protrude through the holes 1415. Also as depicted, each upstop post 1315 has a series of lateral holes 1420—in one exemplary embodiment of the invention, the holes may be evenly spaced, one foot apart, but this spacing is not required. In an embodiment of the invention, when the weir panel 505 has reached the desired height, e.g., steel pins (not pictured) may be inserted into each upstop post 1315, in the holes 1420 immediately above the wall uplock supports 1405, keeping the panel from descending until the pins are removed. In an embodiment of the invention, the pins may be inserted and removed manually; alternatively, in an embodiment of the invention, the pins may be inserted and removed, e.g., by an electric linear actuator (not pictured).

As FIG. 13 depicts, each upstop post includes lower 1320 and upper 1325 limit switch flags. Further, as FIG. 14 depicts, limit switches 1425 are affixed to one or both of the wall uplock supports 1405. In embodiments of the invention, the limit switches 1425 and limit switch flags, 1320, 1325 may be used to detect automatically when the movable panel has reached the upper and lower boundaries of its movable range, causing the motor to stop raising or lowering the movable panel, as appropriate.

Figure 15:
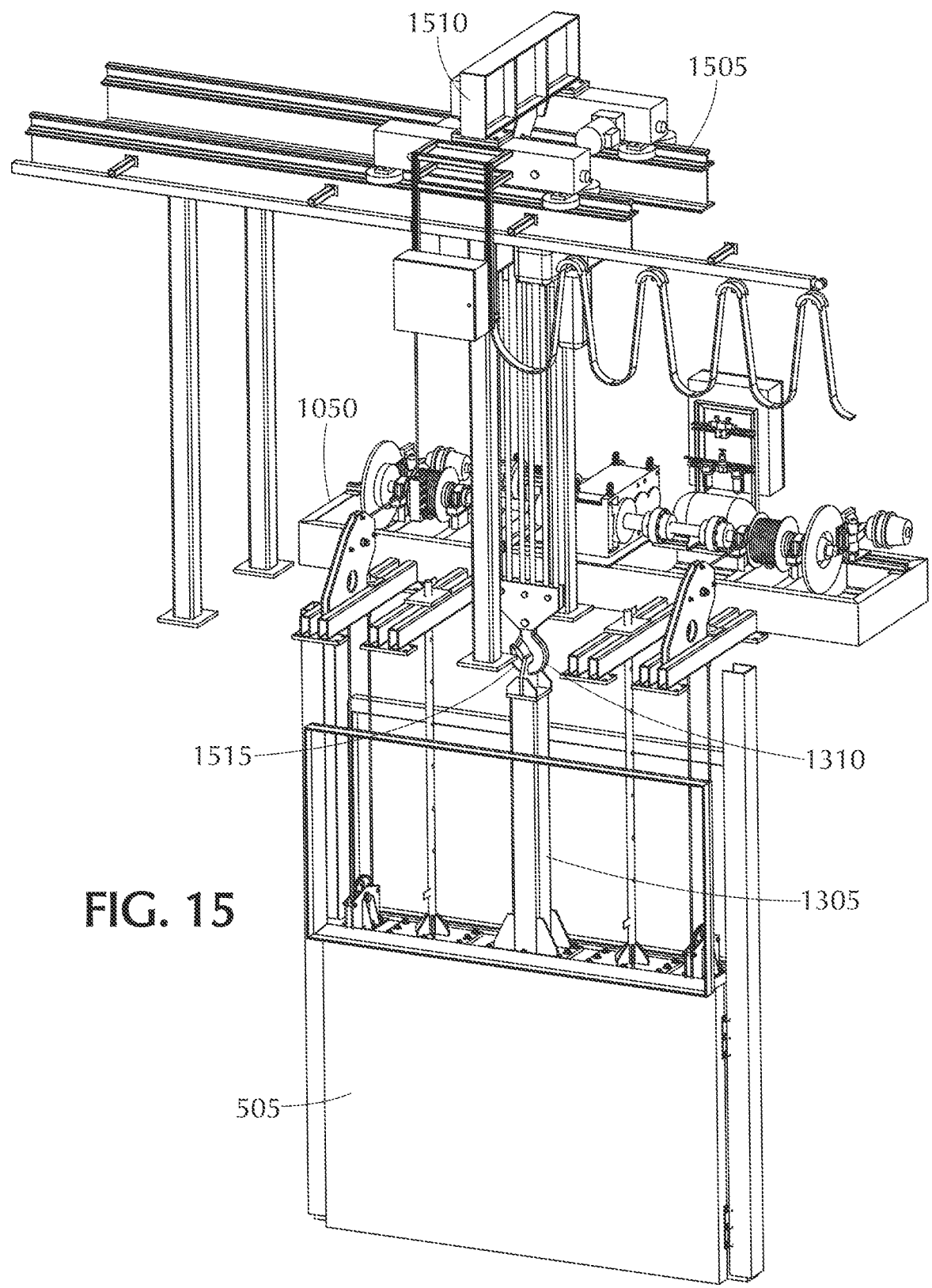
FIG. 15 depicts a redundant hoist according to an embodiment of the invention.

Alternate means may be provided in embodiments of the invention to allow raising a movable weir panel 505, e.g., in case of drive failure. For example, in an embodiment such as FIG. 15 depicts, the winch frame base 1050 may support, e.g., a track 1505 supporting, e.g., a movable, electrically-operated hoist 1510. In an embodiment of the invention, the track may extend, e.g., over the length of the dam structure, allowing the hoist 1510 to be manually placed directly over all of the movable panels 505. In case of drive failure, the hoist 1510 may be moved to a position over the affected movable weir panel 505. A hook 1515 or other connector may descend from the hoist 1510 and engage, e.g., with the loop 1310 at the top of the redundant hoist support 1305. The hoist 1310 may then be operated to raise or lower the movable weir panel 505 as desired.

Returning to FIG. 7, an elastomer seal 740 may limit ingress, e.g., of water, debris, or both into the structure, e.g., around the sides and bottom of the movable weir panel 505. In embodiments of the invention, seals may be provided along both the upstream and downstream faces of the weir panel. Additionally, in an embodiment of the invention, a spurger pipe system may connected, e.g., at the base of the foundations in a continuous pipe system 750, to allow water to be injected to rinse debris from the foundation base and also to vacuum out the water when complete.

Figure 16:
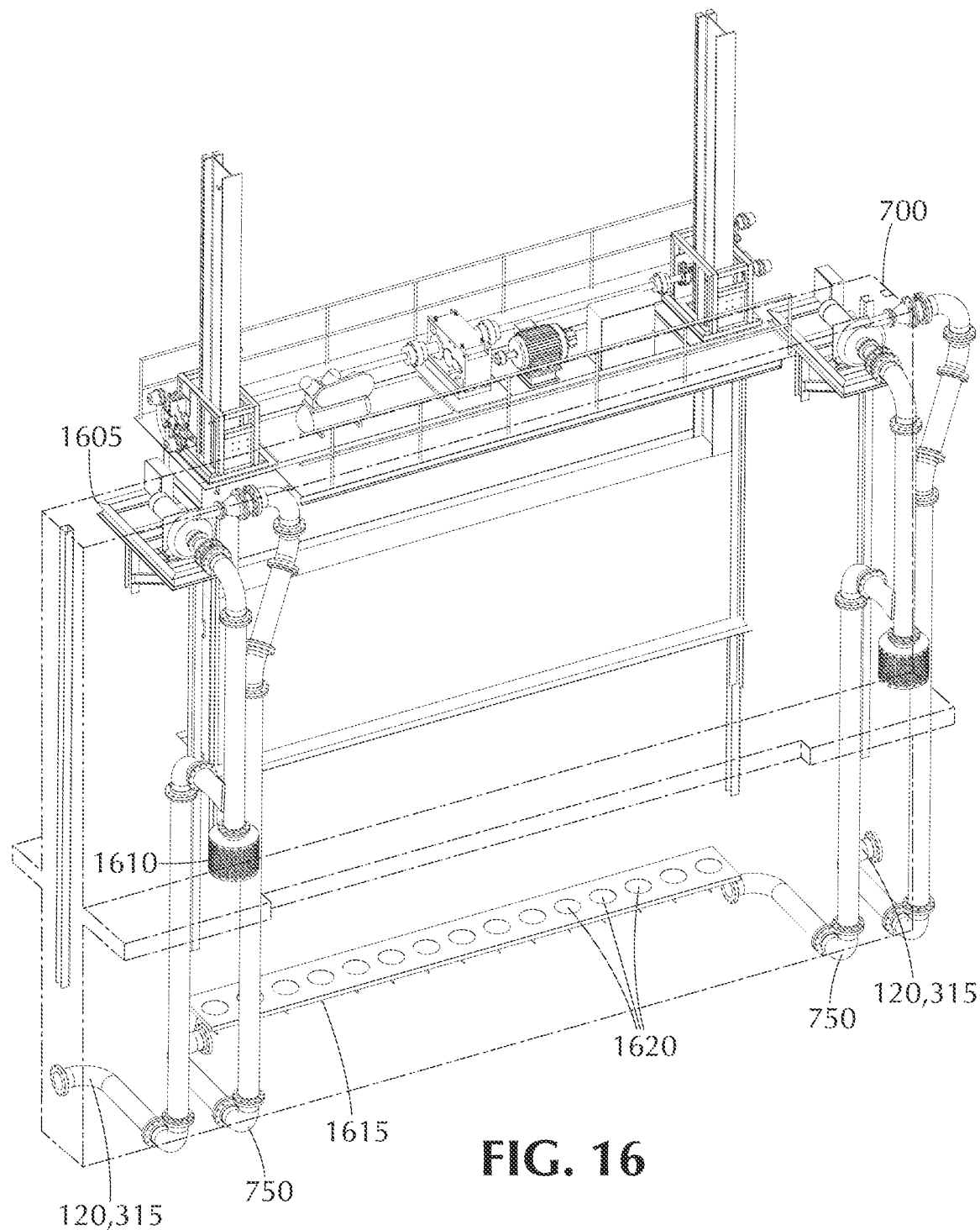
FIG. 16 depicts a pipe system for flushing sediment from the foundation of a dam structure according to embodiments of the invention.

Embodiments of the invention may include a clean-out feature. FIG. 16 depicts a pipe system 750 relative to a cutaway view of a segment 700 of a dam structure 110, according to an embodiment of the invention. In an embodiment such as FIG. 16 depicts, a pump 1605 driven, e.g., by an electric motor, draws in water, e.g., through a screened intake 1610. The water is then forced under pressure into the base of the foundation. Within the foundation, a flapper system or sediment trap 1615 may be placed. As depicted, for example, the sediment trap 1615 may be a substantially planar piece of metal spanning the base of the foundation at a height just above the entry point of water into the foundation. Also as depicted, the surface of the sediment trap 1615 may be interrupted, e.g., by a series of large holes 1620 to allow sediment to settle to the bottom of the foundation.

For each hole 1620, in an embodiment of the invention, there may be a respective flap (not pictured) that is large enough to block the hole 1620 attached, e.g., to the underside of the sediment trap 1615, e.g., by a respective hinge (not pictured) adjacent to the hole 1620. The pressure of water pumped into the foundation may in such an embodiment force the flaps closed, allowing water to flush accumulated sediment from the foundation and to be discharged with the water, e.g., through a check valve to a discharge port 1025.

In embodiments of the invention, smaller pipes (not pictured) may be present to drain the wall pocket to the sluice pipe drain once water level drops to normal.

In an embodiment of the invention, the clean-out system may be automatically activated. In such an embodiment, a turbidity sensor (not pictured) inside the base of the foundation may cause an electronic controller to engage the clean-out feature, e.g., when silt and sediment build-up becomes overwhelming to the system.

FIG. 17 depicts a dam structure 110 supported by piles 1705 according to an embodiment of the invention. In an embodiment of the invention, for example, each pile may be a steel pipe 20 inches in diameter with wall thickness of 0.5 inches. Each pile may be filled, e.g., with concrete, and, e.g., hooked rebar may extend from the top of each pile. In such an embodiment, the fixed lower dam structure 125 (FIG. 1) may be cast in place once placement of the piles 1705 has been completed, e.g., to produce a pile cap that may serve as an intermediary structure between the piles and the lower dam structure 125. FIG. 18 depicts from above the placement of piles 1705 relative to a fixed dam base according to an exemplary embodiment of the invention. (To prevent obscuring the drawing with excessive reference lines, not every pile has been identified with a reference line in FIGS. 17 and 18.)

Figure 19:
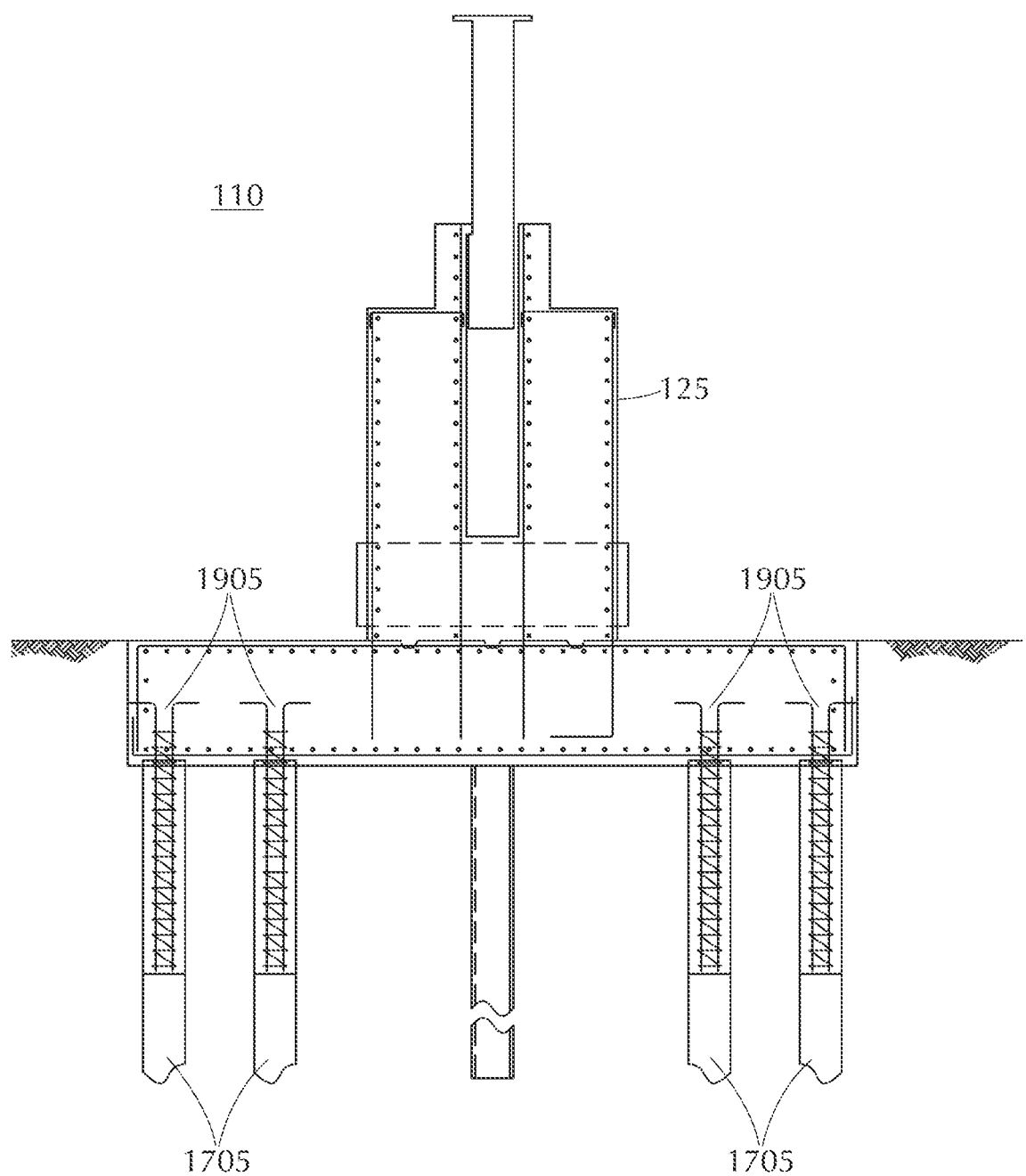
FIG. 19 depicts a cross section of a dam supported by piles according to an embodiment of the invention.

FIG. 19 is a transverse cross section of a dam structure 110 according to an embodiment of the invention, depicting the relative positions of the first lower dam structure 125 and piles 1705. FIG. 19 depicts hooked rebar 1905 extending from the top of the piles 1705 as described above.

As depicted, e.g., by FIG. 4, each sluice 120 is controlled by a gate 410. In an embodiment of the invention such as FIG. 4 depicts, the gates 410 are large steel panels which slide inside tracks vertically to either open or close the large diameter bypass pipes. Each sluice gate may be powered, e.g., by a 120 VAC electric motor and vertical Acme thread screw actuator (not pictured) at the bridge 330 level. A position sensor (not pictured) may indicate the gate position to the controller.

Figure 20:
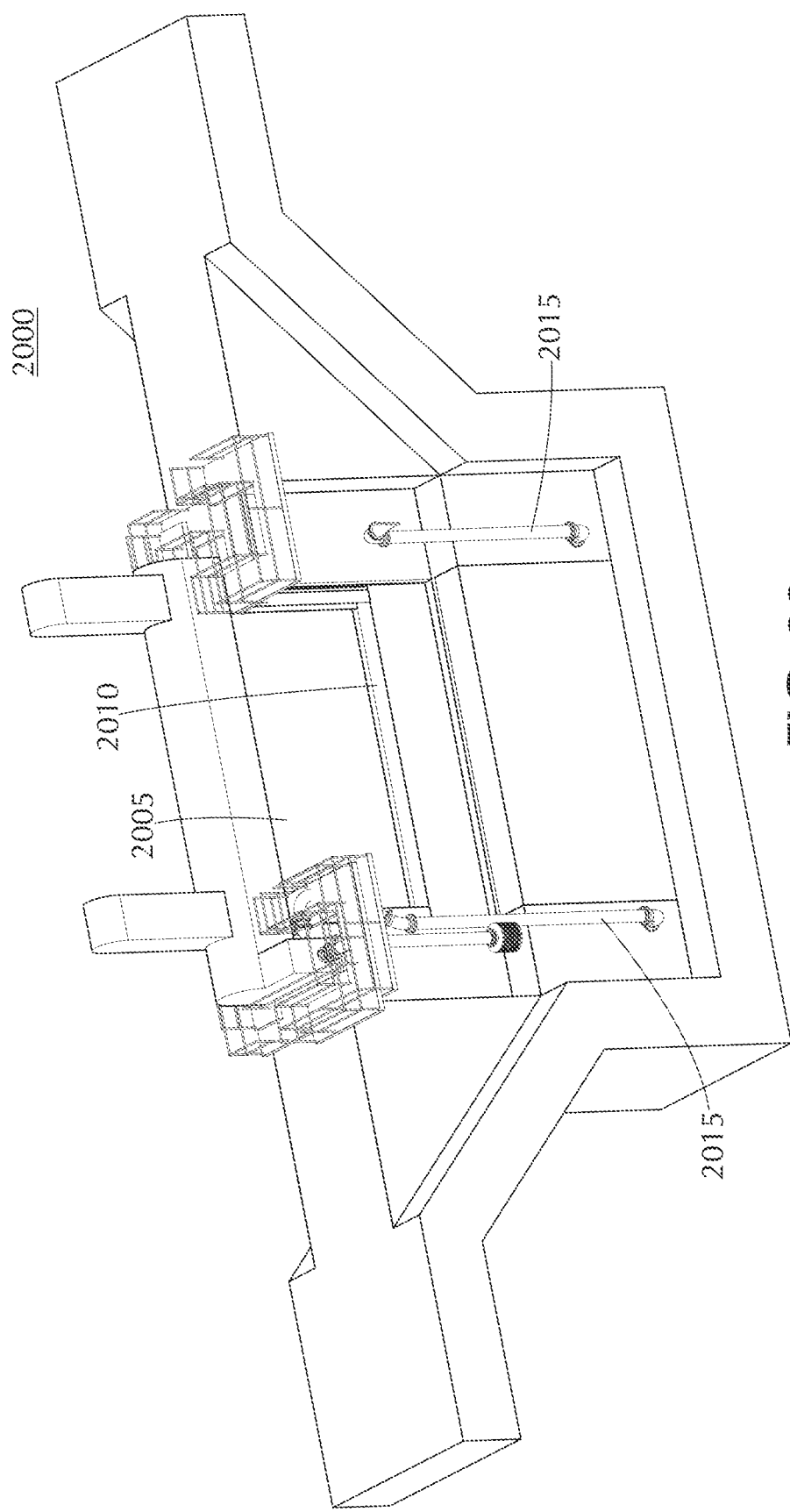
FIG. 20 and FIG. 21 depict a detention weir according to an embodiment of the invention.
Figure 21:
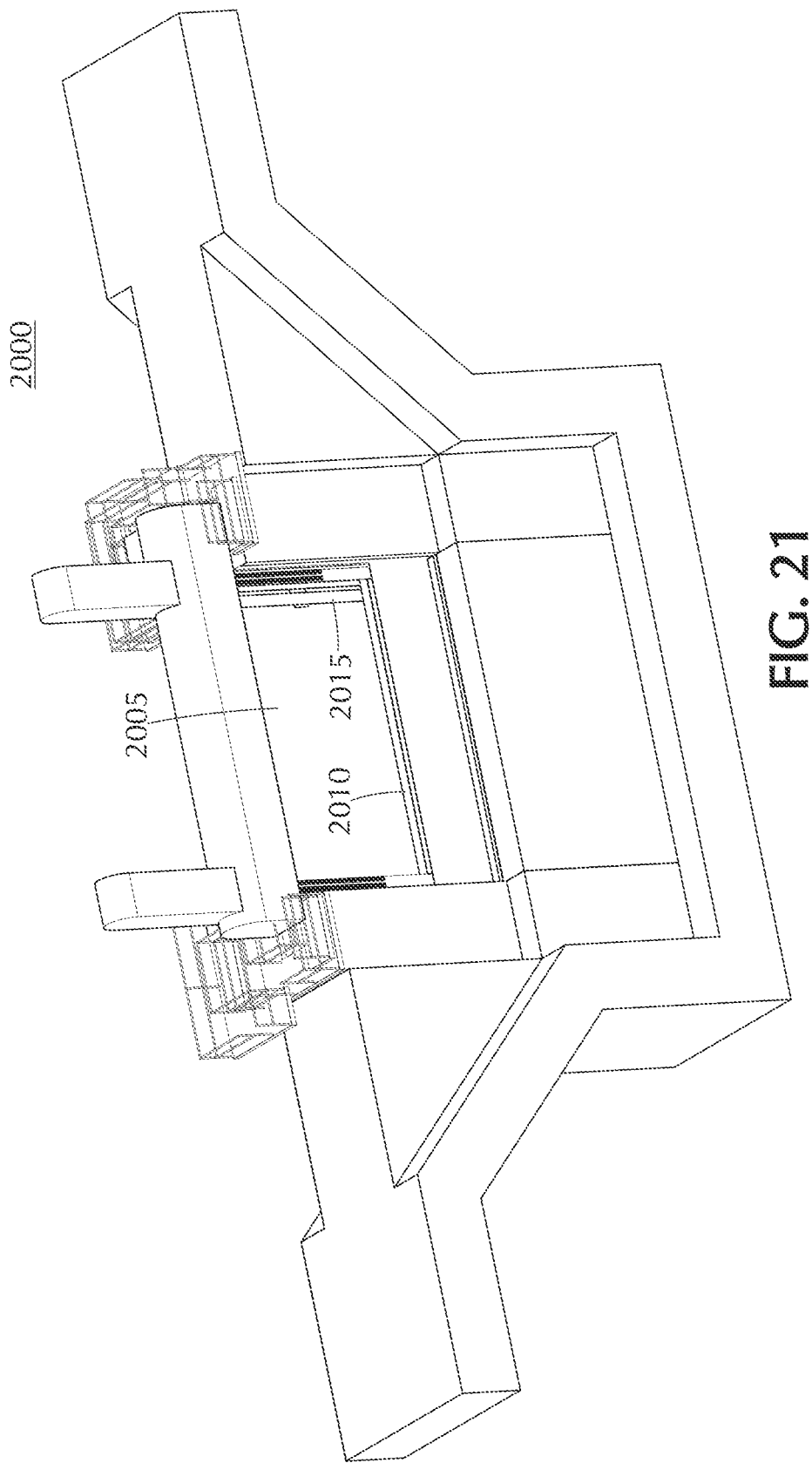

As FIG. 1 and FIG. 2 depict, a secondary dam structure 145 (also referred to as a "detention weir") may control flow of water, e.g., through the concrete channel 135 between the main channel and the detention pond. FIG. 20, and FIG. 21 depict a detention weir 2000 according to embodiments of the invention. FIG. 20 depicts a detention weir 2000 from upstream, looking downstream; and FIG. 21 depicts the weir from downstream, looking upstream. (For clarity, "upstream" with regard to the secondary channel 135 means the direction from the main channel 115 to the detention pond 130, and "downstream" means the opposite direction.)

In embodiments of the invention, the construction, features, and operation of a detention weir 2000 will be similar to a primary dam 110. The depicted detention weir has a single opening 2005, which may be controlled, e.g., by a single movable weir panel 2010. (FIG. 20, and FIG. 21 depict the movable weir panel in its fully lowered position.) In other applications, the detention weir may comprise, e.g., other openings and panels (not pictured).

Again, in common with the primary dam structure 110 (FIG. 1), the detention weir 2000 (FIG. 20 and FIG. 21) may be raised and lowered by a rack-and-pinion drive (not pictured) driven by an electric motor (not pictured). The detention weir may comprise a clean-out system 2015, which may be, e.g., manually or automatically activated.

In an embodiment of the invention as FIG. 1 depicts, three drainage pipes provide another path for water to flow from the detention pond 130 to the main channel 115. FIG. 21 depicts an example of such a drainage pipe 2200 according to an embodiment of the invention. As depicted, the drainage pipe 2200 comprises a screened intake 155 and a discharge 150. An electrically operated sluice gate 2205 may control flow of water through the drainage pipe 2200 in embodiments of the invention.

Figure 22:
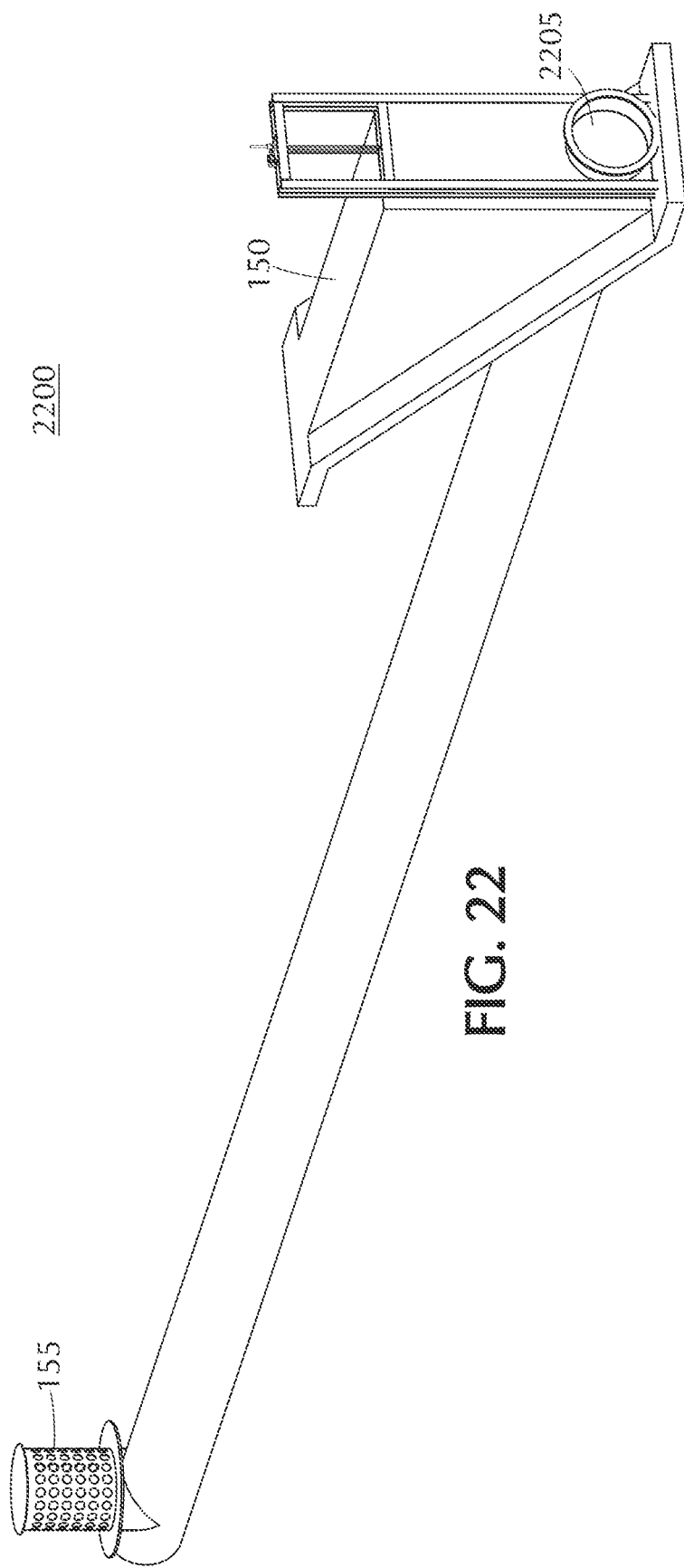
FIG. 22 depicts a drainage pipe according to an embodiment of the invention.

As depicted, the drainage pipe 2200 does not comprise any pumping system. It will be appreciated that in an embodiment such as FIG. 22 depicts, draining will be driven by gravity, and so the intake 155 in such an embodiment will be higher than the discharge.

Figure 23:
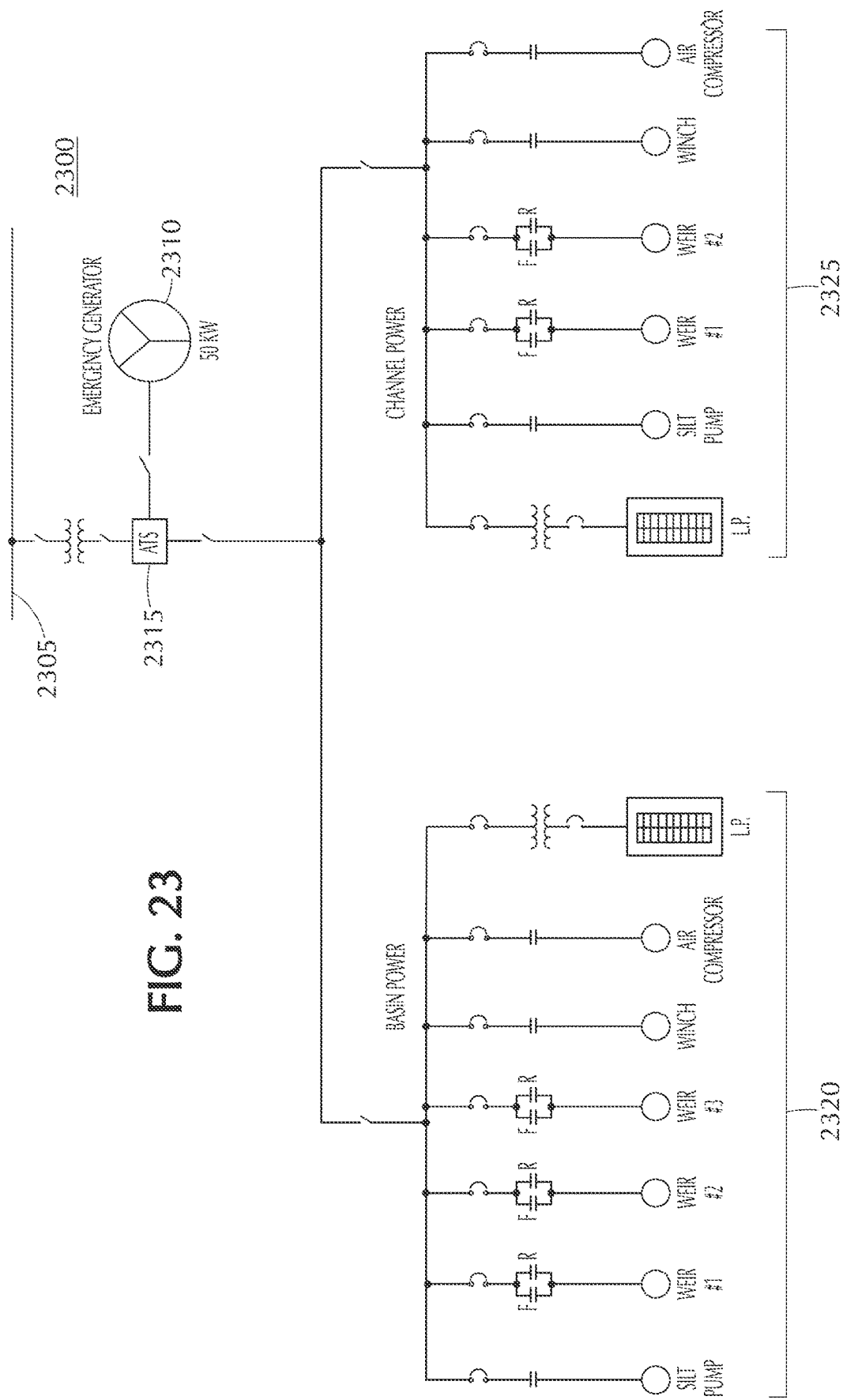
FIG. 23 depicts electrical distribution according to an embodiment of the invention.

FIG. 23 depicts schematically and electrical distribution network 2300 according to an embodiment of the invention. Mains power 2305 may in an embodiment serve as the primary power source for an installation 100. An emergency generator 2310 may be provided as a backup power source and be engaged, e.g., automatically by an automatic transfer switch 2315, when mains power 2305 is interrupted. Power from either source may then be supplied, e.g., by one trunk to the systems 2320 associated with the detention pond 130 and by another trunk to the systems 2325 associated with the primary dam structure 110.

Figure 24:
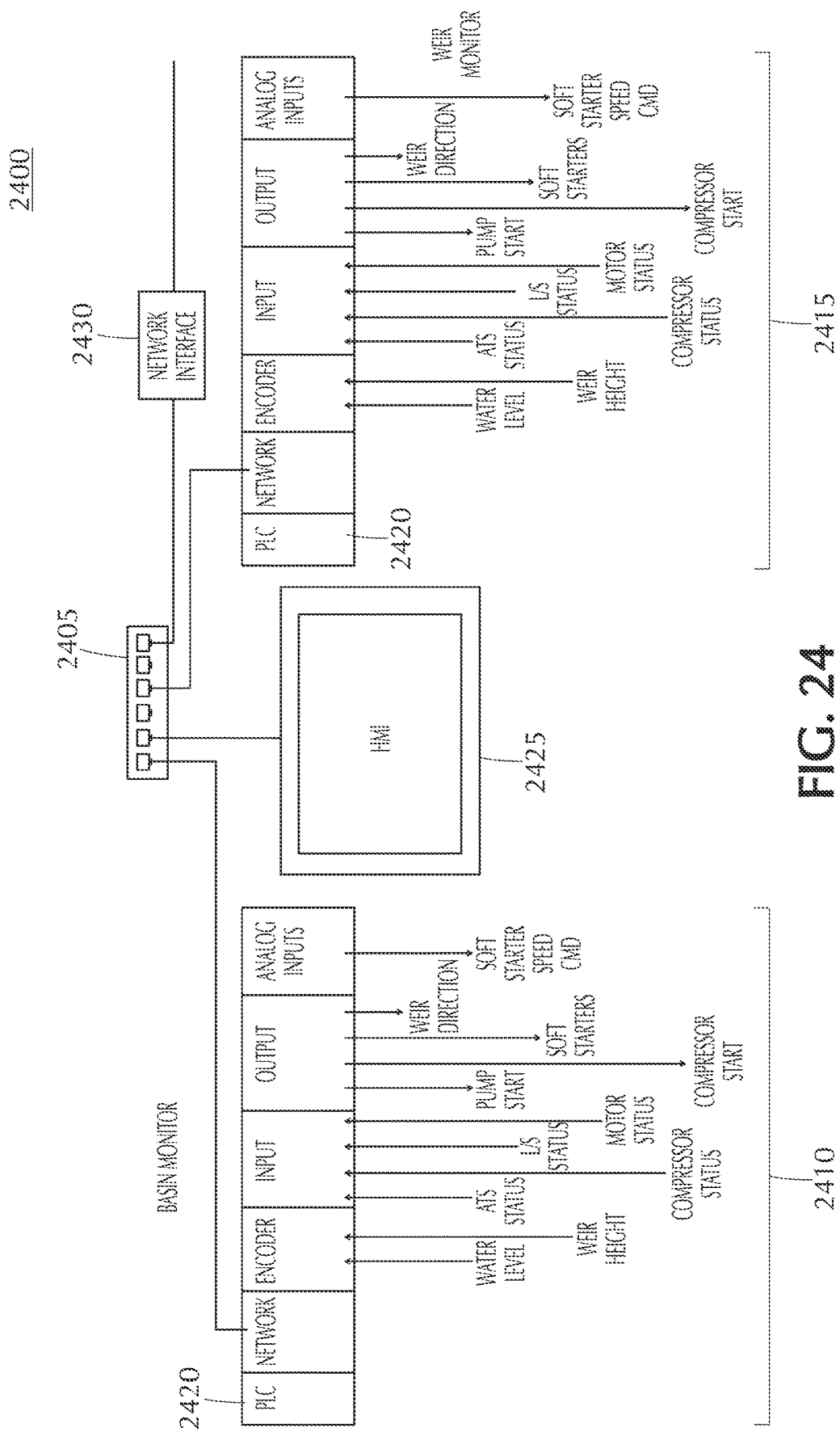
FIG. 24 depicts control connections according to an embodiment of the invention.

FIG. 24 depicts conceptually elements of a network 2400 of control links according to an exemplary embodiment of the invention. In the depicted embodiment, a network hub 2405 may be used to interconnect, e.g., a monitoring and control unit 2410 for the systems associated with the detention basin and a second monitoring and control system 2415 associated with the primary dam structure 110. Each monitoring and control system 2410, 2415 may include, e.g., a programmable logic controller 2420 and may be interfaced with a common human-machine interface 2425, which may, e.g., allow manual control and/or local monitoring of the system 100.

As FIG. 24 depicts, the monitoring and control systems 2410, 2415 may interface, e.g., with on-site water level sensors. They may also control the drive motors, e.g., as FIG. 8 depicts and/or similar motors in a detention weir 2000 (FIGS. 20 and 21). As FIG. 8 depicts, the drive motor 810 may be controlled, e.g., by a variable frequency drive (VFD) 805 via data signal to allow smooth ramp up and ramp down speed and to sense, e.g., the limit switches/encoders at the wall for positioning. Depending on the embodiment, the systems may also direct, e.g., the detention pond sluice gate and/or drains depending on the location relative to the primary dam structure 110.

Some or all control systems and/or networking components that FIG. 24 depicts may be provided with a battery backup (not pictured).

In embodiments of the invention, the integrated system 100 may be controlled, e.g., by a central control computer (not pictured) with, e.g., remote operator stations and/or remote handheld RF units. A network interface 2430 may allow the control network 2400 to communicate with the central control computer, e.g., via a WAN. In embodiments of the invention, the sensors discussed above may detect, e.g., water levels and/or fill rates. In response, the remote control computer, the monitoring and control systems 2410, 2415, or the two systems in combination may then sequence the rising of the walls and position of the sluice gates.

Table 1 presents an illustrative sequence of operation of an integrated system, according to an embodiment of the invention, during a heavy rain event such as a hurricane. Such a sequence may, e.g., reflect human operation or may be followed, e.g., automatically by a central control computer and/or control system as discussed above.

TABLE I

Operation Sequence

| Description | Main Weir Wall | Main Weir Flow | Sluice Gates | Detention Pond Flow | Detention Pond Weir Wall | Detention Pond Drain-Upstream | Detention Pond Drain-Downstream |
|---|---|---|---|---|---|---|---|
| no rain | down | none | open | none | down | closed | closed |
| normal rain (10 feet) | down | none | open | none | down | closed | closed |
| heavy rain (20 feet) | down | overflow | open | none | down | closed | closed |
| extended rain (25 feet) | mid | overflow | closed | inflow | down | closed | closed |
| hurricane (30 feet) | up | none | closed | inflow | down | closed | closed |
| hurricane-stopped-water held | up | none | closed | none | up | closed | closed |
| hurricane over-slow draining | up | none | open | none | up | closed | open |
| slow drain | mid | none | open | none | up | open | open |
| final drain | down | none | open | outflow | down | open | open |
| reset | down | none | open | none | down | closed | closed |

A more extended sequence of operation of an exemplary embodiment is described in more detail below in connection with FIGS. 25-36.

SYSTEM DRY: During normal rainfall seasons, there may be no significant water in the main channel. Any water that may be in the channel is allowed to flow through the primary structure via sluice pipes and gates which are open. (FIG. 25)

NORMAL WATER UP TO 10 FT: During a normal heavy rain event, according to this embodiment, water may be allowed to flow through the primary structure via open sluice gates. (FIG. 26)

HEAVY RAINFALL UP TO 20 FT: The flow rate may exceed the sluice capacity, allowing the water level behind the primary structure to rise. Water is allowed to flow over the lowered weir walls thus holding back some of the water in the upstream canal. Some water may typically flow into the detention pond as the detention walls are down. The sluice gates may be open or closed depending on the desired flow rate. (FIG. 27)

HEAVY RAINFALL UP TO 25 FT: Water is allowed to flow over the partially raised weir walls, thus holding back some of the water in the upstream canal. Water will typically flow into the detention pond as the detention walls are down. The sluice gates may be open or closed depending on the desired flow rate. (FIG. 28)

FULL 30 FT: The weir walls are raised to their full height in this embodiment, blocking water flow downstream. Water is backed up in the upstream main canal and into the detention pond with the detention walls down. The sluice gates may be open (FIG. 29) or blocked, fully obstructing flow (FIG. 30).

Figure 31:
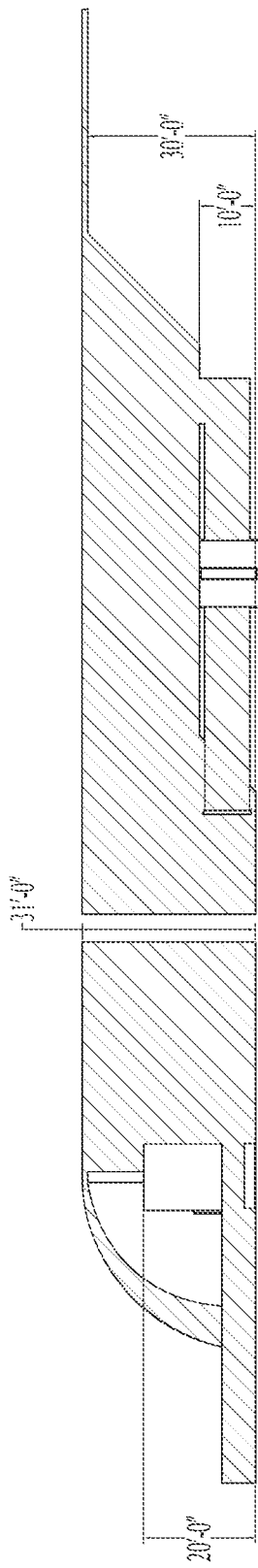
Figure 32:
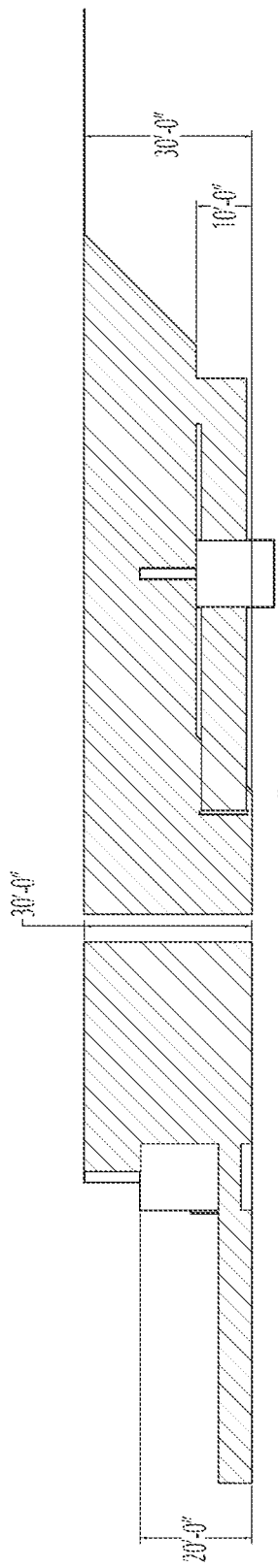

FULL WITH OVERFLOW 30+ FT: Excess water may flow over the weir walls in their full extended height. The detention pond is full. (FIG. 31)

FULL 30 FT: The weir walls are in their full height blocking water flow downstream. Water is backed up in the upstream main canal and into the detention pond but no longer flows over the weir walls. (FIG. 30)

Figure 33:
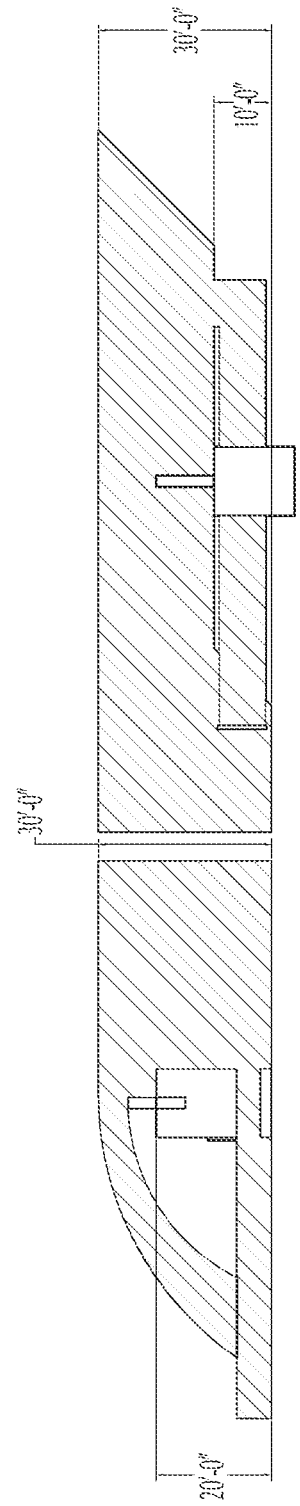

SLOW DRAIN 30 FT: As the rain event passes, the detention pond walls are raised to trap the water in the detention pond. The weir wall sluice gates are opened to allow the upstream water to drain, but to do so slowly to prevent flooding downstream. (FIG. 32) If faster draining is desired, the weir walls may be lowered, e.g., by 5 feet. (FIG. 33)

SLOW DRAIN 25 FT: As conditions (e.g., downstream) allow, the downstream pond drain may be opened to allow some of the detention pond water to drain. The weir wall sluice gates are still open allowing the upstream main canal water to drain also. Again, depending on conditions, the detention pond wall may be lowered slightly to allow even more water to drain from the detention pond to the main canal. The main weir walls may be lowered to match the water level at 25 ft. (FIG. 34)

SLOW DRAIN 20 FT: As conditions allow, the all pond drains are opened to allow the detention pond water to drain. The weir wall sluice gates are still open allowing the upstream main canal water to drain also. The detention pond wall is lowered to allow water to drain from the detention pond to the main canal. The main weir walls may be lowered fully. (FIG. 35)

FINAL DRAIN: Water will drain completely from the detention pond and all upstream water is drained to reset the system for the next event. (FIG. 36)

Figure 37:
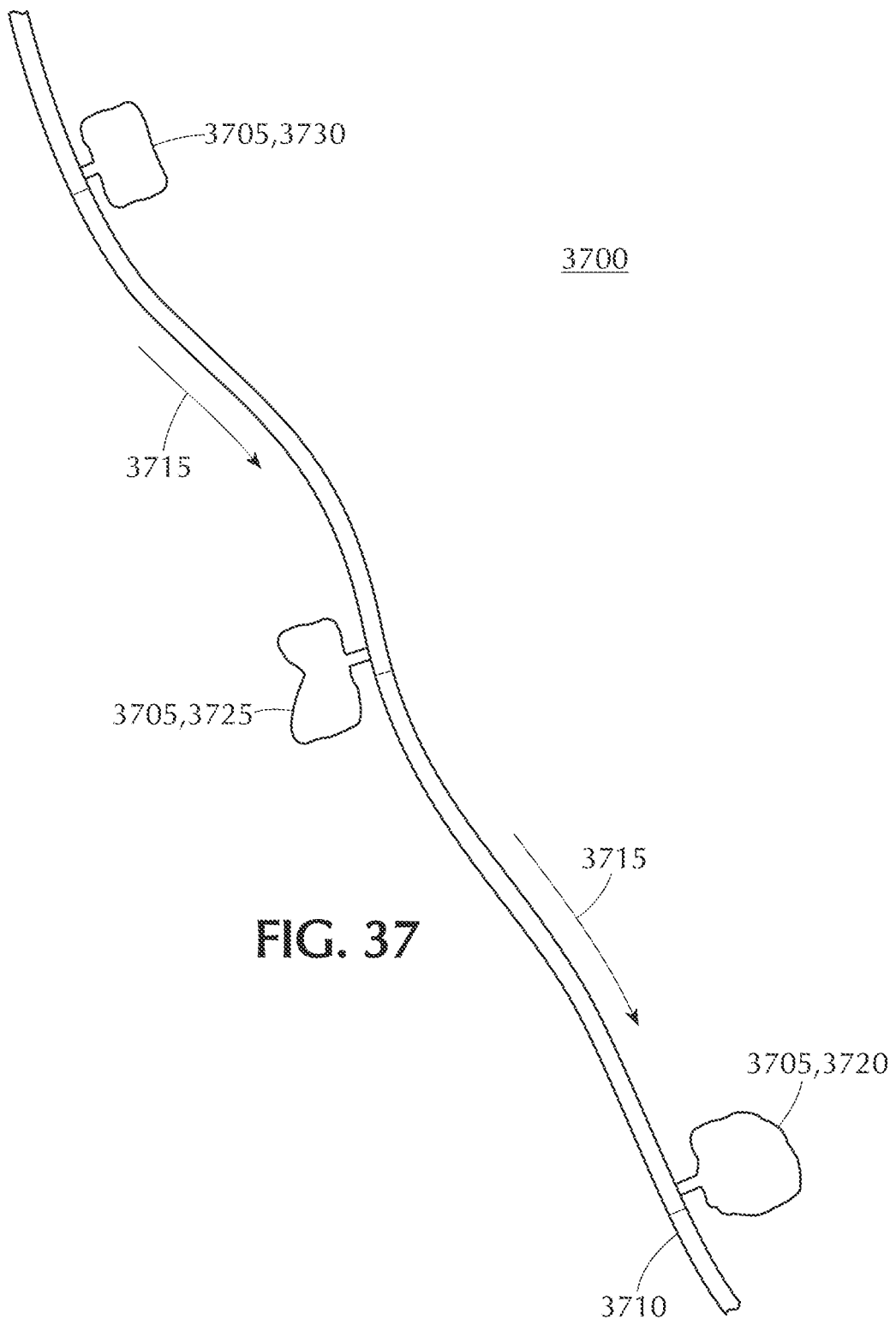
FIG. 37 depicts a region with multiple integrated systems along a single channel according to an embodiment of the invention.

According to embodiments of the invention, more effective flood control in a region (e.g., a watershed) may be achieved by installing multiple integrated systems along a single channel in that region. FIG. 37 depicts a region 3700 with multiple integrated systems 3705 along a single channel 3710 according to an embodiment of the invention. (The normal direction of water flow in the depicted channel 3710 is indicated by arrows 3715.)

It will be appreciated that, in any region, more or fewer integrated systems 3705 may be provided to reflect local needs and conditions.

In the depicted embodiment of the invention, each of the integrated systems 3705 may comprise, e.g., a primary dam structure, a detention weir, and a detention pond with associated systems, e.g., as FIGS. 1 and 2 depict. Control of the integrated systems 3705 may in embodiments of the invention be coordinated, e.g., to effect regional flood mitigation.

As a simple example, a heavy rain event overspreading the entire region 3700 may leave the channel 3710 and the detention ponds of systems 3705 full to capacity, or nearly so. It will be appreciated that in such a circumstance, simultaneously draining all integrated systems 3705 may lead to flooding downstream as one system 3720 receives water from upstream systems 3725, 3730 faster than it can itself drain.

For another example, a rain event with heavy rain beginning over the most downstream part of the region 3700 may for a while cause little or no precipitation near the upstream integrated systems 3725, 3730. Nonetheless, the upstream systems 3725, 3730 may be directed at this time to block water flow completely to minimize additional flow into the downstream system 3720. As the rain moves upstream, however, the downstream system 3720 may be able to begin draining, which the upstream systems (first 3725 and then 3730) may be directed to release water to retard their own filling with runoff.

Figure 38:
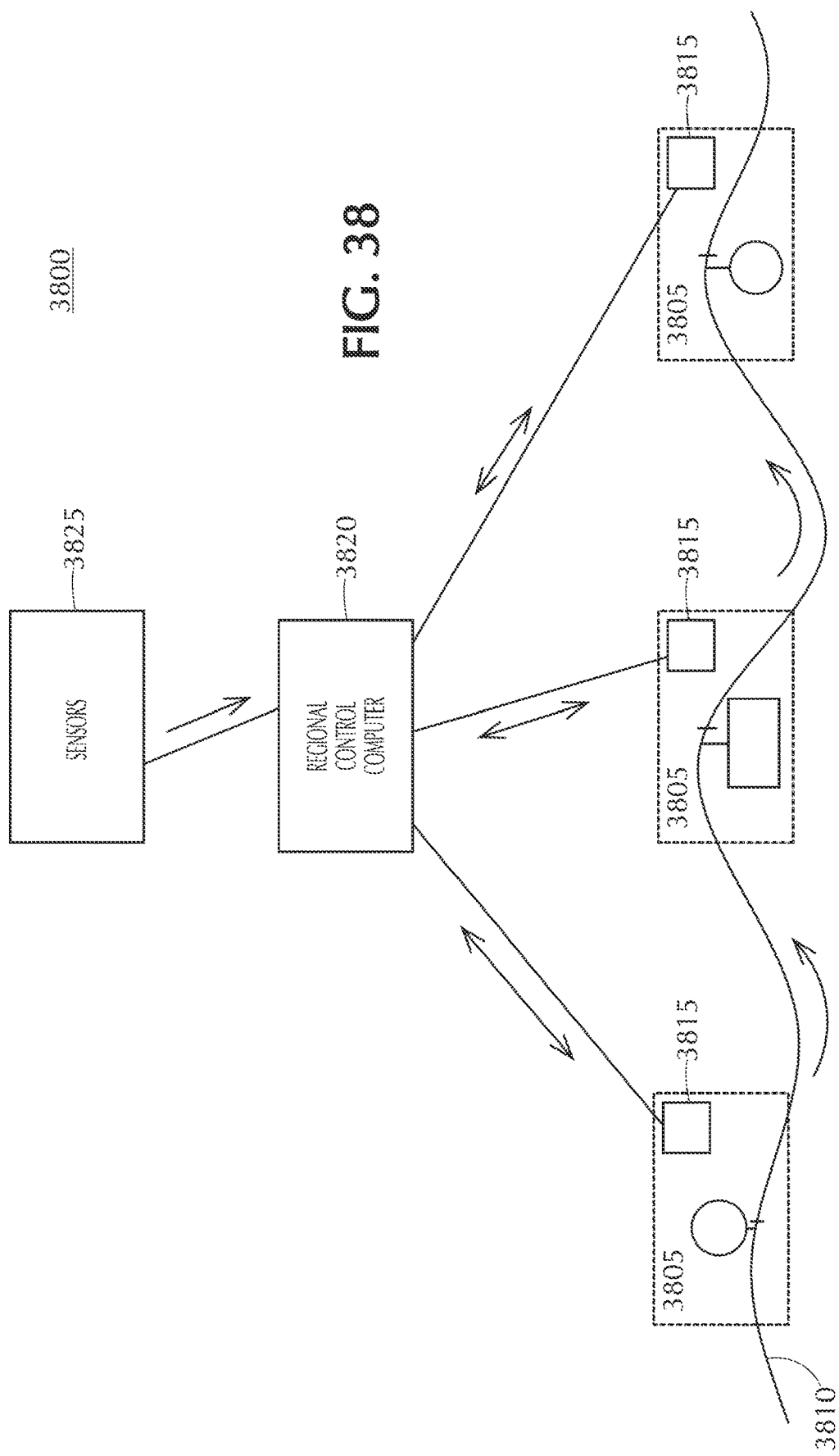
FIG. 38 depicts conceptually a coordinated monitoring and control system for multiple integrated systems along a single channel, according to an embodiment of the invention.

FIG. 38 depicts conceptually a coordinated monitoring and control system 3800 for multiple integrated systems 3805 along a single channel 3810, according to an embodiment of the invention. As depicted, each integrated system 3805 is directed by its own central control computer 3815, which may be physically local to the integrated system or remote from it. The central control computers 3815 may communicate with, and possibly be controlled by, a regional control computer 3820. It will be appreciated that the regional control computer 3820 is inherently physically remote from all but one of the integrated systems 3805, and may in embodiments of the invention be physically remote from all of them.

In alternative embodiments of the invention (not pictured) the regional control computer 3820 may perform some or all of the functions of some or all of the central control computers 3815.

Each central control computer 3815 may receive data from one or more sensors physically located near the respective integrated system 3805. Such sensors may include, e.g., water level sensors, flow rate sensors, rainfall gauges, and sensors monitoring the positions of the various movable parts (e.g., movable weir panels) of the respective integrated systems 3805. This data may be sent to the regional control computer 3820, where it may, e.g., be monitored automatically and/or by human operators. The regional control computer 3820 may receive additional data, e.g., from sensors 382 in the region that are not physically proximate to or associated with any of the integrated systems 3805, and this may similarly be monitored.

In embodiments of the invention, human operators may rely on sensor data, possibly after, e.g., manual or automatic analysis, to control the individual integrated systems 3805. This control may take the form, e.g., of transmitting commands to individual components (e.g., movable weir panels, sluice gates) of a particular integrated system 3805 and/or transmitting to the central control computer 3815 a selection of a particular automatic program for operating the associated integrated system 3805 under the current conditions.

Instead of the foregoing, or an addition to it, the regional control computer 3820 may be programmed to control directly or indirectly (i.e., through the central control computers 3815) the individual integrated systems 3805, based on the sensor data.

It will be appreciated that control of a regional system 3800 may in embodiments of the invention be based, e.g., on the judgment of system operators. To some extent, this will reflect longtime experience in managing surface water in a region, but in complicated cases, it may sometimes reflect an educated guess as to the behavior of water levels under various conditions in response to changes in the system configuration. Such educated guessing may be supplemented or enhanced in connection with embodiments of the invention, e.g., by electronically supplied real-time weather data.

It may be desirable in some circumstances, in connection with embodiments of the invention, to apply machine learning techniques to develop a system that is capable of responding to conditions automatically, i.e., without human intervention needed during routine operation, except possibly to initiate functioning of the system in the first place. (It will be appreciated that in typical embodiments, any such automatic system may be subject to manual override.)

Figure 39:
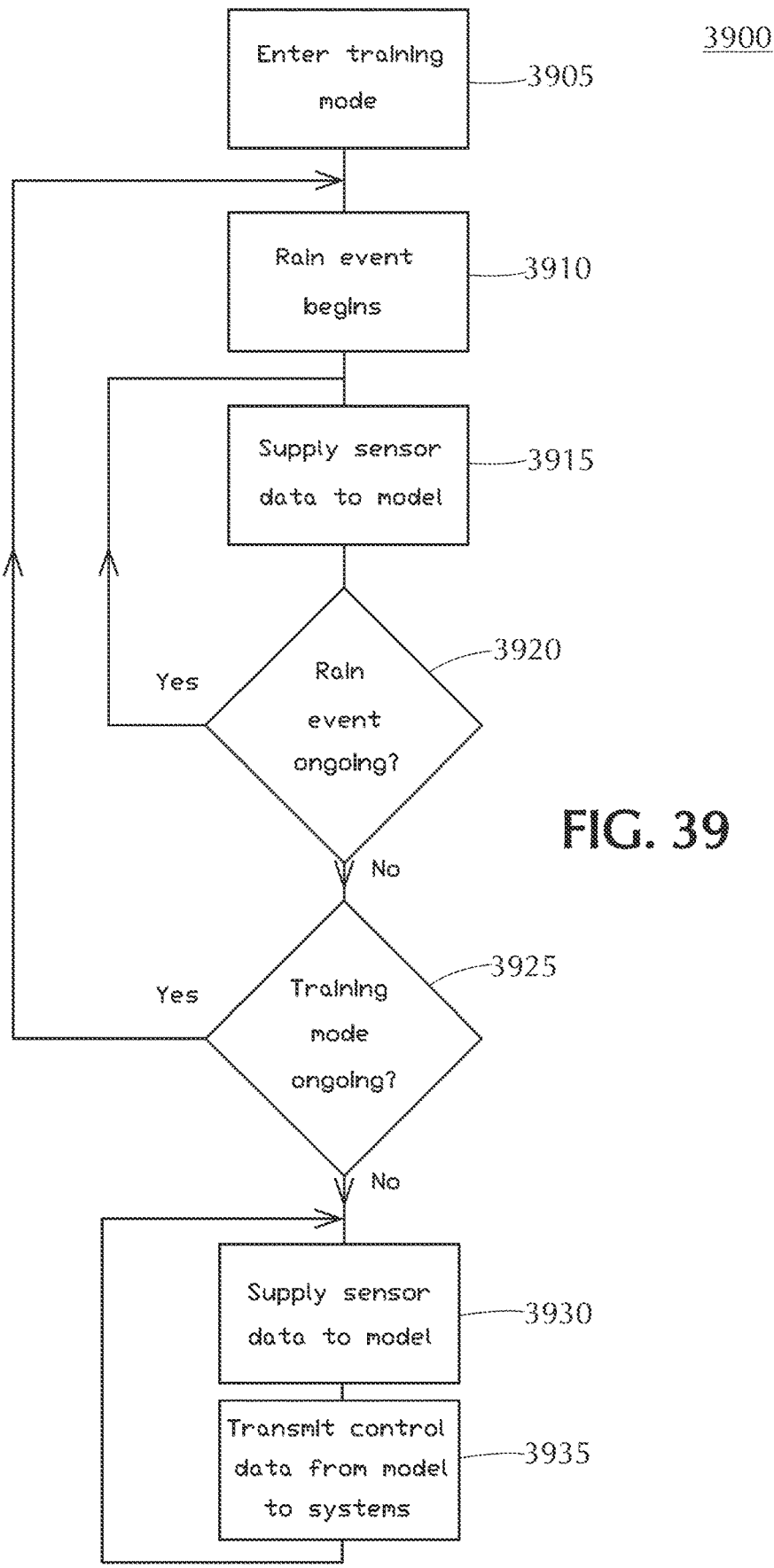
FIG. 39 depicts a flow of training and using a machine learning model according to embodiments of the invention.

FIG. 39 depicts a flow 3900 of training and deploying a machine learning model (e.g., in connection with a regional control computer) according to an embodiment of the invention. The flow 3900 begins with putting the system in a training state in block 3910. After a rain event begins in block 3910, the model is repeatedly supplied with sensor data in block 3915. Such sensor data may include, e.g., water levels, water flow rates, and rainfall rates from across the region as well as sensor and other data indicating the configuration of one or more integrated systems within the region. The model may in embodiments of the invention be trained to recognize, e.g., effects on water levels throughout the region of various water conditions and system configurations. Training for a particular rain event may continue, e.g., until it is determined in block 3920 that the rainfall event has ended.

After the rain event ends, if it is determined in block 3925 that the model remains in training mode, the flow returns to previous stages to await the next rain event. Once the training is discontinued, however, the flow proceeds to a loop comprising acquiring sensor data in block 3930 and adjusting the configuration of integrated systems and components in block 3935 in response. In embodiments of the invention, the configuration may reflect instructions to the model to optimize (e.g., minimize) water levels in some or all selected areas, and the resulting control data may reflect the model's attempt to effect such optimization.

Figure 40:
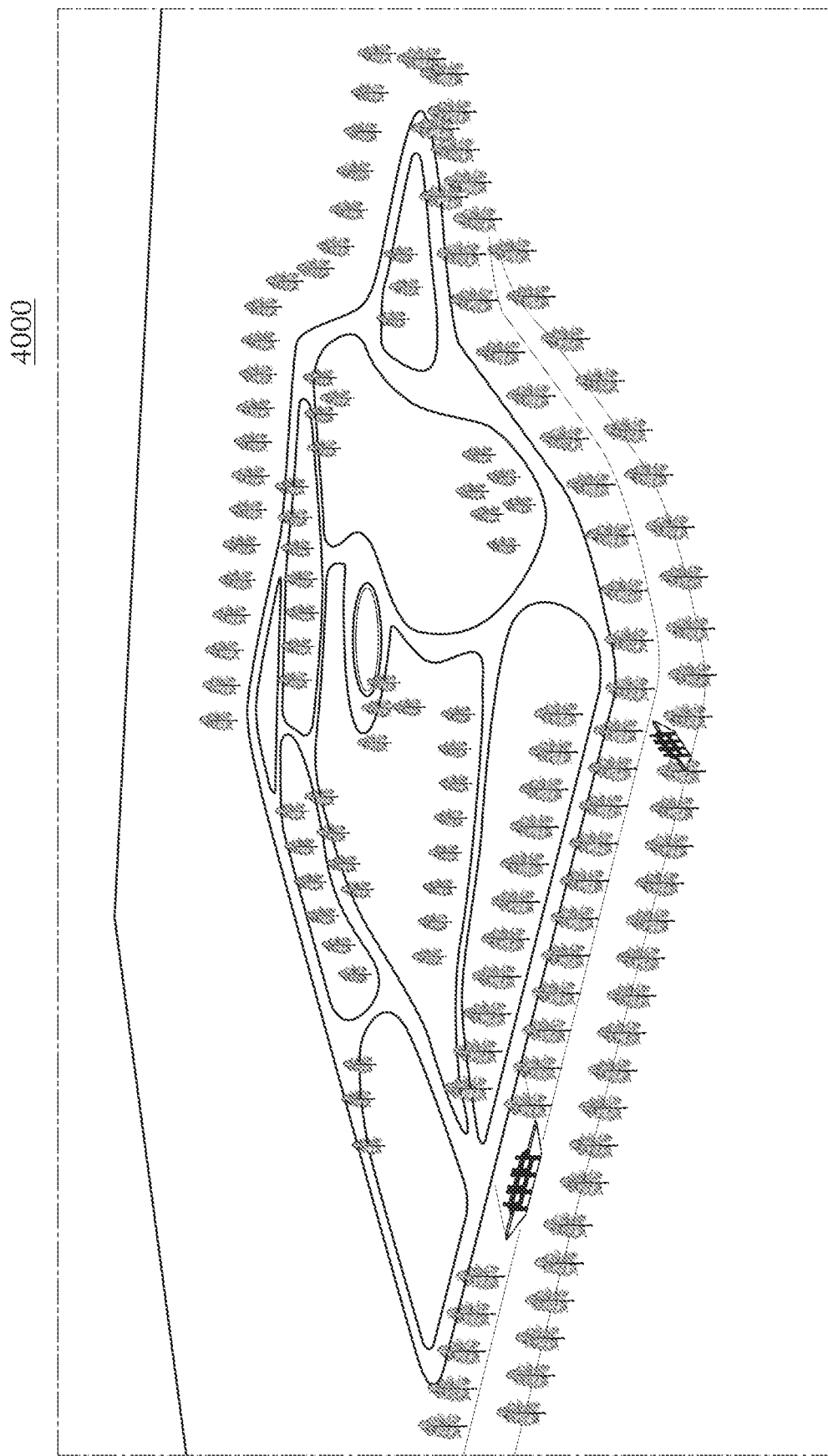
FIG. 40 depicts a detention pond with a secondary use as a park according to an embodiment of the invention.

It will be appreciated that effective detention ponds may in embodiments of the invention take up a lot of land, and that acquiring land for use as detention ponds may face resistance within a community. Such resistance may in some cases be reduced in connection with embodiments of the invention by developing, e.g., parks within some or all detention ponds. FIG. 40 depicts a detention pond 4000 configured to comprise a park.

It will be appreciated that such a park 4000 may be designed with the possibility of periodic inundation in mind. For example, vegetation may be chosen to be resistant to intermittent temporary inundation. Sidewalks and/or other paved areas may be paved, e.g., with materials believed relatively unlikely to leach toxic chemicals into runoff. Any fixtures (e.g., playground and/or picnic facilities) may be built, e.g., of materials likely to resist water damage and unlikely to float away.

Figure 41:
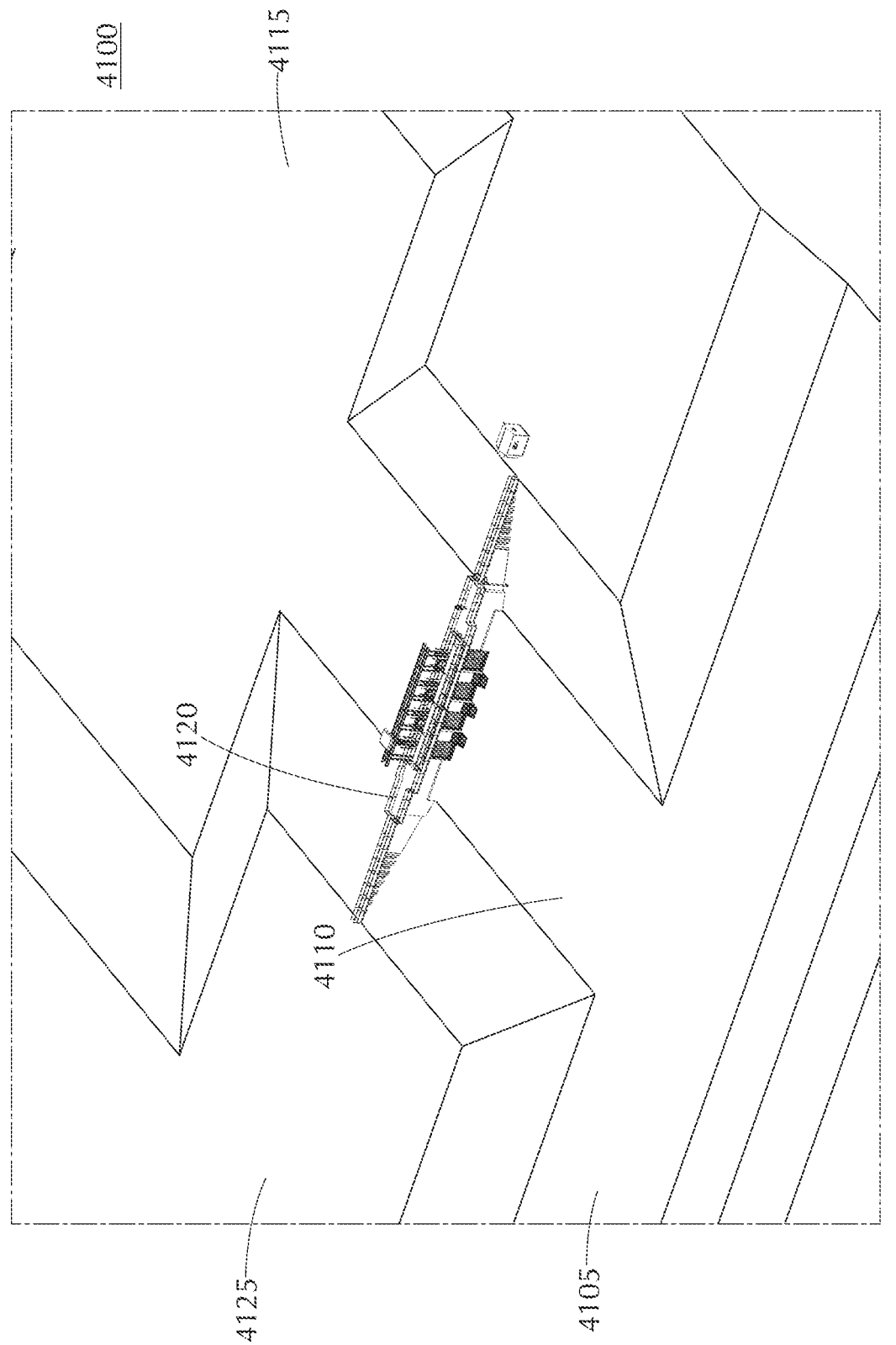
FIG. 41 depicts an installation along a primary channel according to an alternative embodiment of the invention.

In some circumstances, it may be judged undesirable to put dams across both a primary channel and a pond channel, e.g., as described in connection with embodiments of the invention above. FIG. 41 depicts an installation 4100 along a primary channel 4105 according to an alternative embodiment of the invention. A pond channel 4110 connects the primary channel 4105 with a detention pond 4115, and a dam structure 4120 spans the pond channel 4110 and controls water flow through it.

Figure 42:
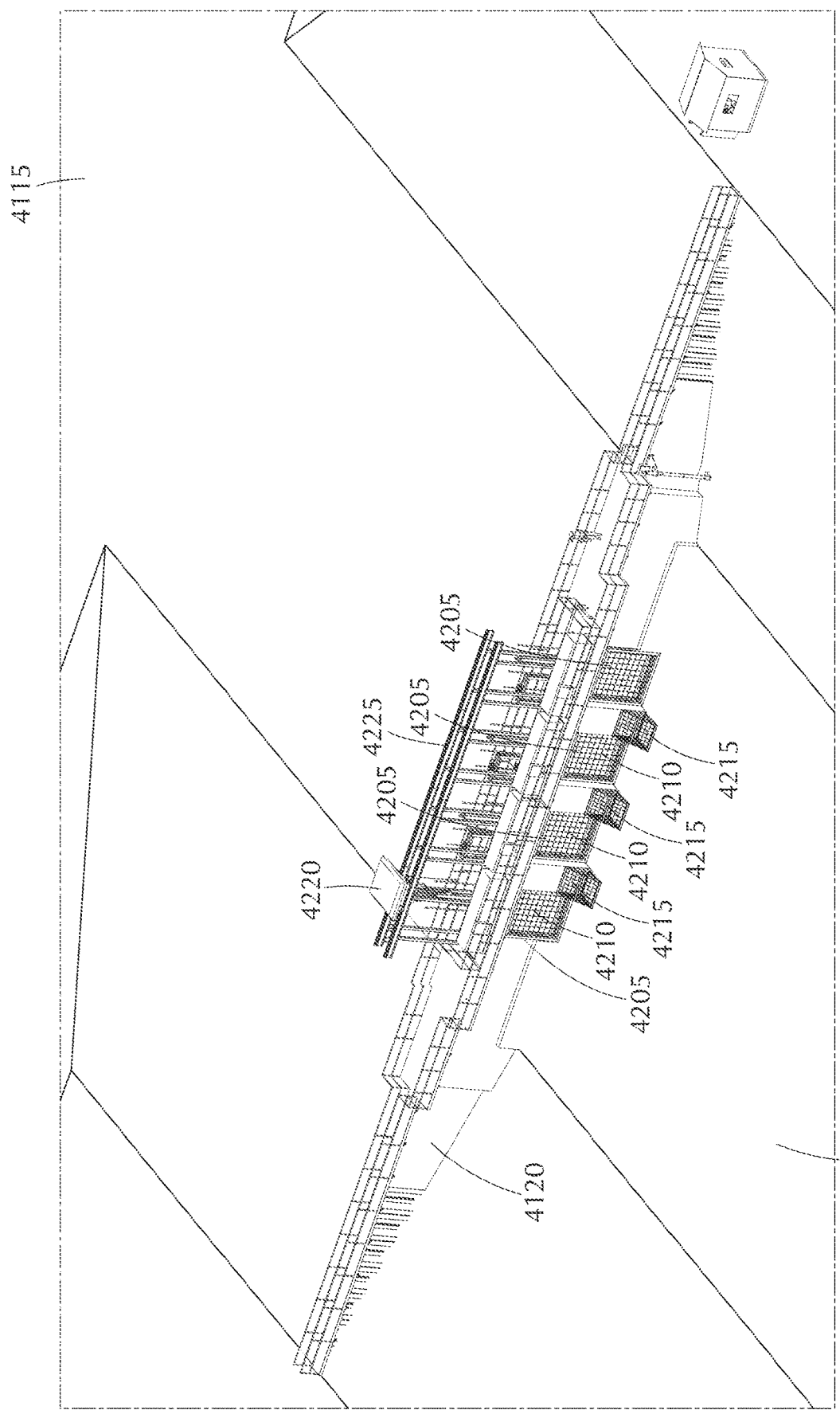
FIG. 42 and FIG. 43 depict the dam structure of FIG. 41.
Figure 43:
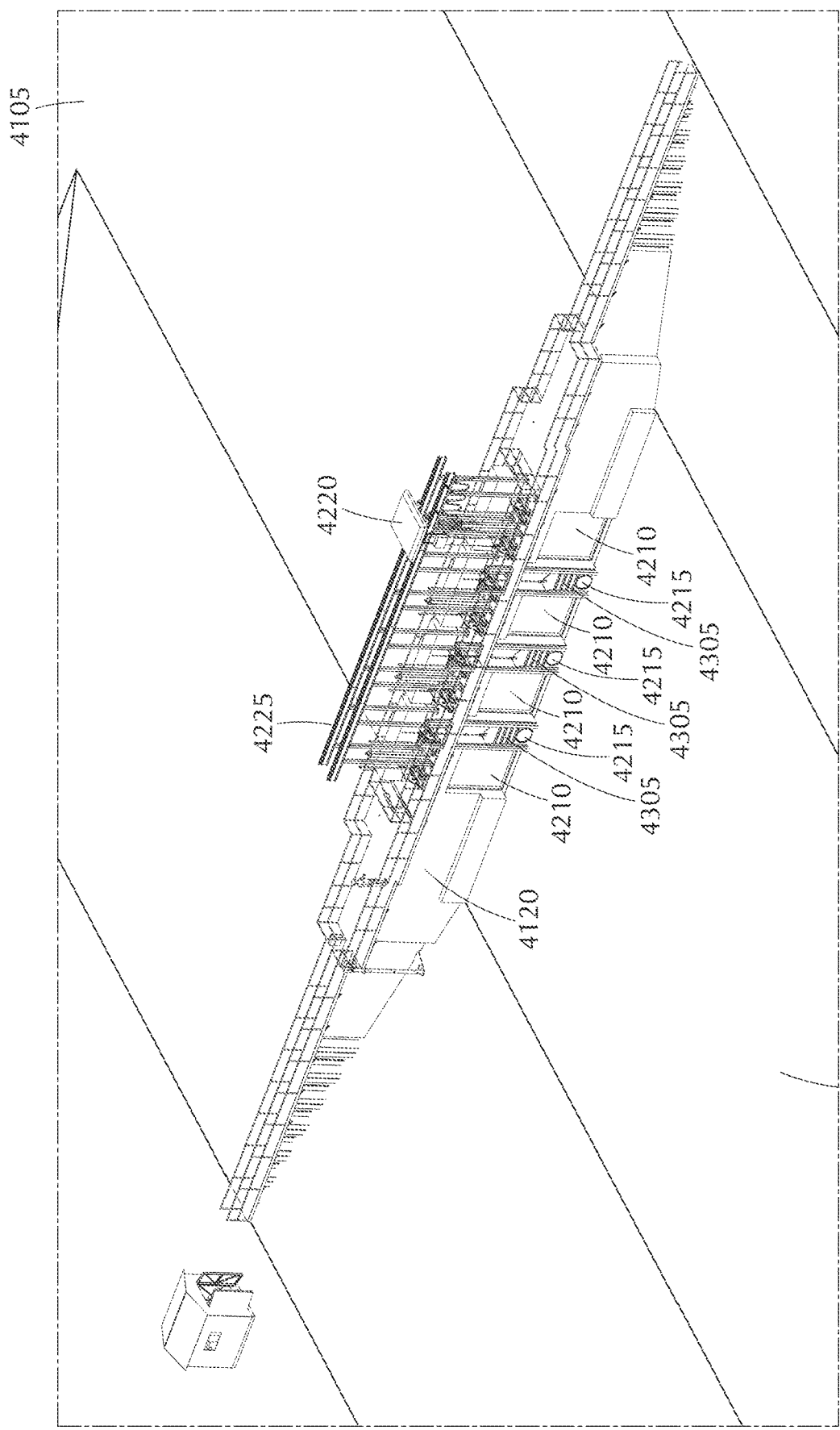

FIG. 42 and FIG. 43 depict the dam structure 4120 of FIG. 41 in greater detail. FIG. 42 depicts the structure 4120 from the side facing the main channel 4105, looking towards the detention pond 4115, and FIG. 43 depicts the structure 4120 from the other side.

In embodiments of the invention, the construction and operation of a dam structure such as FIGS. 41-43 depict may be similar to those, e.g., of the dam structures disclosed previously, modified to suit the particular circumstances in ways that will be apparent to those skilled in the arts.

According to embodiments of the invention, as FIGS. 42 and 43 depict, a dam structure 4120 may have one or more openings 4205, each of which is gated by a movable weir panel 4210. One or more additional sluices 4215 may also be provided, each with a vertically movable gate 4305 to control flow through the sluice 4215. The openings 4205, the sluices 4215, or both may be, e.g., screened to reduce ingress and egress of debris, including debris that may, e.g., interfere with operation of gates or panels. Screens may in embodiments of the invention be installed on either or both sides of the dam structure 4120.

In embodiments of the invention, operation of the movable weir panels 4210 may be achieved, e.g., by mechanisms such as discussed in connection with FIGS. 7-9 above, or those of FIGS. 10-16. A movable redundant hoist 4220 on tracks 4225 may also similarly be provided to ensure functioning of the movable weir panels 4210 in case of drive failure.

FIGS. 41-43 depict an installation that relies on gravity to propel water as needed. Thus, as depicted, the bottom of the primary channel 4105 is level with the bottom of the pond channel 4110 and the bottom of the detention pond 4120. Consistent with this, the bottoms of the weir openings 4205 (FIG. 42) are also level with bottom of the pond channel 4110. The top of the dam structure 4120 may also be, e.g., level with the ground surface next to the channels 4105, 4110 and the detention pond 4115.

Thus, when the weir panels 4210 are raised, water will flow from the channel 4105 (FIG. 41) to the detention pond 4115 when the water level in the channel 4105 is above that of the detention pond 4115, and will flow in the other direction when the circumstance is reversed. In a heavy rain event, the movable weir panels 4210 may be raised, and water in the detention pond 4115 may rise as water in the main channel 4105 rises and flows into the detention pond 4115 through the pond channel 4110. The weir panels 4210 may be lowered, e.g., at high water, trapping water in the full detention pond 4115. Once the water in the channel 4105 goes down, however, the weir panels 4210 may be raised to allow the trapped water to escape at a safe rate.

A dam structure 4120 incorporating sufficiently large openings 4205 and weir panels 4210, according to embodiments of the invention, may permit gravity alone to fill the detention pond in a flood event as quickly as if no dam structure were present, or nearly so. It may thereby preserve perceived advantages believed to be associated with use of detention ponds without barriers of any kind. Adding, e.g., controlled sluices and weir panels, according to embodiments of the invention, may present advantages by allowing management of the discharge of water from the detention pond and thereby reducing the risk of further flooding downstream.

Figure 44:
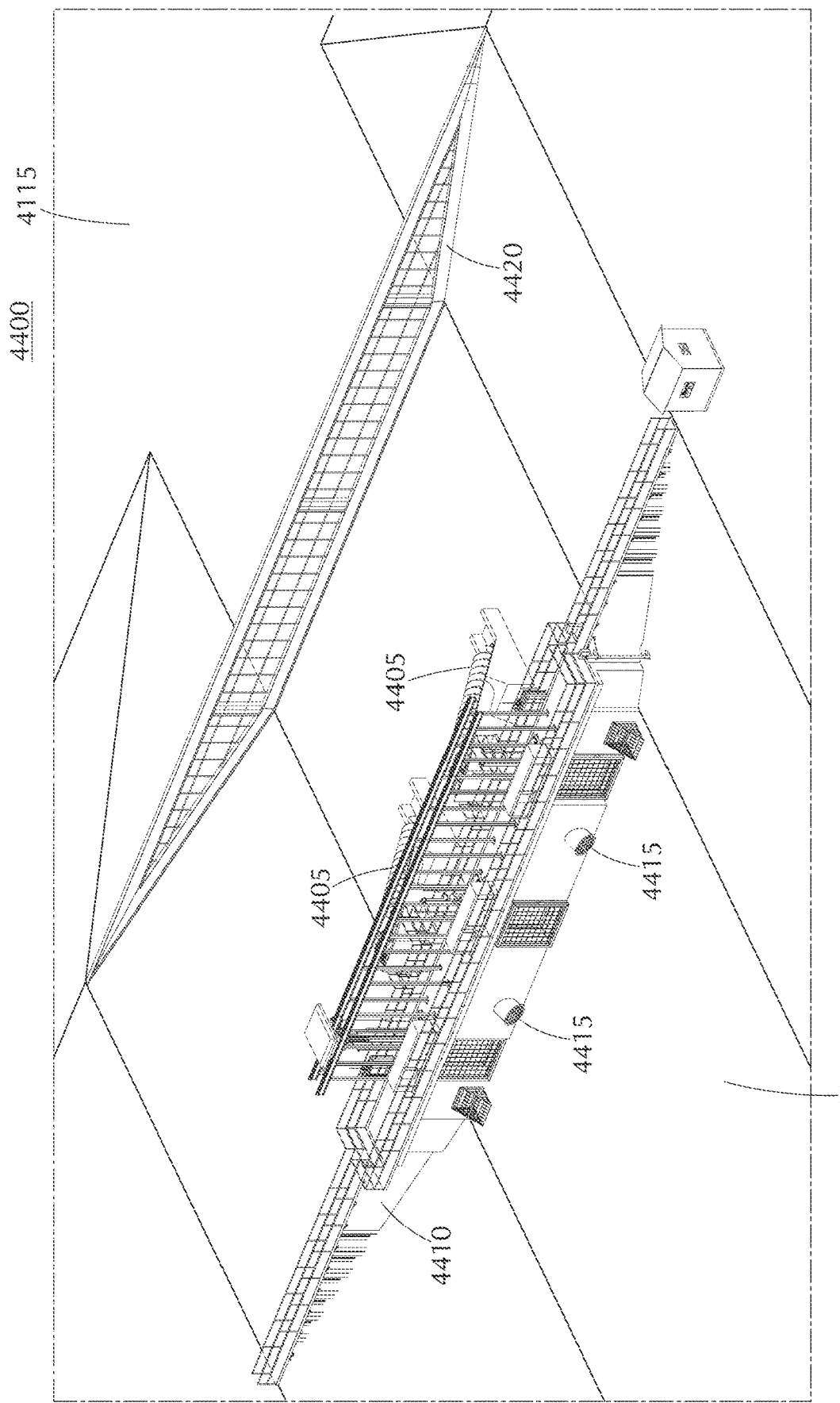
FIG. 44 and FIG. 45 depict an installation that comprises screw pumps according to embodiments of the invention.
Figure 45:
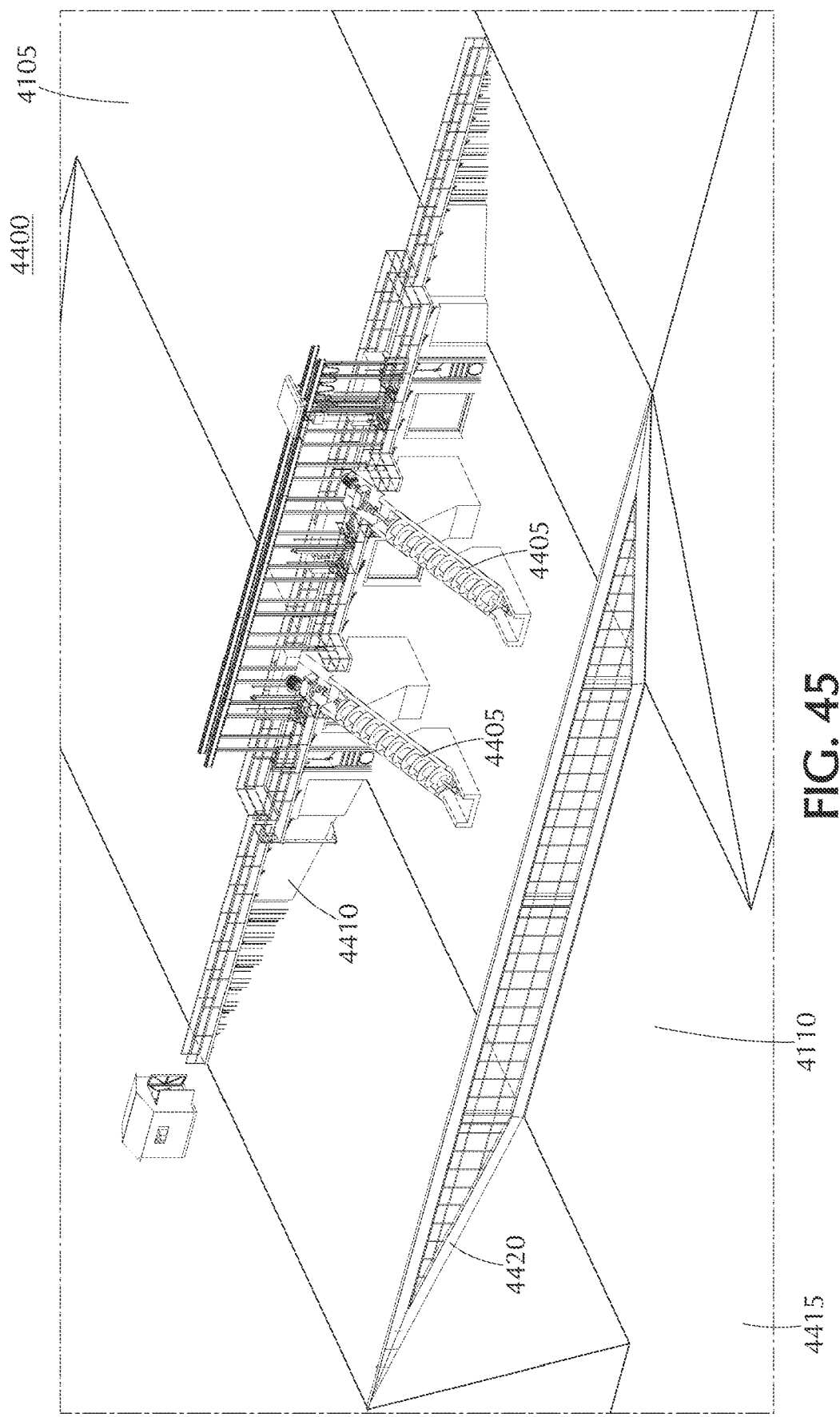

It will be appreciated that the addition of suitable pumps may increase the flow rates in either or both directions. FIG. 44 and FIG. 45 depict an installation 4400 in which two screw pumps 4405 (viz., pumps operating on the principle of the Archimedean screw) have been placed on the same side of the dam structure 4410 as the detention pond 4115, in an environment that is hydrologically similar to that of FIGS. 41-43. The pumped water may be discharged on the other side of the dam structure 4410, e.g., through discharges 4415 built into the dam structure 4410. A screen 4420 may be provided, e.g., to reduce the entry of debris into the pumps' 4405 intakes.

Screw pumps may be suitable in connection with embodiments of the invention because, e.g., they may be judged relatively simple, reliable, inexpensive, and capable of moving large volumes of water. (For example, commercially available high-capacity screw pumps are known to be capable of moving tens of thousands of gallons of water per minute in appropriate conditions.) Persons skilled in the art, however, may judge other pumps equally suitable, or even preferable, in connection with embodiments of the invention.

In embodiments of the invention, the dam structure 4410 may otherwise be similar, e.g., to a dam structure 4120 as FIGS. 41-43 depict, aside from alterations needed to accommodate the screw pumps 4405.

Figure 46:
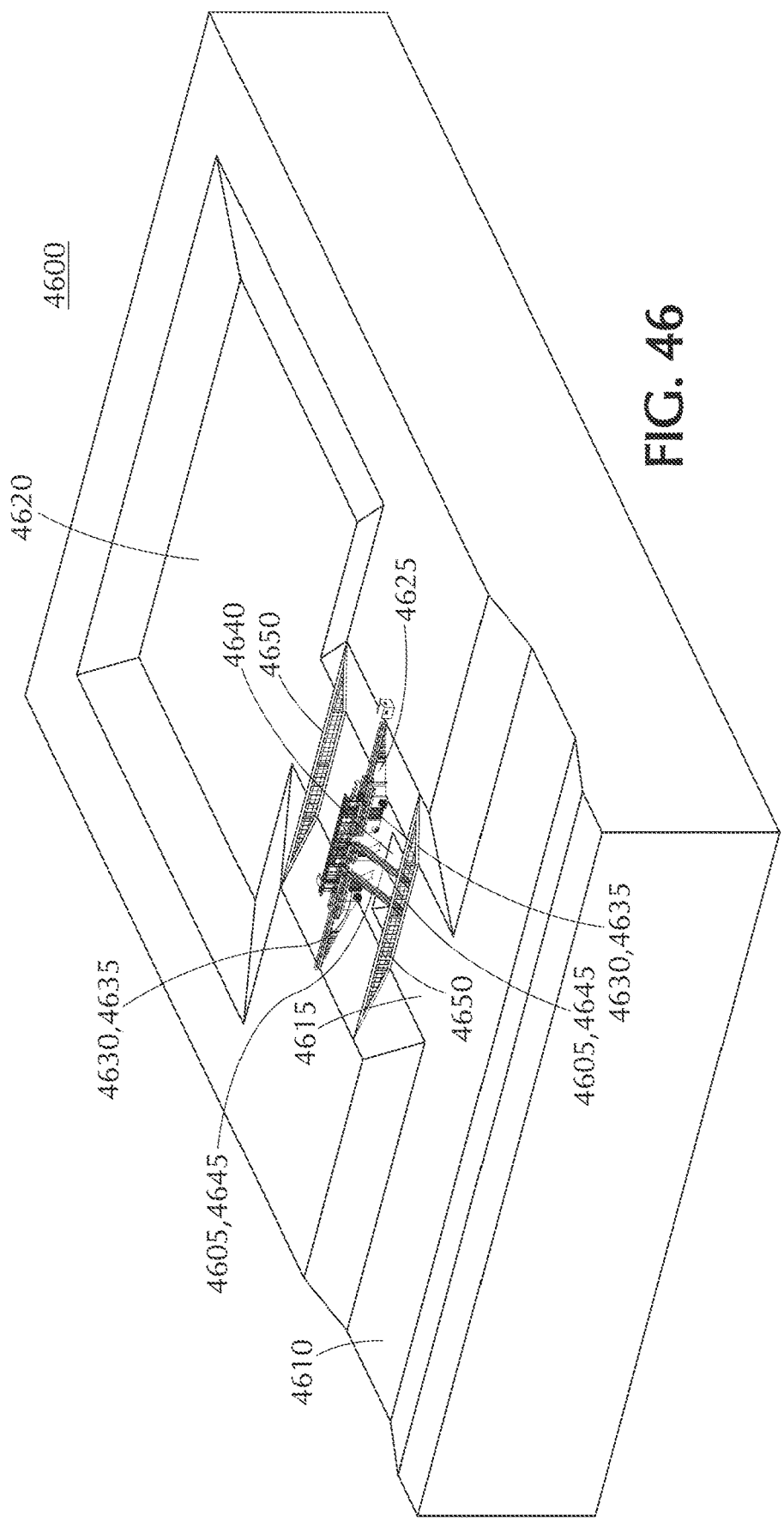
FIGS. 46-48 depict an installation according to an embodiment of the invention that includes two sets of screw pumps.
Figure 47:
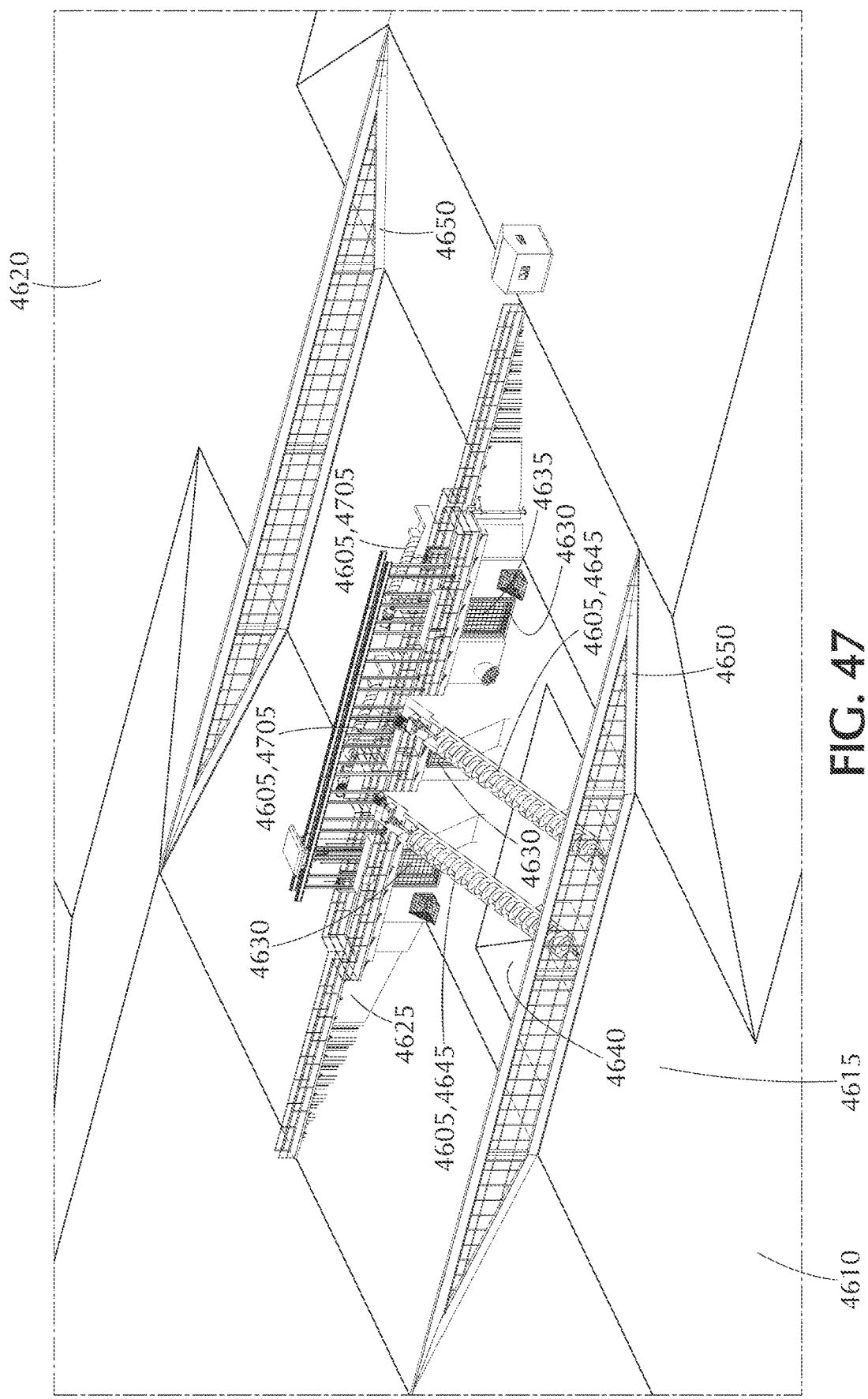
Figure 48:
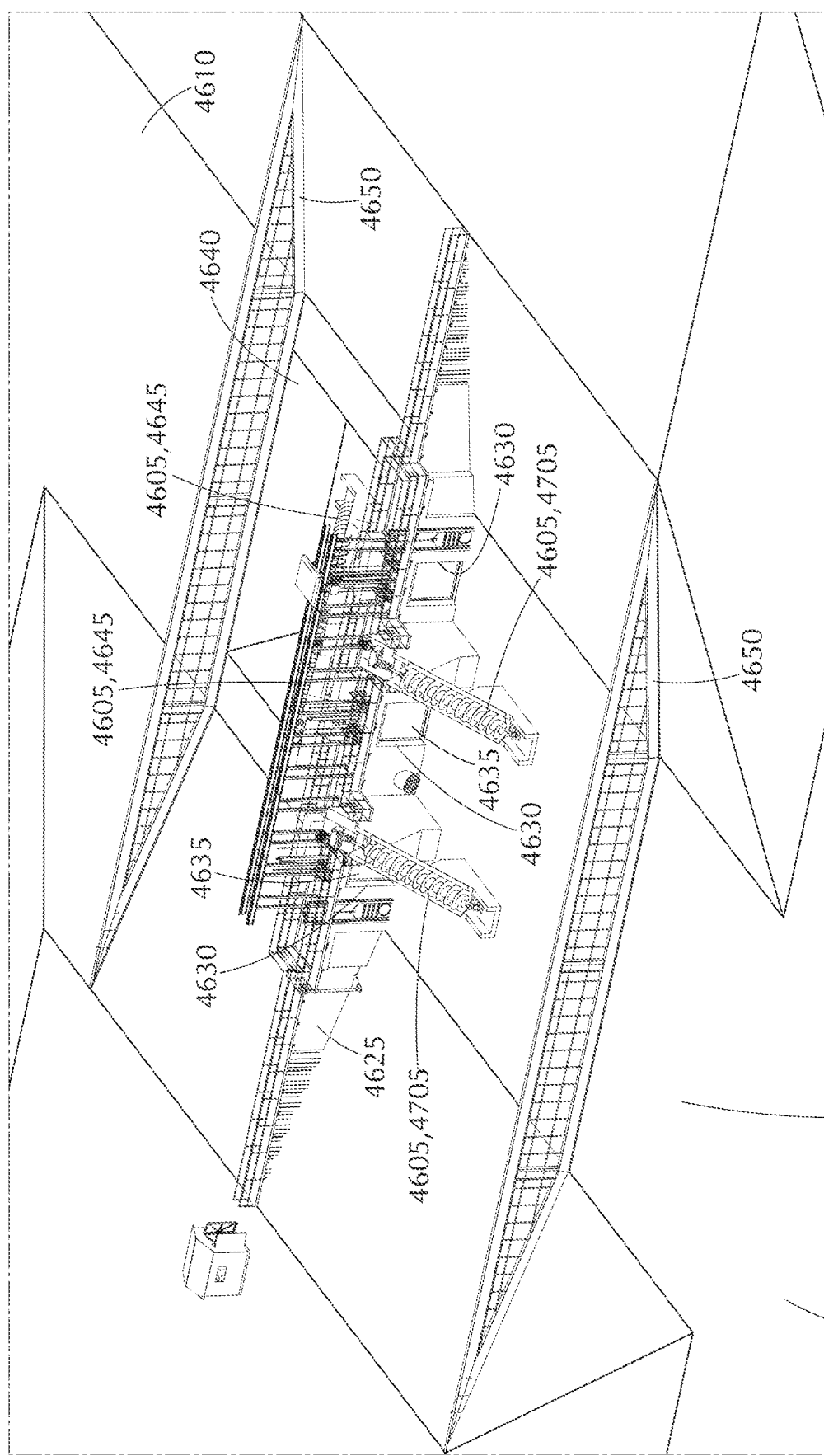

FIGS. 46-48 depict a variant installation 4600 according to an embodiment of the invention in which two sets of screw pumps 4605 are provided, e.g., one set 4645 to move water from the channel into the detention pond and the other set 4705 to move water from the detention pond into the channel. As in installation 4100 (FIGS. 41-43) and installation 4400 (FIGS. 44-45), installation 4600 (FIGS. 46-48) depicts an embodiment of the invention installed in an environment in which the bottom of a primary channel 4610 is level with the bottom of a pond channel 4615 and the bottom of a detention pond 4620. As depicted, a dam structure 4625 spans the pond channel 4615. Consistent with this, the dam structure 4625 may comprise weir openings 4630 controlled by movable weir panels 4635, and the bottoms of the weir openings 4630 may also be level with the bottom of the pond channel 4615. The top of the dam structure 4625 may also be, e.g., level with the ground surface next to the channels 4610, 4615, and the detention pond 4620.

It will be appreciated by those skilled in the art that a screw pump, e.g., as included by embodiments of the invention, may work most efficiently (e.g., transfer water at its highest rates) when the bottom of the screw pump is submerged in water beyond a certain minimum depth. According to embodiments of the invention, a sump 4640 may be, e.g., excavated near the dam structure 4625 on the main channel 4610 side of the dam structure 4625. In such an embodiment, the intakes for screw pumps 4645 on this side of the dam structure 4625 may be placed in the sump 4640, e.g., at or near the bottom of the sump.

Thus, rising water in the main channel 4610 and pond channel 4615 may accumulate in the sump 4640 to a greater depth than in the channels 4610, 4615, which may allow the screw pumps 4645 to transfer greater volumes of water to the detention pond 4620, e.g., earlier in a heavy rain event than would be possible in the absence of the sump 4640. It will be appreciated that depths of sumps 4640 according to embodiments of the invention may vary depending, e.g., on the specifications of the pumps 4645 associated with the various embodiments; for illustration and without limiting the invention, sumps may have depths of, e.g., 5-15 feet.

Debris screens 4650 may limit debris (not pictured) entering the system, e.g., clogging the pump 4605. Moreover, the presence of pumps 4605 in both directions in embodiments of the invention may permit, e.g., flushing accumulated debris away from either screen 4650 or both of them.

It will be appreciated that acquisition of land for infrastructure projects, such as the surface water management systems of this disclosure, can add a great deal of time and expense to building them. To make more efficient use of land, detention ponds according to embodiments of the invention, including any or all embodiments explicitly discussed here, may be further excavated to increase there depth, which may, e.g., increase the water storage capacity of the detention pond.

Figure 49:
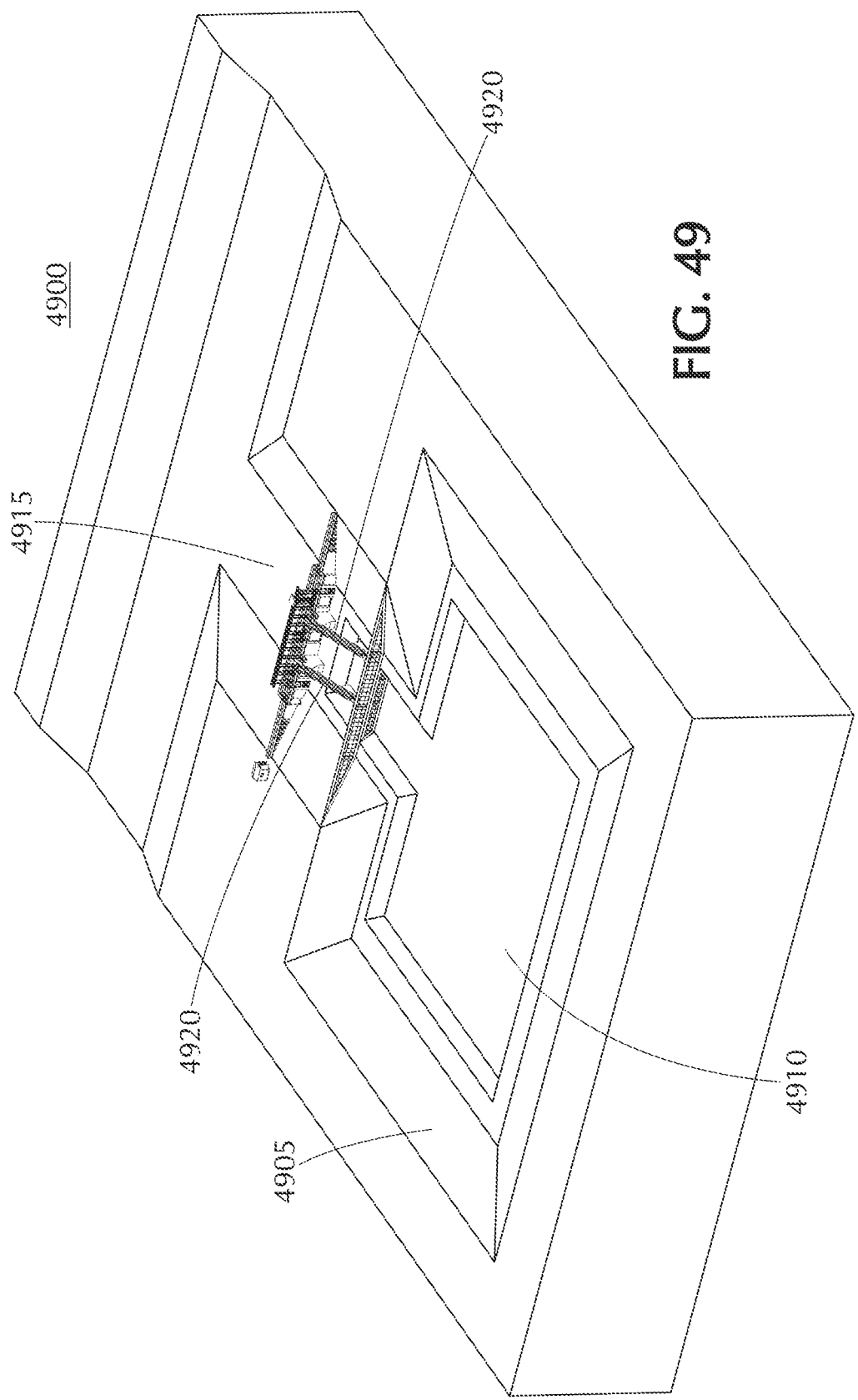
FIG. 49 depicts an installation in which a detention pond has been excavated to a greater depth according to an embodiment of the invention.

For example, FIG. 49 depicts an installation 4900 like the installation 4400 of FIG. 44, but in which the detention pond 4905 has been excavated to a greater depth. (For clarity, the detention pond 4905 in FIG. 49—and other disclosed detention ponds that have been excavated—are depicted with shapes that may, e.g., highlight the additional excavation 4910, but this does not reflect a limitation. To the contrary, a detention pond 4905 may have any shape or configuration that is consistent with intended uses and desired construction materials and techniques.)

The depths of any additional excavation 4910 in embodiments of the invention may vary depending on local conditions. For illustration, however, and not by way of limitation, a detention pond 4905 in an embodiment of the invention may be additionally excavated to a maximum depth that equals the natural depth of the pond 4905, thereby doubling the pond's depth (and depending, e.g., on the geometry, doubling the volumetric capacity of the detention pond, or roughly so). For example, a pond 4905 that would be 30 feet deep as a result of existing geography may be excavated to have a maximum depth of 60 feet.

It will be appreciated, however that excavation of a detention pond 4905 below, e.g., the level of the pond channel 4915 may, e.g., limit the applicability of gravity alone to drain the detention pond 4905. Thus, the excavated portion 4910 of a detention pond 4905 according to an embodiment of the invention may include and be contiguous with portions of the detention pond and/or pond channel 4915 that include intakes of discharge pumps 4920.

Applicable laws and/or regulations in some jurisdictions may require that a detention pond 4905 according to embodiments of the invention be drained, e.g., to the maximum extent that gravity permits, before discharge pumps may be activated. In such jurisdictions, computer control of, e.g., movable weir panels, sluice gates, and/or discharge pumps may embody these restrictions, but this behavior may be solely a matter of compliance with such laws or regulations and does not reflect a technical constraint or limitation or otherwise a limitation of the invention.

Figure 50:
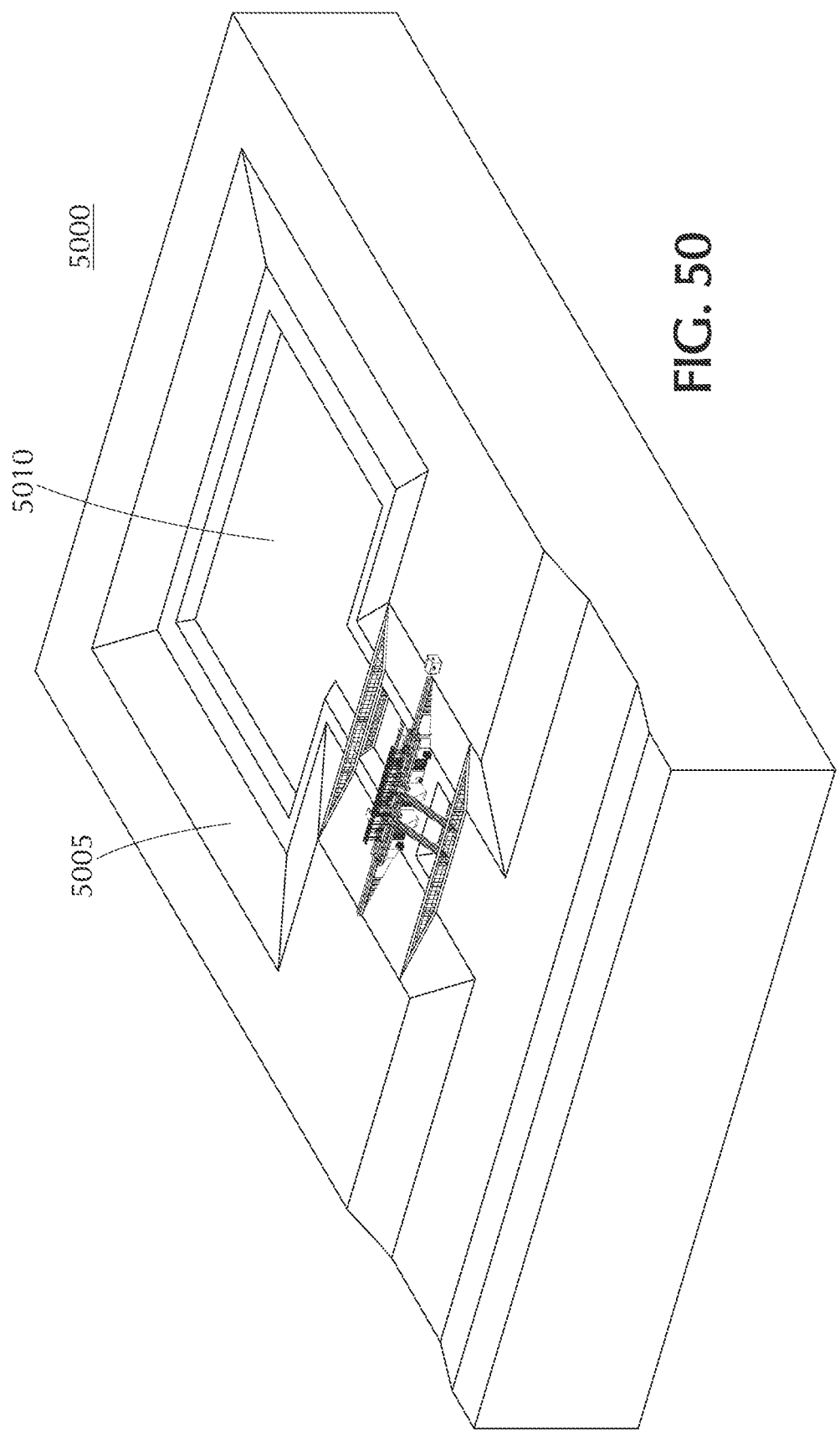
FIG. 50 and FIG. 51 depict an installation in which a detention pond includes additional excavation, according to an embodiment of the invention.
Figure 51:
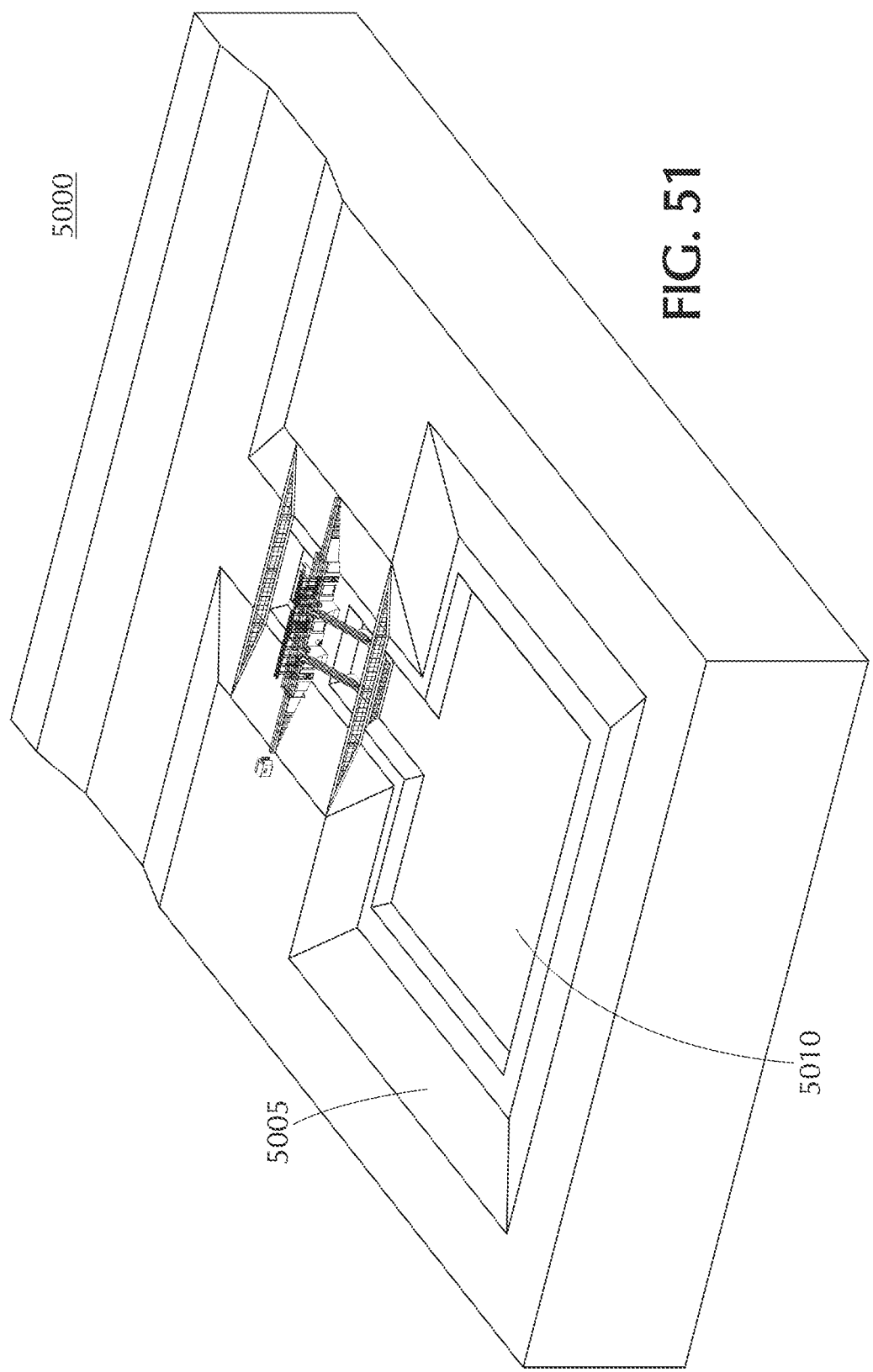

For an additional example, FIG. 50 and FIG. 51 depict an installation 5000 like the installation 4600 of FIG. 46, but in which the detention pond 5005 includes additional excavation 5010, according to an embodiment of the invention.

Figure 52:
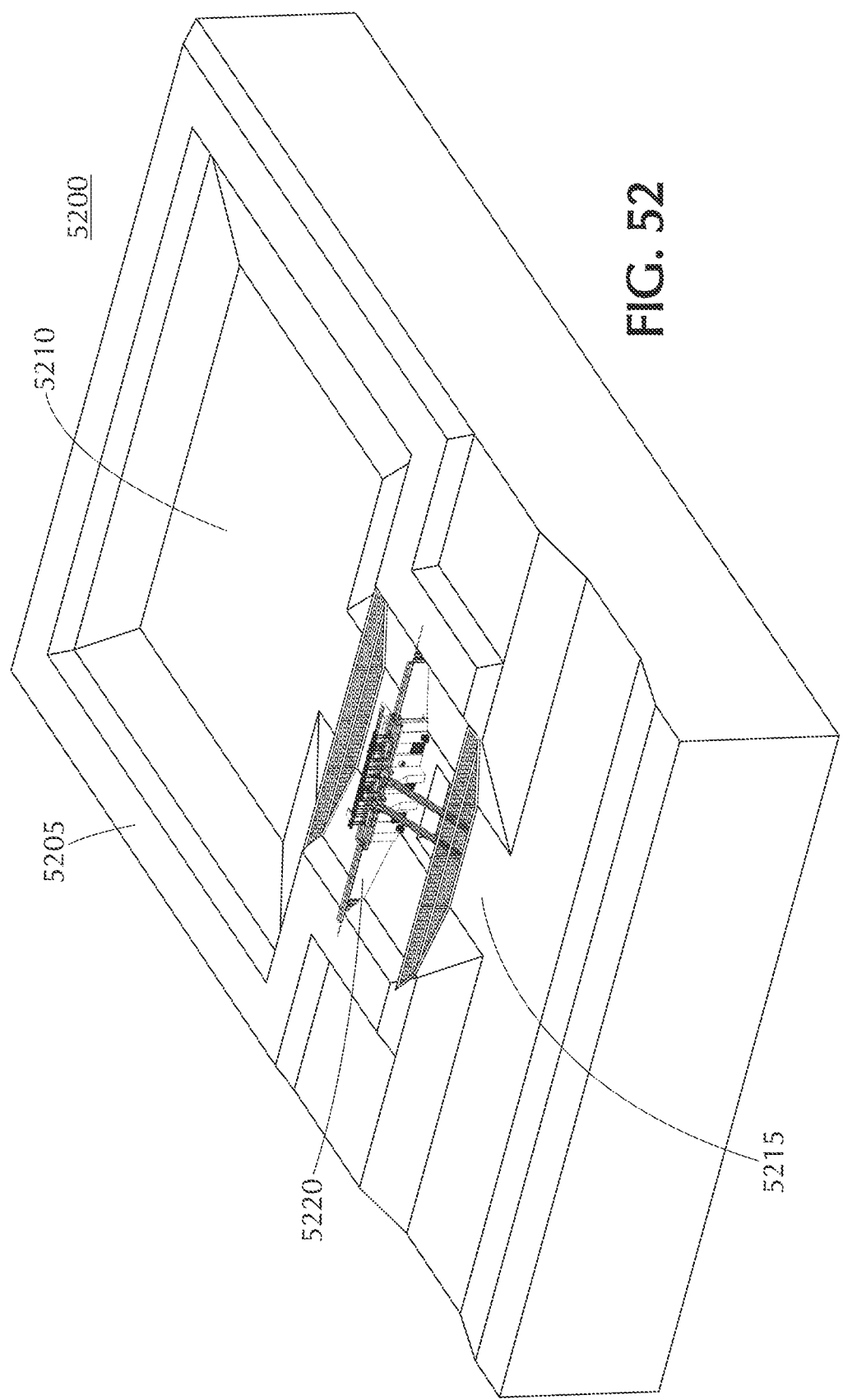
FIG. 52 and FIG. 53 depict an installation that includes a berm surrounding a detention pond according to an embodiment of the invention.
Figure 53:
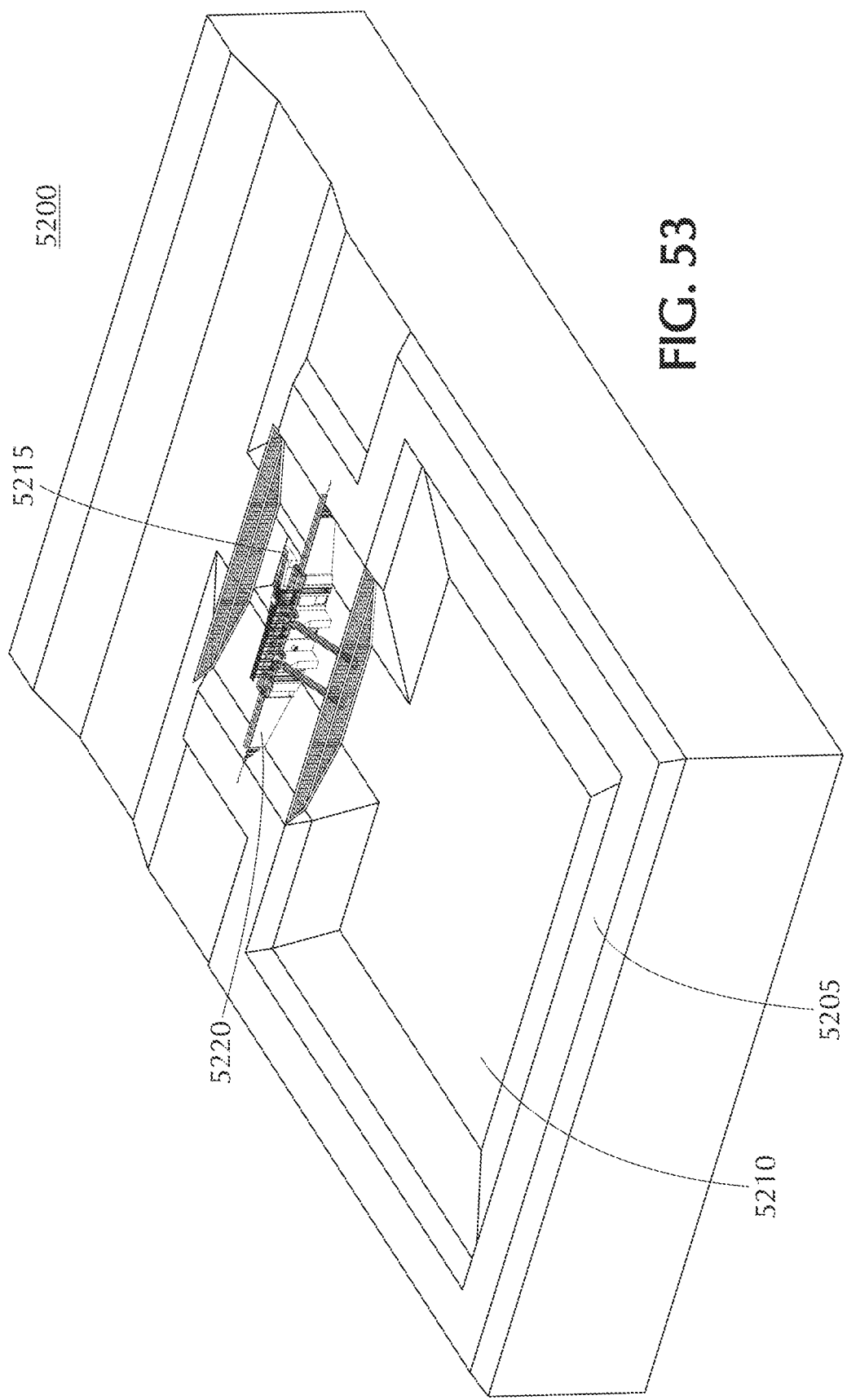

Instead of the foregoing, or in addition to it, capacity of a detention pond according to embodiments of the invention may be increased, e.g., by constructing one or more berms around its border, increasing its effective depth. FIG. 52 and FIG. 53 depict an installation 5200 that includes a berm 5205 surrounding the detention pond 5210 and extends along the sides of the pond channel 5215. In an embodiment of the invention such as FIGS. 52-53 depict, the top of the dam structure 5220 reaches roughly the same height as the top of the berm 5205.

The height of any berm 5205 in embodiments of the invention may vary depending on local conditions. For illustration, however, and not by way of limitation, a berm 5205 in an embodiment of the invention may be raised to a height above grade that equals the natural depth of the pond 5210, thereby doubling the pond's effective depth. For example, a 30-foot tall berm 5205 may be raised around a pond 5210 that would be 30 feet deep, giving the pond 5210 an effective depth of 60 feet.

It will be appreciated that raising a berm according to embodiments of the invention may raise community opposition, however, so, according to embodiments of the invention, berms may be restricted in height in some circumstances, but such restriction does not limit the invention.

Figure 54:
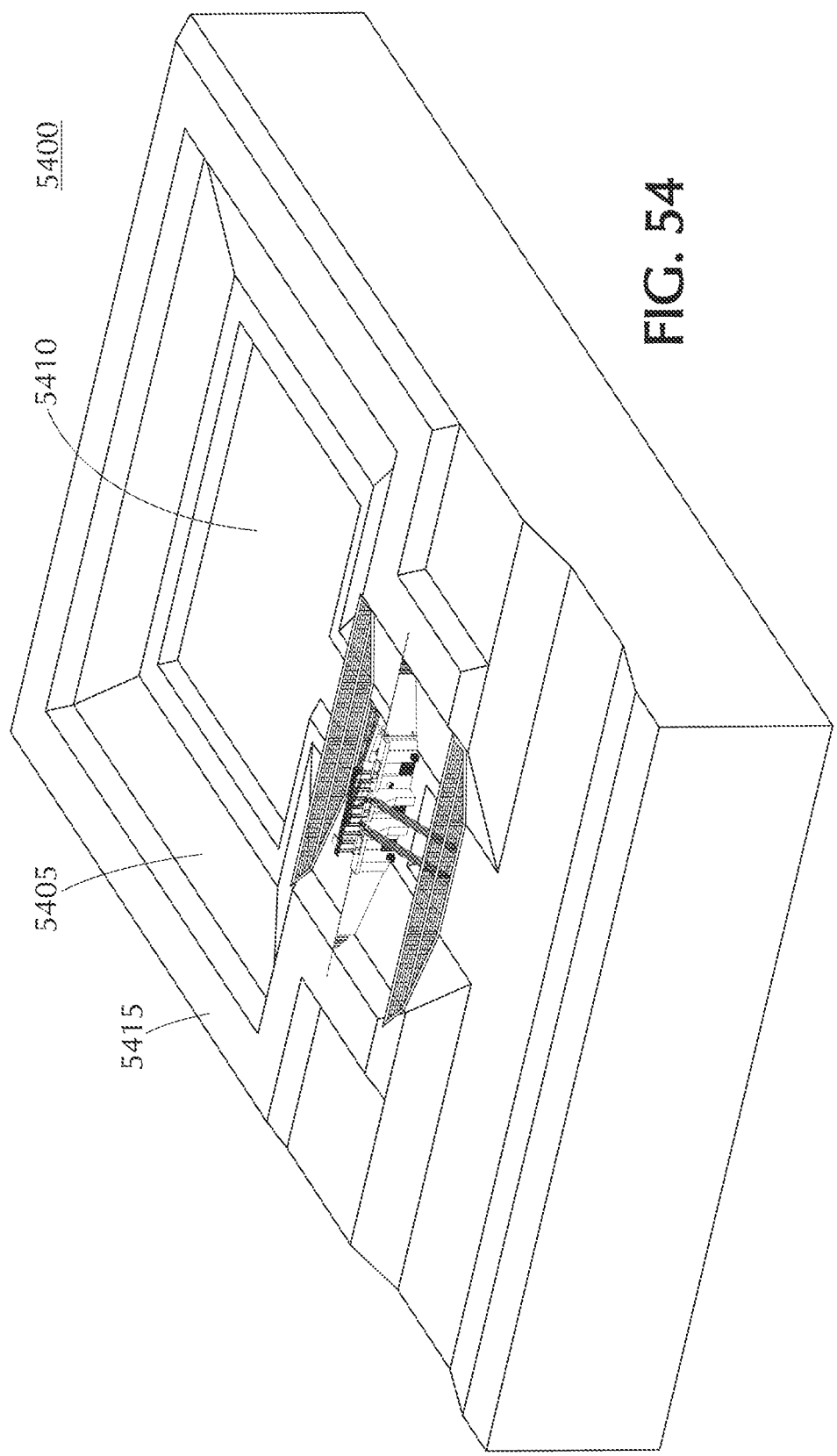
FIG. 54 and FIG. 55 depict an installation in which a detention pond includes additional excavation and is surrounded by a raised berm, according to an embodiment of the invention.
Figure 55:
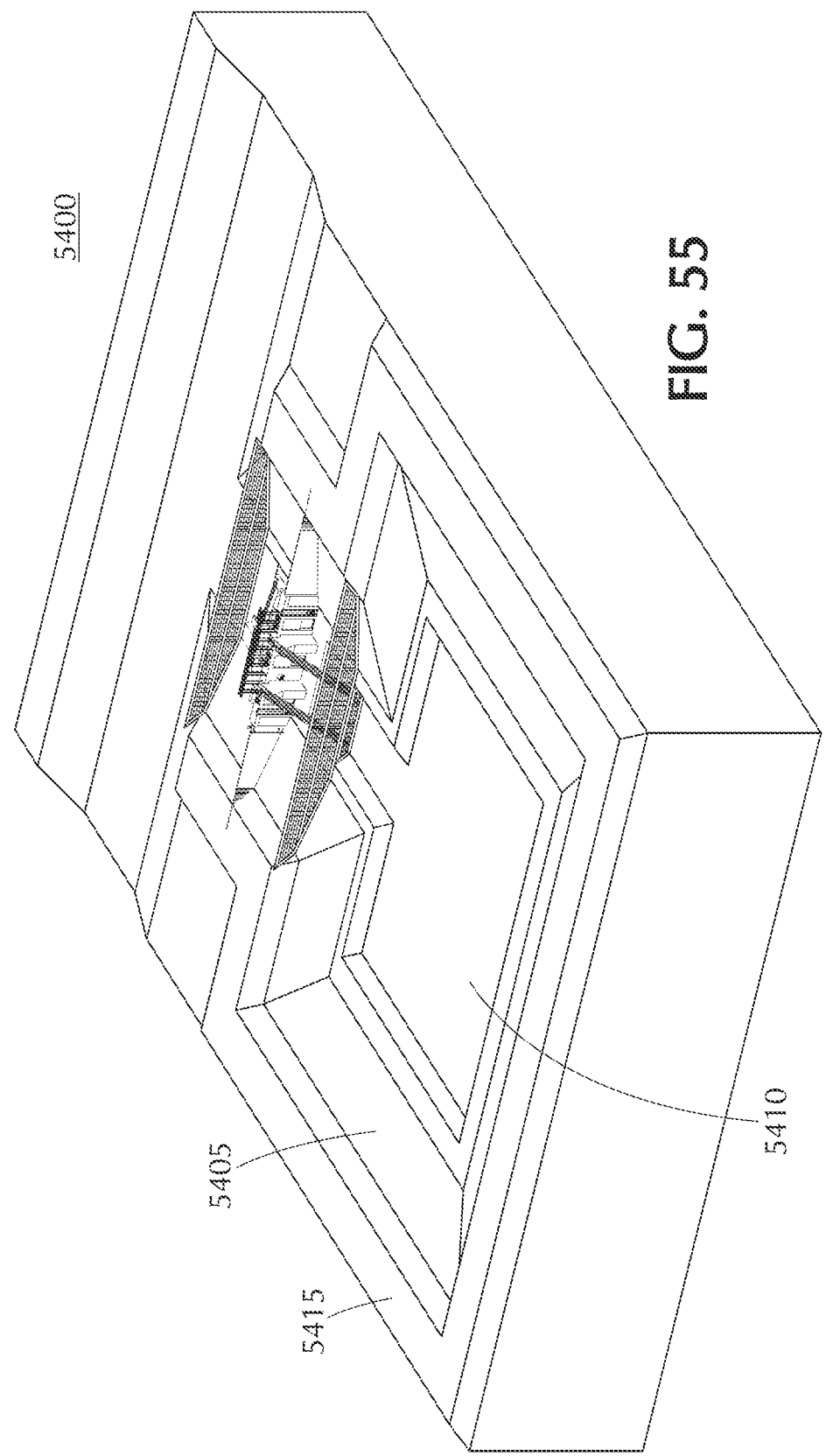

It will be appreciated that a detention pond according to embodiments of the invention may have its effective depth increased, e.g., by both excavating the detention pond and raising a berm. FIG. 54 and FIG. 55 depict an installation 5400 like the installation 5000 of FIG. 50, but in which the detention pond 5405 includes additional excavation 5410 and is surrounded by a raised berm 5415, according to an embodiment of the invention. If, for example, a detention pond with a natural depth of 30 feet is excavated an additional 30 feet and surrounded with a berm that is 30 feet high, then depending on the geometry, the volumetric capacity of the unmodified detention pond may be effectively tripled, or roughly so.

The entire previous discussion of controlling an installation comprising a dam structure in a main or primary channel weir, a detention weir, and a detention pond applies to embodiments of the invention such as FIGS. 41-55 depict. Thus, embodiments of the invention, e.g., as depicted in FIGS. 41-55 may be controlled manually, e.g., at local and/or remote control locations. Instead of manual control, or in addition to it, local and/or remote automatic computer systems, e.g., as discussed in connection with other embodiments. Again, as discussion in connection with other embodiments, such systems may receive input from various kinds of sensors in different locations and may be controlled, e.g., according to fixed programs and/or trained machine learning models. An installation (comprising, for example, a single weir wall and detention pond as FIGS. 41-55 depict) may be manually or automatically controlled as an isolated system and/or in conjunction with multiple installations (both with and without dams in main or primary channels) to improve flood control in a region.

Figure 56:
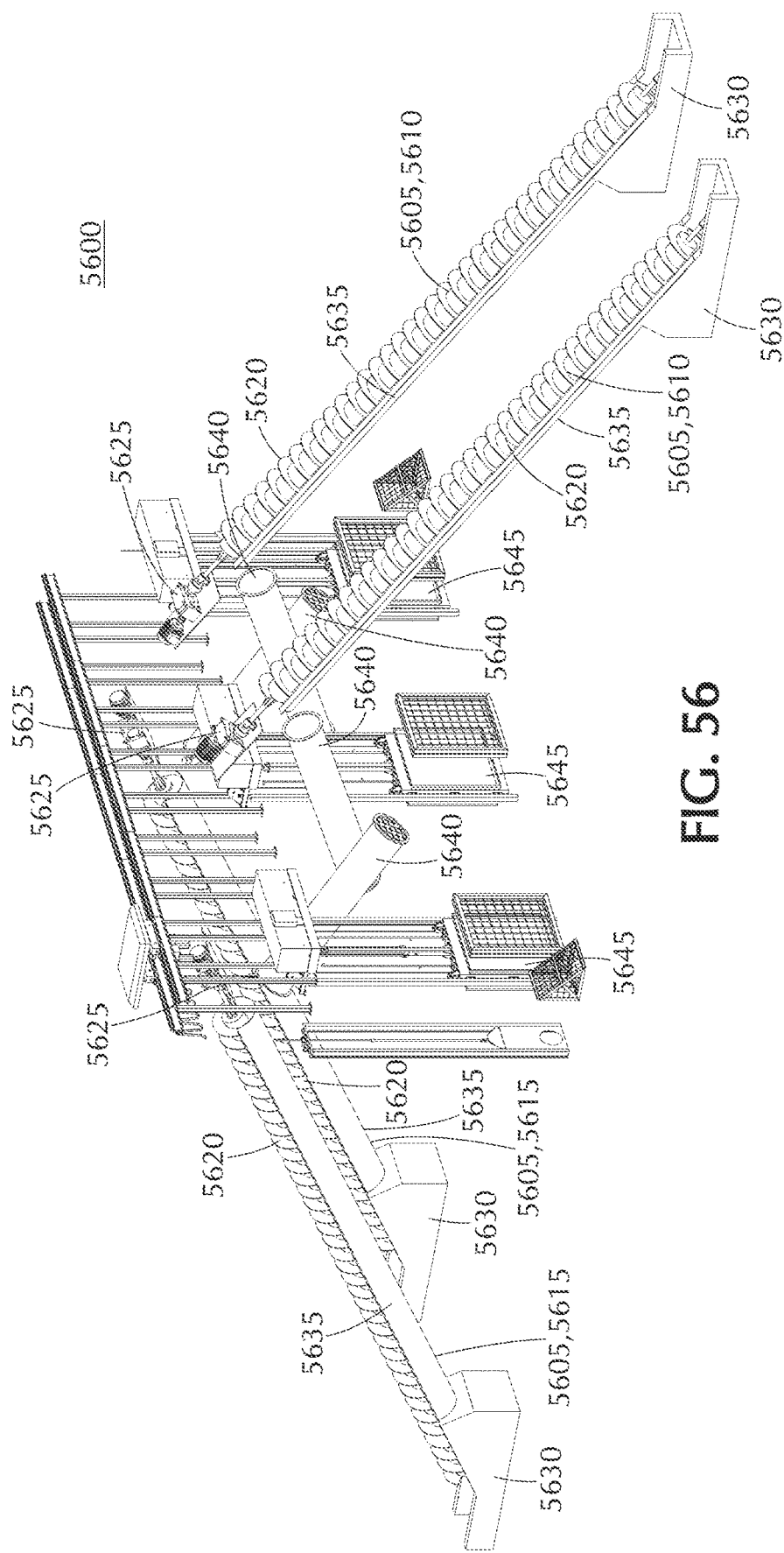
FIG. 56 depicts dual piping of vertically rising screw pumps and vertical lowering of the discharge pipes according to embodiments of the invention.

Embodiments of the invention, e.g., as depicted in FIGS. 44-55, are disclosed as including one or more screw pumps. For further clarity, FIG. 56 depicts an arrangement 5600 of mechanical components such as embodiments of the invention may include, but geographic features (including e.g., channels and detention ponds) and wall structures have been omitted for clarity. As FIG. 56 depicts, the arrangement reflects a configuration such as may be depicted in FIGS. 46-48 (omitting the sump 4640 (FIG. 46)), but it will be recognized that the design principles are equally applicable to other configurations and embodiments.

The depicted arrangement 5600 includes four screw pumps 5605, according to an embodiment of the invention. As depicted, two of the screw pumps 5610 are placed to move water from a channel into a detention pond, and the other two pumps 5615 are placed to move water from the detention pond to the channel Each screw pump 5605 in an embodiment of the invention comprises a screw 5620 that is turned, e.g., by an electric motor 5625. Water enters the pump 5605 at an intake 5630 (or when water levels are higher, along the submerged portion of the screw 5620) and is raised up an angled trough 5635 by the turning of the screw 5620. On reaching the top of the pump 5605, water is ejected from it and flows into a discharge pipe 5640. Each discharge pipe 5640 passes through the dam structure (not pictured) and is angled downward to pass water through the dam structure. It will be appreciated that if the top of each discharge pipe 5640 is at a height equal to or higher than the height of the dam structure, then the discharge pipe 5640 will not serve as a significant means for water to travel in an unintended direction unless the water is so high that is overtops the dam structure itself.

In an embodiment such as FIG. 56 depicts, the screw pumps 5620 and discharge pipes 5640 are located between the movable weir panels 5645 and associated mechanical elements. So located, in embodiments of the invention, the discharge pipes will not interfere with vertical motion of the weir panels 5645.

As depicted, the sets of screw pumps 5605 have equal lengths, but it will be appreciated that, in an embodiment including a sump, the lengths and/or angles of the screw pumps may differ to accommodate the sump. Similarly, in an embodiment in which the bottom of the detention pond is at a different level from the bottom of the channel, the lengths and/or angles of the screw pumps may differ to accommodate this configuration as well.

The invention claimed is:

1. An integrated system for managing surface water flow within a geographic region, comprising:
   a primary weir for managing water flow through a natural or artificial main channel, the primary weir spanning the main channel and comprising one or more movable panels and one or more sluices, each sluice comprising a gate;
   a detention pond adjacent to the main channel and communicating with the main channel via a pond channel immediately upstream of the primary weir;
   a detention weir for managing water flow through the pond channel, the detention weir spanning the pond channel and comprising one or more movable panels and one or more sluices, each sluice comprising a gate;
   one or more drains configured to drain water from the detention pond into the main channel; and
   a plurality of drains;
   wherein:
      a first at least one of the drains is placed to discharge water from the detention pond into the main channel upstream of the primary weir, and
      a second at least one of the drains is placed to discharge water from the detention pond into the main channel downstream of the primary weir.

2. The integrated system of claim 1, comprising a second detention pond communicating with the main channel via a second pond channel immediately upstream of the primary weir.

3. The integrated system of claim 1, wherein the detention pond comprises a park.

4. A coordinated system for managing surface water flow within a geographic region, comprising:
   a plurality of integrated systems for managing the surface water flow, each integrated system separately comprising
      (a) a primary weir for managing water flow through a natural or artificial main channel, the primary weir spanning the main channel and comprising one or more movable panels and one or more sluices, each sluice comprising a gate,
      (b) a detention pond adjacent to the main channel and communicating with the main channel via a pond channel immediately upstream of the primary weir
      (c) detention weir for managing water flow through the pond channel, the detention weir spanning the pond channel and comprising one or more movable panels and one or more sluices, each sluice comprising a gate,
      (d) one or more drains configured to drain water from the detention pond into the main channel,
      (e) a plurality of sensors, and
      (f) an automatic control system,
      wherein the automatic control system is configured to receive inputs from the plurality of sensors and to control independently of human input the one or more panels of the primary weir, the one or more gates of the sluices of the primary weir, the one or more panels of the detention weir, and the one or more gates of the sluices of the detention weir in response to the inputs to manage surface water flow in a manner calculated to reduce flooding in the geographic region;
   wherein:
      a single main channel is common to all of the integrated systems;
      each of the integrated systems comprises a respective primary weir, pond channel, detention pond, and detention weir specific to the integrated system and not shared by any other of the integrated systems; and
      a single automatic control system is common to all of the integrated systems.

5. The coordinated system of claim 4, wherein the automatic control system is operated from a control location not in the immediate area of any of the primary weirs or detention ponds.

6. The coordinated system of claim 4, wherein the region is a watershed.

7. A coordinated system for managing surface water flow within a geographic region, comprising:
   a plurality of integrated systems for managing the surface water flow, each integrated system separately comprising
      (a) a detention pond adjacent to a main channel and communicating with the main channel via a pond channel,
      (b) a detention weir for managing water flow through the pond channel, the detention weir spanning the pond channel and comprising one or more movable panels, each movable panel being associated with a respective opening in the detention weir and configured to move vertically between a first position in which the panel prevents water from flowing through the respective opening and a second position, above the first position, in which the panel does not hinder water flowing through the respective opening,
(c) for each of the movable panels, a respective motor coupled to the movable panel to move the panel from the first position to the second position,
(d) one or more egress pumps to move water from the detention pond to the main channel,
(e) one or more ingress pumps to move water from the main channel to the detention pond,
(f) a sump, wherein
  (i) each ingress pump comprises a respective intake,
  (ii) each intake is located within the sump,
  (iii) at least one of the egress pumps is a screw pump having a capacity of at least ten thousand gallons of water per minute, and
  (iv) at least one of the ingress pumps is a screw pump having a capacity of at least ten thousand gallons of water per minute,
(g) a plurality of sensors and an automatic control system, wherein
  (i) the automatic control system is configured to receive inputs from the plurality of sensors and to control independently of human input the one or more movable panels of the detention weir, the one or more ingress pumps, and the one or more egress pumps in response to the inputs to manage surface water flow in a manner calculated to reduce flooding in the geographic region,
  (ii) the plurality of sensors comprises a plurality of water level sensors, a plurality of water flow rate sensors, and a plurality of rain gauges,
  (iii) the plurality of water level sensors comprises a first plurality of water level sensors in the immediate area of the primary weir and the detention pond and a second plurality of water level sensors in the region but not in the immediate area of the primary weir and the detention pond, and
  (iv) the automatic control system comprises a machine learning model and is programmed to have
    (A) a training mode wherein the machine learning model is trained on relationships among the inputs and the configuration of the one or more movable panels of the detention weir, one or more operational parameters of the one or more ingress pumps, and one or more operational parameters of one or more egress pumps, and
    (B) an operation mode wherein the automatic control system, based on the inputs from the plurality of sensors and the machine learning model, controls independently of human input the one or more movable panels of the detention weir, one or more of the operational parameters of the one or more ingress pumps, and one or more of the operational parameters of one or more egress pumps in response to the inputs to manage surface water flow in a manner calculated to reduce flooding in the geographic region;

wherein:
  (a) a single main channel is common to all of the integrated systems,
  (b) each of the integrated systems comprises a pond channel, detention pond, and detention weir specific to the integrated system and not shared by any other of the integrated systems, and
  (c) a single automatic control system is common to all of the integrated systems.

8. The coordinated system of claim 7, wherein the automatic control system is operated from a control location not in the immediate area of any of the primary weirs or detention ponds.

9. The coordinated system of claim 8, wherein the region is a watershed.

* * * * *